(12) United States Patent
Johnson et al.

(10) Patent No.: US 7,809,135 B2
(45) Date of Patent: Oct. 5, 2010

(54) SYSTEM AND METHOD FOR PROTECTING COMPUTER SOFTWARE FROM A WHITE BOX ATTACK

(75) Inventors: Harold J. Johnson, Nepean (CA); Philip A. Eisen, Nepean (CA)

(73) Assignee: Cloakware Corporation, Ottawa, Ontario (CA)

( * ) Notice: Subject to any disclaimer, the term of this patent is extended or adjusted under 35 U.S.C. 154(b) by 1120 days.

(21) Appl. No.: 11/020,313

(22) Filed: Dec. 27, 2004

(65) Prior Publication Data

US 2006/0140401 A1 Jun. 29, 2006

Related U.S. Application Data

(63) Continuation-in-part of application No. 10/433,966, filed on Feb. 18, 2004, now Pat. No. 7,397,916.

(51) Int. Cl.
*H04L 9/00* (2006.01)
*G06F 7/04* (2006.01)
*G06F 17/30* (2006.01)
*H04N 7/16* (2006.01)
*H04L 29/06* (2006.01)
*G06F 11/30* (2006.01)
*G06F 12/14* (2006.01)

(52) U.S. Cl. .......................... 380/44; 726/26; 713/194; 713/164; 713/167; 713/189; 713/193

(58) Field of Classification Search .................. 380/44; 726/26; 713/194, 167, 164, 189, 193
See application file for complete search history.

(56) References Cited

U.S. PATENT DOCUMENTS

| | | | |
|---|---|---|---|
| 5,892,899 A | 4/1999 | Aucsmith et al. | |
| 6,192,475 B1 * | 2/2001 | Wallace | 713/190 |
| 6,668,325 B1 * | 12/2003 | Collberg et al. | 713/194 |
| 7,073,072 B1 | 7/2006 | Salle | |
| 7,162,031 B1 | 1/2007 | Roelofsen et al. | |
| 7,171,693 B2 | 1/2007 | Tucker et al. | |
| 7,631,292 B2 * | 12/2009 | Chen | 717/108 |

(Continued)

FOREIGN PATENT DOCUMENTS

| | | |
|---|---|---|
| EP | 0981223 A2 | 2/2000 |
| WO | 99/01815 A1 | 1/1999 |
| WO | 02/046890 A2 | 6/2002 |

OTHER PUBLICATIONS

Goubin et al, DES and Differential Power Analysis The "Duplication" Method, LNCS 1717, 1999, pp. 158-172.

(Continued)

*Primary Examiner*—Shin-Hon Chen
(74) *Attorney, Agent, or Firm*—Leslie A. Kinsman; Borden Ladner Gervais LLP

(57) ABSTRACT

Methods and systems related to increasing the cryptographic security of keys used by software with cryptographic functions. This is done by increasing the mathematical complexity of the software. The components and functions used by the software are first determined and, using these components, functions, and the data exchanged between them, the software is made more resistant to analysis. The methods used in increasing analytical resistance are grouped into 3 general types: adjusting the information exchanged between the components, replacing some components with different but related components, and adjusting the data flow between the components.

24 Claims, 19 Drawing Sheets

U.S. PATENT DOCUMENTS

| | | | |
|---|---|---|---|
| 2005/0002532 A1* | 1/2005 | Zhou et al. | 380/277 |
| 2005/0223361 A1* | 10/2005 | Belbute | 717/124 |
| 2005/0240591 A1* | 10/2005 | Marceau et al. | 707/9 |
| 2006/0048230 A1* | 3/2006 | Hameau et al. | 726/26 |

OTHER PUBLICATIONS

Daemen et al., "Efficient Block Ciphers for Smartcards", Usenix Workshop on Smartcard Technology, Chicago, Illinois, May 1-11, 1999.

Daemen et al., "Bitslice Ciphers and Power Analysis Attacks", 2000.

Coron et al., "On Boolean and Arithmetic Masking against Differential Power Analysis", 2000, pp. 1-11.

Chow et al., "A White-Box DES Implementation for DRM Applications", Pre-Proceedings for ACS DRM-2002 Workshop, Oct. 14, 2002, pp. 1-16.

Billet et al., "Cryptanalysis of a White Box AES Implementation", Selected Areas in Cryptography Conference SAC 2004.

Kocher et al., "Introduction to Differential Power Analysis and Related Attacks", www.cryptography.com/dpa/technical, 1998.

* cited by examiner

FIGURE 3: Outer Structure of DES

FIGURE 4: Structure of One DES Round (b) LBL

SYSTEM AND METHOD FOR PROTECTING COMPUTER SOFTWARE FROM A WHITE BOX ATTACK

The present application is a continuation-in-part of U.S. Ser. No. 10/433,966 filed Feb. 18, 2004, now U.S. Pat. No. 7,397,916, which is a U.S. National Entry of PCT Patent Application No. PCT/CA2001/001729 filed Dec. 10, 2001, which claims the benefit of priority of Canadian Patent Application Serial No. 2,327,911 filed Dec. 8, 2000.

FIELD OF THE INVENTION

The present invention relates generally to computer software and electronic hardware, and more specifically, to a method, apparatus and system resistant to a "white box attack"; that is, a system which will protect certain information from discovery even when the attacker has total visibility into software implementation and execution.

BACKGROUND OF THE INVENTION

The use of computers and computer software in all of their various forms is recognized to be very common and is growing everyday. In industrialized nations, hardly a business exists that does not rely on computers and software either directly or indirectly, in their daily operations. As well, with the expansion of powerful communication networks such as the Internet, the ease with which computer software programs and data files may be accessed, exchanged, copied and distributed is also growing daily.

In order to take advantage of these computer and communication systems and the efficiencies that they offer, there is a need for methods of storing and exchanging computer software and information securely. Information security issues can generally be categorized as one of the following:
A) confidentiality or privacy, where the goal is to prevent information from being obtained and understood by others;
B) data integrity, where the goal is either to prevent the alteration of data or to advise an authorized party that a set of data has been tampered with;
C) authentication, where the goal is to affirm the identity of a party; or
D) non-repudiation, where the goal is to prevent a party from denying that they made a certain communication. Non-repudiation is often used in electronic commerce transactions, particularly in bidding and negotiation environments.

One method of maintaining confidentiality or privacy that has demonstrated widespread use and acceptance is encryption of data using secret cryptographic keys. Such methods are generally accepted as secure, as an attacker must perform an impractically large number of mathematical tests to identify the cryptographic key required to decode a given encrypted data file. Cracking the Data Encryption Standard (DES) for example, would require an average of $2^{43}$ different keys to be tested, requiring more than 1 thousand years of testing at a rate of one million key tests per second. DES is just one of several block cipher methods which are very fast and are widely used—block ciphers are schemes in which data is divided up into blocks which are encrypted and decrypted separately from one another. If the cryptographic key is kept secure, it offers very good security.

There are many applications, however, in which the encryption key or other secret information (such as biometric data) must be hidden in application software itself. One such example is a Smart Card. Smart Cards are credit card-sized devices which have a small amount of electronic memory and a small microprocessor. They are often used in electronic commerce applications or to record personal information such as health records.

Existing encryption systems are designed to protect their secret keys or other secret data against a "black box attack". This is a situation where the attacker has knowledge of the algorithm and may examine various inputs to and outputs from the algorithm, but has no visibility into the execution of the algorithm itself. Typical black box attacks are categorized as
A) ciphertext-only attacks, where the attacker attempts to deduce the secret key or plaintext by analysing only the ciphertext;
B) known-plaintext attacks, where the attacker has sets of plaintext and corresponding ciphertext which he can analyse;
C) chosen-plaintext attacks where the attacker can execute the targeted algorithm on plaintext he has chosen, and compare it to the corresponding ciphertext; and
D) adaptive chosen-plaintext attacks, where the attacker modifies the plaintexts he selects for encryption, based on the results of previous analyses.

While such attacks are powerful enough by themselves, it has been shown that the black box model does not reflect reality. Often, if the attacker has sufficient access to the targeted algorithm to mount an adaptive chosen-plaintext attack, he is also in a position to observe at least some aspect of the execution of the algorithm itself.

For example, in their paper on Differential Power Analysis (DPA) titled: *Introduction to differential power analysis and related attacks*, 1998 (available on the Internet at http://www.cryptography.com/dpa/technical), Paul Kocher, Joshua Jaffe and Benjamin Jun demonstrated that Smart Cards protected with DES could be cracked in a matter of minutes rather than the theoretical thousand years of testing. DPA merely monitors the power consumed by the Smart Card while it is executing the DES algorithm on a chosen input. The power-consumed by the Smart Card at any given point in time corresponds with the bias state of the transistors in the device. The DPA attack can thus deduce the number of bits that are correct in a proposed key by statistical analysis, converging to the correct key very quickly.

The DPA attack shows that having very limited access to the execution of an algorithm designed to defend against a black box attack, is sufficient to make that algorithm completely insecure. Therefore, encryption algorithms must be designed to be secure against a much more powerful attack model—the "white box attack". A white box attack is simply an attack on a software algorithm in which the attacker has full visibility into the execution of the algorithm (note that the DPA attack may be characterised as a "grey box attack" because the attacker is only able to observe a small part of the execution).

Unfortunately, existing encryption and decryption algorithms and related algorithms including those for digital signatures, password authentication, Smart Cards and the like, are not resistant to white box attacks. In fact, many believe it is impossible to achieve such protection.

Several approaches have been suggested, but offer very weak protection. For example:
A) existing general-purpose commercial software obfuscators use a variety of techniques including: removal of debugging information, changing variable names, introducing irreducible flow graphs, and particularly in the case of Java, modifying code structures to avoid stereotyped forms for source control structures. These methods produce superficial changes, but the information exposed by deeper analyses employed by optimizing compilers and similar sophisticated tools is changed very little. The data flow and control flow information exposed by such analyses is either not affected at all, or is only slightly affected, by the above methods of obfuscation;

B) attempts have also been made to hide the real code by introducing dummy code, for example, by making every other statement a dummy statement designed to look much like the real code. Along with the higher overhead created, this approach has two fatal weaknesses:

I) it is vulnerable to data flow analysis (DFA) to discover the dummy code; and
 ii) even if DFA can be rendered ineffective, if x % of the code is dummy code, then 100-x % of the code is significant. For realistic values of x, a patient attacker can locate which statements matter and which do not, by trial and error; and C) U.S. Pat. No. 5,892,899 titled "Tamper Resistant Methods and Apparatus", issuing to Aucsmith et al. makes two suggestions:

I) splitting the cryptographic key into pieces stored in different locations in the software code, and
 ii) encoding a program in separate sections, decoding only those sections needed, when they are to be executed.
 Neither of these approaches is effective as the software code always executes in an unprotected form. Careful tracing of the execution therefore allows the pieces to be reassembled, yielding the complete and unprotected program.

As well, in their patent publication no. WO 99/01815, Christian Collberg, Clark Thomborsson and Douglas Crow present slightly more sophisticated variations on these themes. While these techniques might sufficiently obscure a key (for example) against a generic, automated attack, they are not resistant to a rigorous white box attack. In most cases, simply tracing execution of the software code will reveal the encryption key and any secure data completely.

Collberg et al, for example, suggest making some simple linear transformations to data values. A careful tracing of the program execution will identify how these transformations are done and undone. As well, since these transformations are linear, they can be reduced.

In addition, a variety of cryptographically weak approaches have been used for encryption and decryption, which avoid the use of any explicit key whatever. These methods are vulnerable either to a cryptographic black-box attack if plain-text can be recognized in an automated way, or to algorithmic analysis with the aid of debugging tools, since the would-be encryption is then a data transformation of quite limited algorithmic complexity.

In general, then, the state of the art has been that programs could not be made effectively secret-hiding and tamper-resistant. In particular, cryptographic keys for reasonably secure ciphers could not be securely hidden in software.

One way to address this issue is the use of cryptographically strong key hashing. Cryptographically strong keyed hashing is implemented using much the same techniques as used for symmetric-key encryption and decryption. The differences are:

Encryption and decryption must be readily invertible; i.e., for each encryption with a given key, there must be a decryption with the same key, and vice versa, and encryption and decryption should be comparably fast. For keyed hashing, however, there need not be a readily-computed inverse. In fact, it is highly desirable that finding such an inverse should be infeasibly difficult.
 Encryption and decryption must not lose any information; i.e., the output of encryption or decryption must contain all of the information in its input. For keyed hashing, however, information loss is permissible.

In the paper *Cryptanalysis of a White Box AES Implementation* by Olivier Billet and Henri Gilbert (France Telecom) and Charaf Ech-Chatbi (Loria), first published in the Selected Areas in Cryptography conference of 2004 (SAC 2004), the authors introduce techniques for accelerating the search for cryptographic keys in an AES-128 implementation using methods similar to those disclosed in PCT Patent Application WO 02/46890, by means of homomorphic mapping. Specifically, they introduce techniques addressed to accelerating key search for the AES-128 implementation of the paper *White Box Cryptography and an AES Implementation* by Stanley Chow, Philip Eisen, and Harold Johnson (Cloakware) and Paul van Oorschot (Carleton University), published in the same conference two years earlier: in the SAC 2002 proceedings.

There is therefore a need to extend the techniques disclosed in WO 02/46890 to render homomorphic mapping attacks ineffective.

In addition, there is a need to address the rapid increase in available computing power since those techniques were invented. Since that time, grid computing, whereby a local area network (LAN) of computers, or even a wide area network (WAN) of computers, can effectively be converted into a highly parallel computing platform, which can be used to accelerate statistical bucketing attacks such as linear cryptanalysis and differential cryptanalysis.

There is therefore a need for a method, apparatus and system for encryption that is tamper-resistant, allowing secret cryptographic keys, biometric data and encrypted data to have software operations executed upon it, without fear that security will be breached.

SUMMARY OF THE INVENTION

It is therefore an object of the invention to provide a method and system that improves upon the problems described above.

The present invention provides methods and systems related to increasing the cryptographic security of keys used by software with cryptographic functions. This is done by increasing the mathematical complexity of the software. The components and functions used by the software are first determined and, using these components, functions, and the data exchanged between them, the software is made more resistant to analysis. The methods used in increasing analytical resistance are grouped into 3 general types: adjusting the information exchanged between the components, replacing some components with different but related components, and adjusting the data flow between the components.

In a first aspect of the invention there is provided, a method of enhancing cryptographic security for a key used in software that has cryptographic functions, the method comprising:

a) ascertaining the different components of said software;
 b) determining the different functions executed by said software;
 c) increasing a mathematical complexity of said software using said components, said functions, and/or data flow between said components and said functions.

BRIEF DESCRIPTION OF THE DRAWINGS

A better understanding of the invention will be obtained by considering the detailed description below, with reference to the following drawings in FIG. 1 presents a flow chart of a general algorithm for implementation of the invention.

DETAILED DESCRIPTION

As noted above, most security software is designed under the assumption that the software will be applied in a secure environment, that is, in a black-box model. This of course, is not realistic, and as a result, most security software cannot withstand a concerted attack.

The central failing of black-box security models is that the specific implementation of the software algorithm is considered to be irrelevant to security. This is in direct contrast to the method of the invention. The invention appreciates that in the case of a white-box model, the algorithm is critical, and changing the specific implementation of the algorithm is the primary means for providing security.

The invention provides ways to make finding an embedded cryptographic key or other hidden information combinatorially difficult for the attacker, even under this severe threat model. Such methods are inherently bulkier and slower than black-box cryptography, but there are many applications in which the tradeoff is well worthwhile, including, for example, Smart Card and their hardware alternatives.

Figure 1:
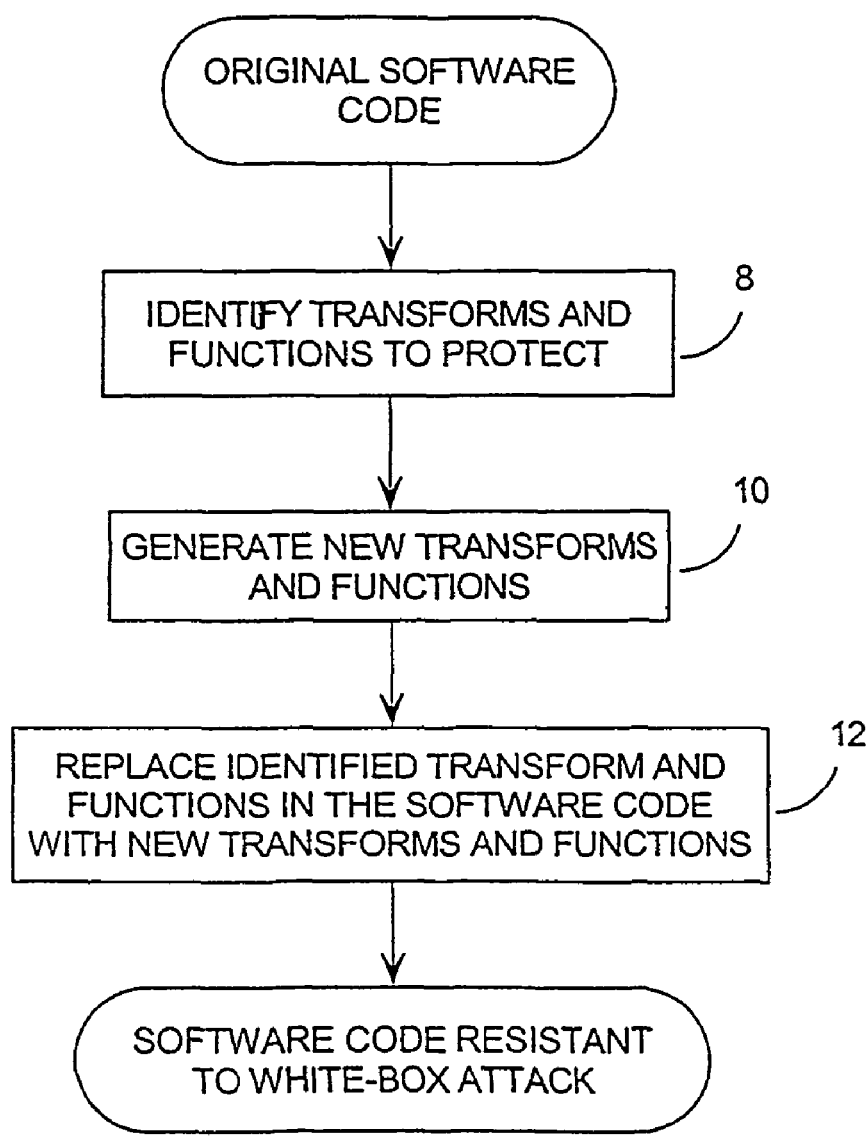

In broad terms, the method of the invention which addresses the objects outlined above, is presented as a flow chart in FIG. 1. This figure presents a method of increasing the obscurity and tamper-resistance of a software program by:
A) identifying functions and transforms substantive to the targeted software program at step 8;
B) generating new functions and transforms which alter the processing activity visible to the attacker at step 10; and
C) replacing those identified functions and transforms with the new functions and transforms in the software program at step 12.

A number of different techniques for effecting the invention are described hereinafter. These techniques may be grouped generally as follows:
A) making transforms non-linear, so they cannot be reduced by an attacker;
B) making processing activity disappear, by generating new transforms that eliminate data (like constants, etc.) and processing steps (such as combining two transforms together into one);
C) generating new, spurious, processing activity, by concatenating random transforms to real ones, and performing input and output encodings that introduce processing activity completely unrelated to the original data; and
D) encoding and widely diffusing sites of information transfer and/or combination and/or loss.

Hence, the invention can be employed to protect any manner of software from being analysed, reversed-engineered, or simply observed to discover secure data such as cryptographic keys. Cryptographic keys can then be incorporated into software programs without the danger of the cryptographic key being disclosed, or the program being altered to do anything other than what it was originally intended to do. Executable music files, for example, can be bound to a particular processing device or to a password, and attackers are unable to modify the code to allow it to be used by others or on other devices.

Similarly, passwords, biometric data and other secure programs and data files can also be securely stored, transferred and executed using the method of the invention.

Being a software solution, the cost of the invention is very small and the invention can be transported electronically. The invention has none of the costly administrative and physical limitations of hardware solutions. The degree of complexity of the invention is easily scalable, so that the degree of analysis required to overcome it can be made impractically great.

Figure 2:
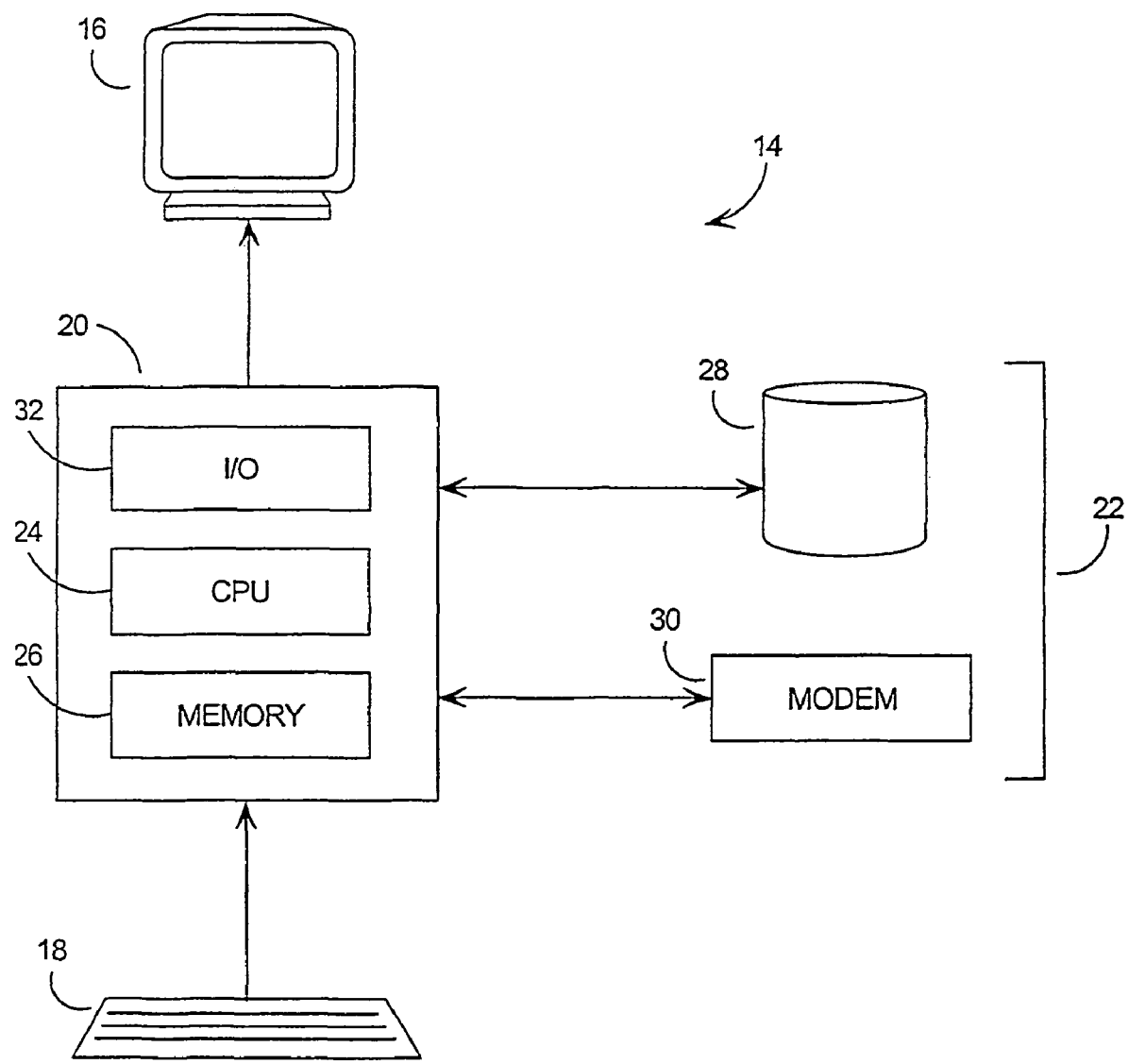
FIG. 2 presents an exemplary computer system in which the invention may be embodied.

An example of a system upon which the invention may be performed is presented as a block diagram in FIG. 2. This computer system 14 includes a display 16, keyboard 18, computer 20 and external devices 22.

The computer 20 may contain one or more processors or microprocessors, such as a central processing unit (CPU) 24. The CPU 24 performs arithmetic calculations and control functions to execute software stored in an internal memory 26, preferably random access memory (RAM) and/or read only memory (ROM), and possibly additional memory 28. The additional memory 28 may include, for example, mass memory storage, hard disk drives, floppy disk drives, magnetic tape drives, compact disk drives, program cartridges and cartridge interfaces such as those found in video game devices, removable memory chips such as EPROM or PROM, or similar storage media as known in the art. This additional memory 28 may be physically internal to the computer 20, or external as shown in FIG. 2.

The computer system 14 may also include other similar means for allowing computer programs or other instructions to be loaded. Such means can include, for example, a communications interface 30 which allows software and data to be transferred between the computer system 14 and external systems. Examples of communications interface 30 can include a modem, a network interface such as an Ethernet card, a serial or parallel communications port. Software and data transferred via communications interface 30 are in the form of signals which can be electronic, electromagnetic, optical or other signals capable of being received by communications interface 30.

Input and output to and from the computer 20 is administered by the input/output (I/O) interface 32. This I/O interface 32 administers control of the display 16, keyboard 18, external devices 22 and other such components of the computer system 14.

The invention is described in these terms for convenience purposes only. It would be clear to one skilled in the art that the invention may be applied to other computer or control systems 14. Such systems would include all manner of appliances having computer or processor control including telephones, cellular telephones, televisions, television set top units, point of sale computers, automatic banking machines, lap top computers, servers, personal digital assistants, Smart Cards and automobiles.

The invention will now be described with respect to the particular application of the Data Encryption Standard (DES) encryption and decryption.

Description of DES

The Data Encryption Standard (DES) is a block cipher, where data being encoded or decoded is broken down into sixty-four-bit blocks which are operated upon separately. DES inputs a sixty-four-bit block to be encrypted or decrypted and a sixty-four-bit raw key and outputs a sixty-four-bit result. Only fifty-six bits of the raw key are actually used: the low-order bit of each raw key 8-bit byte is discarded, or can be used for parity.

DES will only be described herein with sufficient detail to explain the invention. A more detailed description of (single) DES is provided in FIPS (Federal Information Processing Standards in the United States) publication 46-3. A description and an extensive discussion are also provided by Bruce Schneier, *Applied Cryptography*, ISBN 0471-11709-9, John Wiley and Sons, 1996, DES receiving particular attention on pp. 265-294.

There are only three kinds of data operations in

A) selecting some or all bits from a bit-string and reordering them into a new bit-string, possibly with multiple appearances of certain bits. Schneier et al. refer to these as permutations, though this is not quite accurate since they are not necessarily bijections. Therefore, such transformations will be referred to herein as quasi-permutations (QPMs), with the true permutations being the special case of a QPM being a bisection.

(Note that a bijection is a function which is both one-to-one and onto. A function is one-to-one if each element in the set of outputs is the image of only one element in the set of inputs; also referred as an injection. A function is onto if each element in the set of outputs is the image of at least one element in the set of inputs.)

Each QPM operation is controlled by a table which for each to-bit of the output bit-string gives the from-bit in the input bit-string whose value it has, except for key-shift QPMs, which are simple rotation permutations, each of which is described by a simple signed shift count;

B) Boolean bit-wise exclusive or (XOR) operations; and

C) looking up elements in a table (LKP). In DES, before performing any transformations, these are look-ups in sixty-four-element tables of 4-bit-strings (each table is called an S-box—S for "substitution"), using a 6-bit-string as an index. Initially, each LKP operation is controlled by one of eight S-box tables indicating the substitutions it is to perform.

Figure 3:
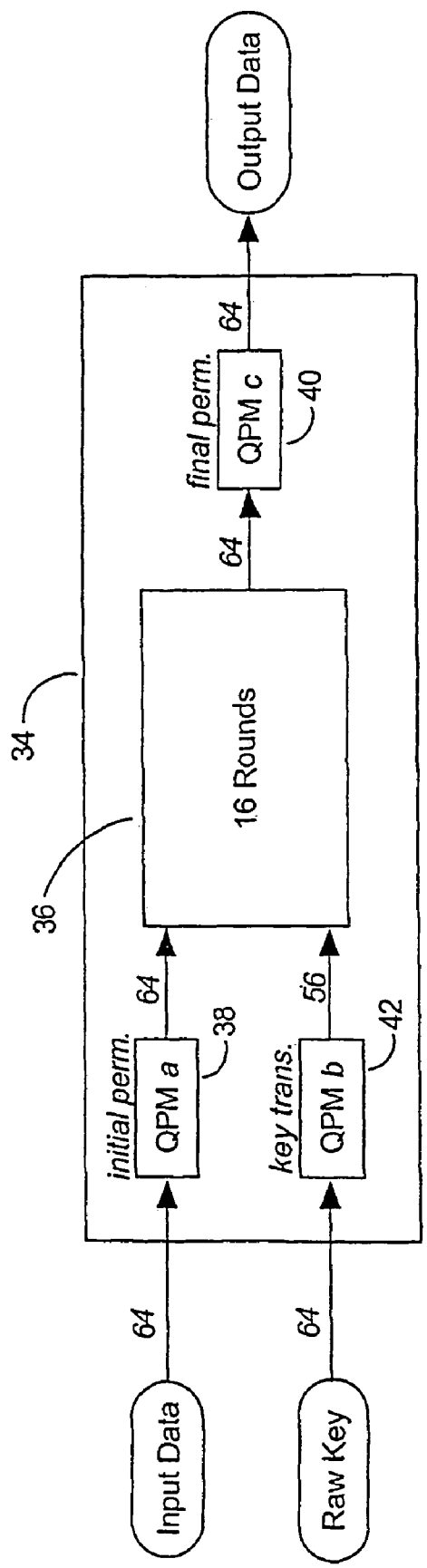
FIG. 3 presents a data flow diagram of the outer structure of the DES algorithm.

FIG. 3 presents a data flow diagram of the outer structure of DES. This presentation is intended to emphasize the three basic kinds of operations making up DES, as described above. Italicized numbers adjacent to the arrows indicate the bit-widths of the indicated values. The outer box 34 represents the entire DES algorithm, whether encryption or decryption. The inner structure of DES comprises sixteen rounds of processing 36, which are identical except for one minor variation in the final round and the variations in one of the internal QPM operations, namely, the key shift, QPMe, which is explained hereinafter. The initial permutation, QPMa at step 38, and the final permutation, QPMc at step 40, are true permutations, that is, there are no omissions and no duplicated bits. Note that QPMC at step 40 is the inverse of QPMa at step 38. The key transformation, QPMb at step 42, selects fifty-six of sixty-four bits from the raw key, and rearranges the bits.

Figure 4:
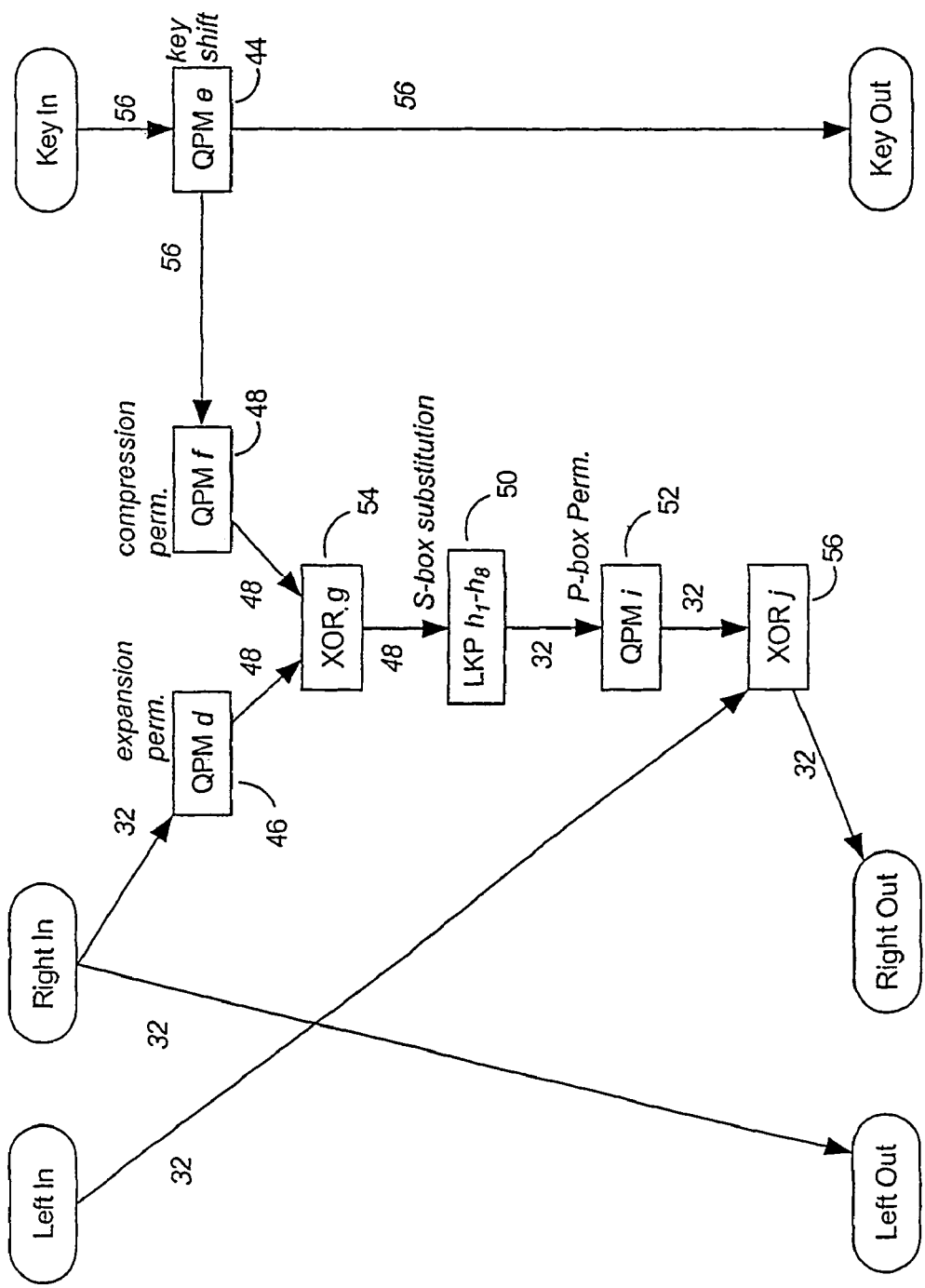
FIG. 4 presents a data flow diagram of a single round of the DES algorithm.

FIG. 4 presents a data flow diagram of the internal structure of one of the sixteen DES rounds at step 36. Left In and Right In are the left and right halves of the data being encrypted or decrypted as it enters the round, and Left Out and Right Out are these halves after the processing has been performed by the rounds. Key In is the fifty-six-bit key as it enters the round, and Key Out is the fifty-six-bit key as it leaves the round. The expansion permutation, QPMd at step 46, repeats certain bits, whereas the compression permutation, QPMf at step 48, which produces the round sub-key as its output, omits certain bits.

The key shift, QPMe at step 44, consists of rotations of the left and right halves of the fifty-six-bit key by an identical amount, in a direction and with a number of shift positions determined by the round number and by whether encryption or decryption is being performed. LKP h1-h8 at step 50 (performing S-box substitution) are the eight S-box lookup tables performed in the round. In the DES standard, the indices for the LKP operations h1-h8 at step 50 are each, in effect, preceded by yet another QPM operation, which permutes the six input bits so that the low-order or right-most bit becomes the bit second from the left in the effective index, but this QPM can be eliminated to match what has been shown above by reordering the elements of the S-box tables. The P-box permutation, QPMi at step 52, permutes the results of LKP h1-h8 at step 50, presumably to accelerate diffusion of information across all bits.

The XORg operation at step 54 is a simple Boolean exclusive OR on the outputs of the QPMd at step 46 and the output from the QPMf at step 48. Similarly, the XORj operation at step 56 is a simple Boolean exclusive OR on the outputs of the Left In and the output from QPMi at step 52.

Note that all rounds are performed identically except for the previously mentioned differences in the key shift, QPMe, and the swapping of Left Out and Right Out, relative to what is shown in FIG. 3, in the final round.

DETAILED DESCRIPTION OF THE EMBODIMENTS OF THE INVENTION

1.0 Introduction

As noted above, the embodiments of the invention are intended to protect software and data from a white-box threat model where the attacker has all of the advantages present for an adaptive chosen plaintext attack (control of the number of plaintexts and their content, and access to the resulting ciphertexts), as well as full access to the encrypting software. Thus, the attacker can arbitrarily trace execution and examine all sub-results, perform arbitrary static analyses on the software itself, or alter results of sub-computation (e.g., by using breakpoints) to perform perturbation analysis. The only restriction in this model is that the attacker does not have access to the processes by which the executing software was produced.

Hence, white-box cryptography is aimed at environments where protection is needed but isolation of the cryptographic computation itself from the attacker is for some reason not practical.

Also as noted above, the specific implementation of the algorithm is considered to be irrelevant to security in the black-box model. In the case of the white-box model, however, it becomes critical, and changing the specific implementation of the algorithm becomes the primary means for providing security. The invention provides ways to make finding hidden information combinatorially difficult for the attacker.

This description focuses on symmetric block ciphers where encryption requires only substitution boxes and linear transformations, using DES to provide a detailed example of hiding a key in the software. This is done because:

A) DES needs only linear transformations and substitution boxes, which simplifies the discussion; and
B) triple-DES remains popular. The technique of the invention readily extends to handle it.

The invention is described with respect to the embedded key case, as opposed to cases where the key is presented dynamically to the software. Clearly though, the invention could be applied to such cases to limit the amount of information available to an attacker.

2.0 Terminology and Notation

This section outlines the terms and notation used in the general description of the invention. A more rigorous treatment is given in the section titled "Additional Observations on the General Invention" which follows.

A bit is an element of the Galois field of the integers modulo 2, that is, the binary set of $\{0, 1\}$. A bit-vector is a vector over this field, such as the six-bit vector [0 1 0 1 0 0], and a bit-matrix is a matrix over it. Other terms starting with the "bit-" prefix are similarly understood.

An expression such as $<e_1, e_2, e_3, \ldots, e_k>$ is a vector of k elements (the $e_i$'s). Whether the elements are bits will be evident from context.

We denote by $P'$ an encoded function derived from the function P. $_m{}^nP$ denotes the same function as P, indicating that it maps vectors that are m-bits in length, onto vectors that are n-bits in length. $^nP$ is simply an abbreviation of $_n{}^nP$. $^kI$ is the identity function on k-vectors. $_m{}^nE$ (a mnemonic for an entropy-transference function) is any function from m-bit long vectors to n-bit long vectors such that, if $m \leq n$, the mapping loses no bits of information, and if $m > n$, it loses at most n-m bits of information. $^nE$ is, of course, an abbreviation of $_n{}^nE$. Multiple occurrences of $_m{}^nE$ or $^nE$ in a given formula or equation denote the same function.

$v_i$ the ith element of vector v, and $v_{i \ldots j}$ is the sub-vector containing the ith through jth elements. $_kv$ denotes the same bit-vector as v, indicating that v has k elements. $_ke$ (a mnemonic for an entropy-vector) is any vector with k elements. Multiple occurrences of $_ke$ within a given formula or equation denote the same vector. $x : y$ is the concatenation of vectors x and y, and $x \oplus y$ is the bitwise Boolean exclusive-or (XOR) of x and y.

$P \circ Q$ is the composition of $_a{}^bP$ and $_c{}^dQ$ where $a=d$. $P \| Q$ (the concatenation of P and Q) is that function $_{a+c}{}^{b+d}H$ such that $H(_ax : _cy) = P(x) \| Q(y)$, so that $H(x : y)_{1 \ldots b} = P(x)$ and $H(x : y)_{b+1 \ldots b+d} = Q(y)$. If P and Q have inverses, then $H^{-1} = P^{-1} \| Q^{-1}$. The concatenation function " : " is associative for vectors, and the concatenation function "$\|$" is associative for functions.

For a matrix M, $_m{}^nM$ denotes M, indicating that M has m columns and n rows. (If we interpret the application of M to a vector as a function application, this notation will be the same as above.)

3.0 De-Linearization and Substitution Boxes

A linear transformation (LT) is a vector-to-vector transformation function P from vectors to vectors which can be defined by $_m{}^nP(_me) = _m{}^nM_me + _nd$ for all $_me$, where M is a constant matrix and d is a constant displacement vector.

LTs are useful in mixing and reconfiguring information. In the black-box context, the LTs can be very simple, for example, the Expansion Permutations 46 and P-box Permutations 52 in DES (see FIG. 4). Note that a permutation of a vector is simply a rearrangement of the order of its values. For example, if $S = \{5, 10, 15, 20\}$, then a permutation P might be defined as: $P(1)=20, P(2)=5, P(3)=15$ and $P(4)=10$.

In the white-box context, simple LTs cannot be used because they reveal too much information to the attacker. Thus, in the method of the invention, we:

A) use more complex LTs; and
B) disguise the LTs by converting them into non-linear functions.

3.1 Notes on Linear Transformations

The permutations used in DES are all LTs, as are its bitwise XOR operations 54, 56. Hence, DES is performed by LTs and substitution boxes (SBs) alone.

For a given m and n, there are $2^{mn+n}$ m-input, n-output LTs, but we are primarily interested in those which discard minimal, or nearly minimal, input information (that is, we prefer that $m \leq n$). If $m=n$, then there are $$2^n \prod_{i=0}^{n-1} (2^n - 2^i)$$

bijective LTs, since there are $$\prod_{i=0}^{n-1} (2^n - 2^i)$$

non singular n×n matrices (see: *Linear Groups, with an Exposition of Galois Field Theory*, Leonard E. Dickson, 1958, p. 77, Dover Publications, New York). A non-singular matrix is a matrix which is invertible.

It is the latter of these two equations which is of greater significance, since we will often use LTs to reconfigure information. Changing the displacement vector, d, of an LT affects only the sense of the output vector elements, and not how the LT redistributes input information to the elements of its output vector. (Recall the general form of an LT as noted above: $_m{}^nP(_me) = _m{}^nM_me +_n d$.)

There are $2^n!$ bijections of the form ${}^nP$. Considering the above formulas, we see that the proportion which are linear shrinks rapidly as the value of n increases. For example, there are $2^3! = 40,320$ bijections of the form ${}^3P$. Out of this number, $$2^3 \prod_{i=0}^{3-1} (2^3 - 2^i) = 1,344$$

are linear, or exactly one in 30. There are $2^5! \cong 2.631 \times 10^{35}$ bijections of the form ${}^5P$, of which $$2^5 \prod_{i=0}^{5-1} (2^5 - 2^i) = 319,979,520$$

are linear, which is about one in $8.222 \times 10^{26}$.

Nevertheless, the number of linear bijections ${}^nL$ becomes very large for large n. For example, there are about $6.442 \times 10^{42} \approx 2^{142.21}$ non-singular 12×12 matrices. This is a large number, considering that there are only a total of $2^{144}$ matrices with dimensions of 12×12.

Note that if A and B are LTs, then so is A∥B, and so is A∘B (where defined). LTs, per se, are of little use in white-box cryptography, because they are so easily decomposed by Gaussian elimination and related methods.

3.2 De-Linearized LTs and Encoded Functions

Let us consider how we can de-linearize LTs and encode functions in general:

3.2.1 Partial Evaluation

Suppose part of our input to a function $_m{}^nP$, is $_bv$, and we wish to replace v with a fixed constant, $v = _bc$. In DES, for example, we have many situations in which we have a transform with two inputs: some data input $_ax$, and a constant encryption or decryption key input $_bc$. By performing partial evaluation, we alter the transform to yield the same output in response to the input $_ax$, but the fixed encryption or decryption key input $_bc$ no longer appears in the program.

In mathematical terms, if the input to P is $_ax : _bc$, where m=a+b, then we can hide c by replacing $P_a{}^nQ(_ae) = P(_ae : c)$ for all $_ae$. Thus, we end up with a new transform $_a{}^nQ$, which performs the same function as $_m{}^nP$, but incorporates in a concealed way, a constant as part of its input.

Note that $_a{}^nQ$ is smaller in size than $_m{}^nP$. This reduction occurs because part of the input to $_m{}^nP$ is constant; thus we have a restricted use of $_m{}^nP$, it is not necessary to pass the entire P domain into Q. Therefore, Q is smaller than P but no information is lost.

This process can be implemented in a variety of manners. A simple algorithm for its implementation is presented in the flow chart of FIG. 5.

Firstly, for a given function, $_m{}^nP$, the particular constant input, $_bc$, and its value, must be identified at step 70.

Next, the routine steps through all possible input values, $_ae$, for the original function, $_m{}^nP$, at step 72. For each possible input value, the output of $P(_ae : c)$ is calculated at step 74, and the output of $_a{}^nQ(_ae)$ for the given input is set to equal this $P(_ae : c)$ output at step 76.

When it is detected at step 72 that all possible input values have processed, then control passes to step 78 where the $P(_ae : c)$ function is replaced in its original program with the new $_a{}^nQ(_ae)$ transform, and this particular routine is complete. In the encoded program, only transform Q appears, and there is no transform P or constant $_bc$.

In other words, we know what the input is, and we know what output we want to obtain, so we generate a transformation which satisfies those requirements.

Of course, this routine may be incorporated in larger software routines, or be implemented in different manners. As well, transforms P and Q may or may not be linear, and may or may not be matrices.

3.2.2 Encoded Functions and Networks

This technique allows us to encode transforms so that the original transform is incorporated in the encoded program, but cannot be found by attacker. This is useful in DES; by example, where the same transforms are used many times; by encoding a given transform a different way each time it is used, the attacker cannot correlate all the instances of that transform.

For example, for an LT $_m{}^nL$, we could choose non-linear bijections ${}^mF_L$ and ${}^nG_L$ such that $L' = G_L \circ L \circ F_L^{-1}$ is non-linear. $F_L$ is referred to as the input coding, and $G_L$ the output coding, of L' with respect to L, and L' is an encoded LT. We can similarly encode a non-LT, X, as X' with input and output codings $F_X$ and $G_X$ respectively.

Clearly, the encoded algorithm must compensate for the F and G encodings so that it will operate properly. A straightforward way to do this is to implement a network of encodings. For example, if a software algorithm has successive transformations X and Y, we can generate encoded transforms X' and Y' which look nothing like X and Y, but in which the output coding of X is corrected by the input coding of Y. Since the output coding of X is incorporated in X' and the input coding of Y incorporated into Y', the fact that they are complements is not apparent at all.

Figure 6:
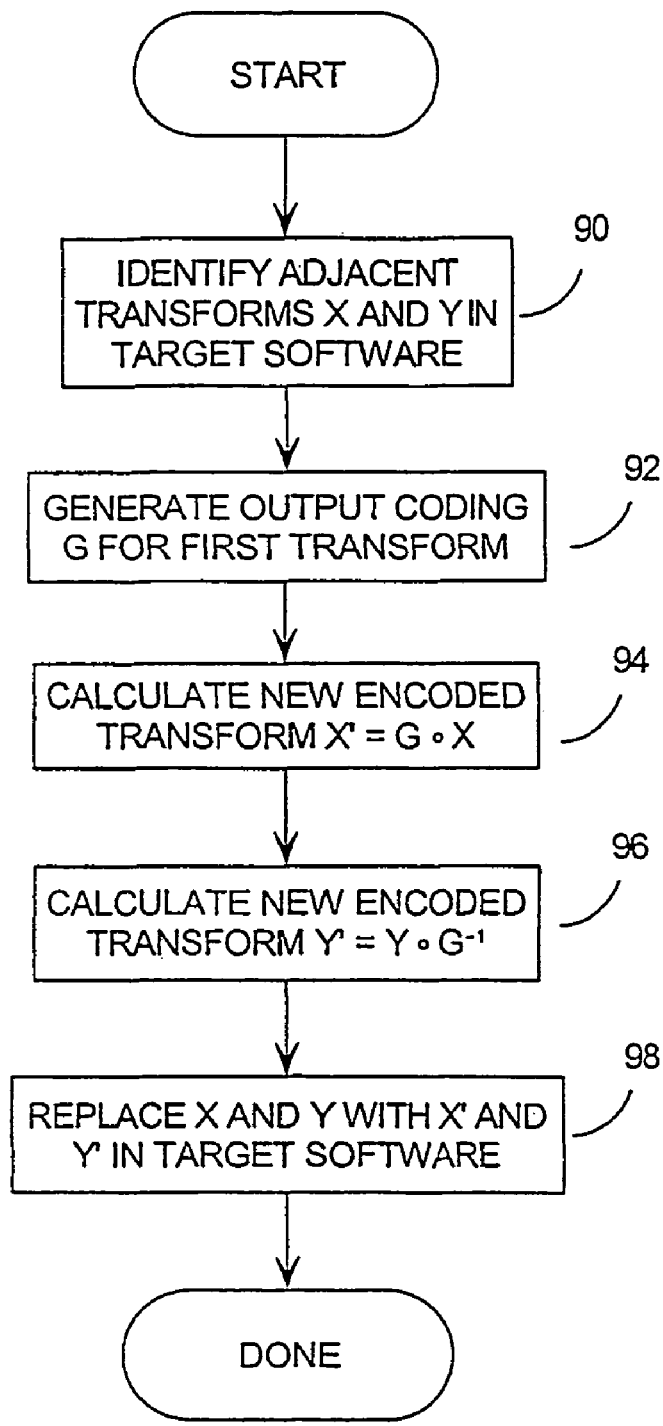
FIG. 6 presents a flow chart of a method of generating encoded functions and networks in an embodiment of the invention.

A exemplary method of effecting such a process is presented in the flow chart of FIG. 6.

Firstly, two adjacent transforms X and Y are identified in the target program at step 90. Next, a random output coding is generated at step 92, for the first transform X (similarly, of course, one could generate a random input coding for the second transform Y).

The encoded transform X' can now be calculated as $X' = G_X \circ X$ at step 94. As the input coding to transform Y must compensate for the G.sub.X encoding, the encoded transform Y' can now be calculated as $Y' = Y \circ G_X^{-1}$ (i.e. $F_Y = G_X$), at step 96.

The two transforms X and Y can now be replaced in the software program with the encoded transforms X' and Y' at step 98, and the routine is complete.

For Y'∘X' to be an encoding of Y∘X, we require $F_Y = G_X$, since $Y' \circ X' = G_Y \circ Y \circ F_Y^{-1} \circ G_X \circ X \circ F_X^{-1}$. Variations on this theme can be implemented using "∘", "∥", and bijective codings, thus we can construct encoded networks from encoded functions.

These encodings could be implemented a number of ways, for example, the values ${}^mF_X$ and ${}^nG_X$ could be chosen randomly. By being chosen randomly, it would be possible for one of $^mF_X$ or $^nG_X$ to be linear, but it is probably better to rely completely on randomness than to attempt to avoid linear transforms being generated.

This technique is also useful for disguising sparse matrices. Sparse matrices may provide an attacker with a weakness to exploit. This can be remedied simply by multiplying the sparse matrix with an encoding function which is random but generally dense, and placing the encoded sparse matrix and the inversion of the encoding function into the software algorithm. Thus, rather than facing a sparse matrix, the attacker will face two dense matrices.

3.2.3 Input/Output (I/O)—Blocked Encoding

In section 3.2.2 above, suppose that m and n are inconveniently large when we are encoding some linear or non-linear function P. The size of DES substitution boxes for example, grow as the power of two of the input size, so an eight bit input will require a table with a manageable 256 entries. However, a 16-bit input will require a memory and processing intensive 65,536 entries and 32-bits, an impractical $4.3 \times 10^9$ entries. Therefore, a technique which allows the size of functions to be reduced or divided into multiple, smaller functions, would be very useful.

Figure 7:
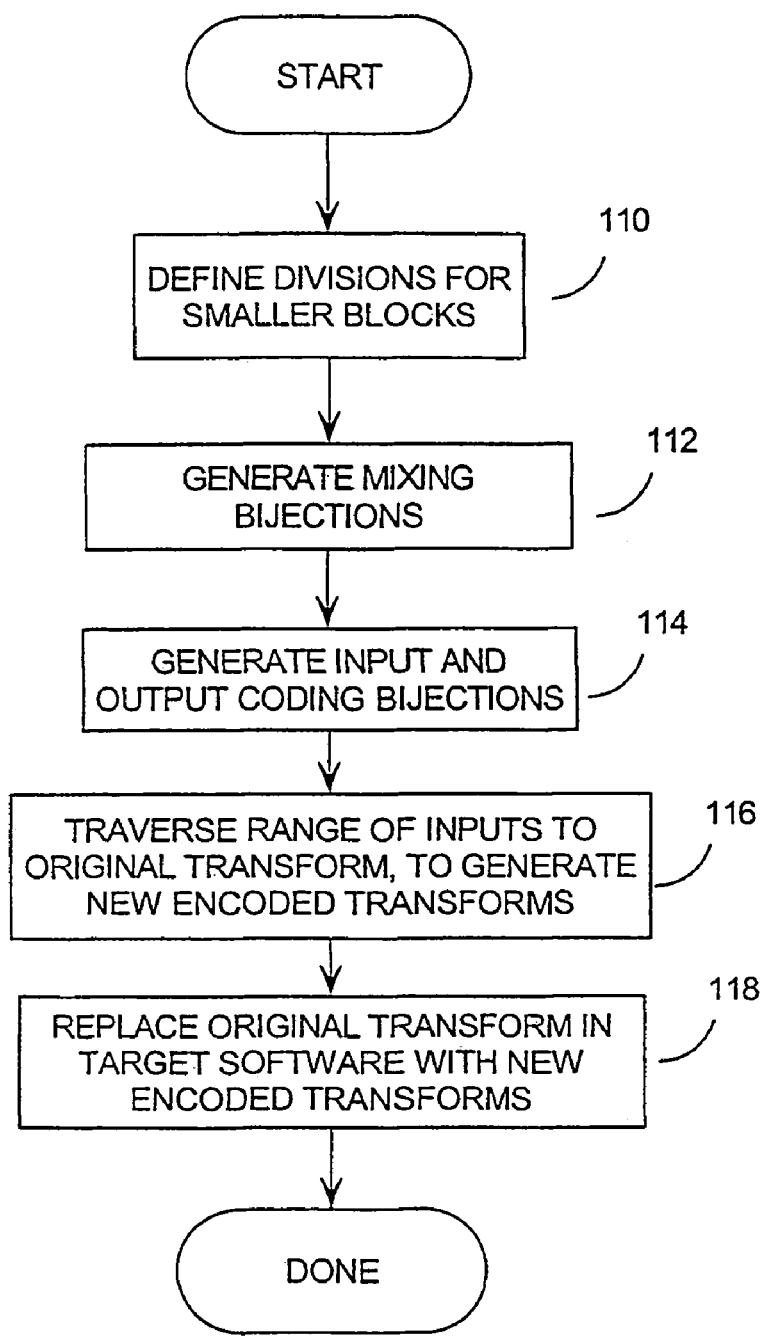
FIG. 7 presents a flow chart of a method of input/output-blocked encoding in an embodiment of the invention.

The growth of inconveniently large functions may easily occur for example, when using the linear blocking method of section 4.1. In that case, we can define input and output codings $F_P$ and $G_P$ for a function P, using the exemplary routine presented in the flow chart of FIG. 7. This routine proceeds as follows:

First, at step 110, we define m=j a and n=k b, as we want to map $_m{}^nP$ onto $_{ja}{}^{kb}P$. We intend to divide function $_m{}^nP$ into j×k blocks, each block having dimensions of a input bits and b output bits.

Next, we generate two 'mixing' linear bijections $^mJ$ and $^nK$ (two bijective LTs each of which mixes the entropy of its input bits across all of its output bits as much as possible), at step 112. Alternatively, J and K could simply be randomly generated; whether a certain LT yields the desired mixing depends on the context. The only real restriction on J and K is that they be invertible.

At step 114, we now randomly choose non-linear input and output coding bijections F and G, which we partition as: $^aF_1, \ldots, ^aF_j$ and $^bG_1, \ldots, ^bG_k$. Clearly, there are j input encoding functions F, recognizing that the input to $_m{}^nP$ was divided out as m=j a. Thus, each F encoding function has dimensions a×a. The same applies for the output coding G, which is partitioned into k functions of dimensions: k input bits and k output bits. We then define $F_P = (F_1 \| \ldots \| F_j) \circ J$ and $G_P = (G_1 \| \ldots \| G_k) \circ K$.

Figure 5:
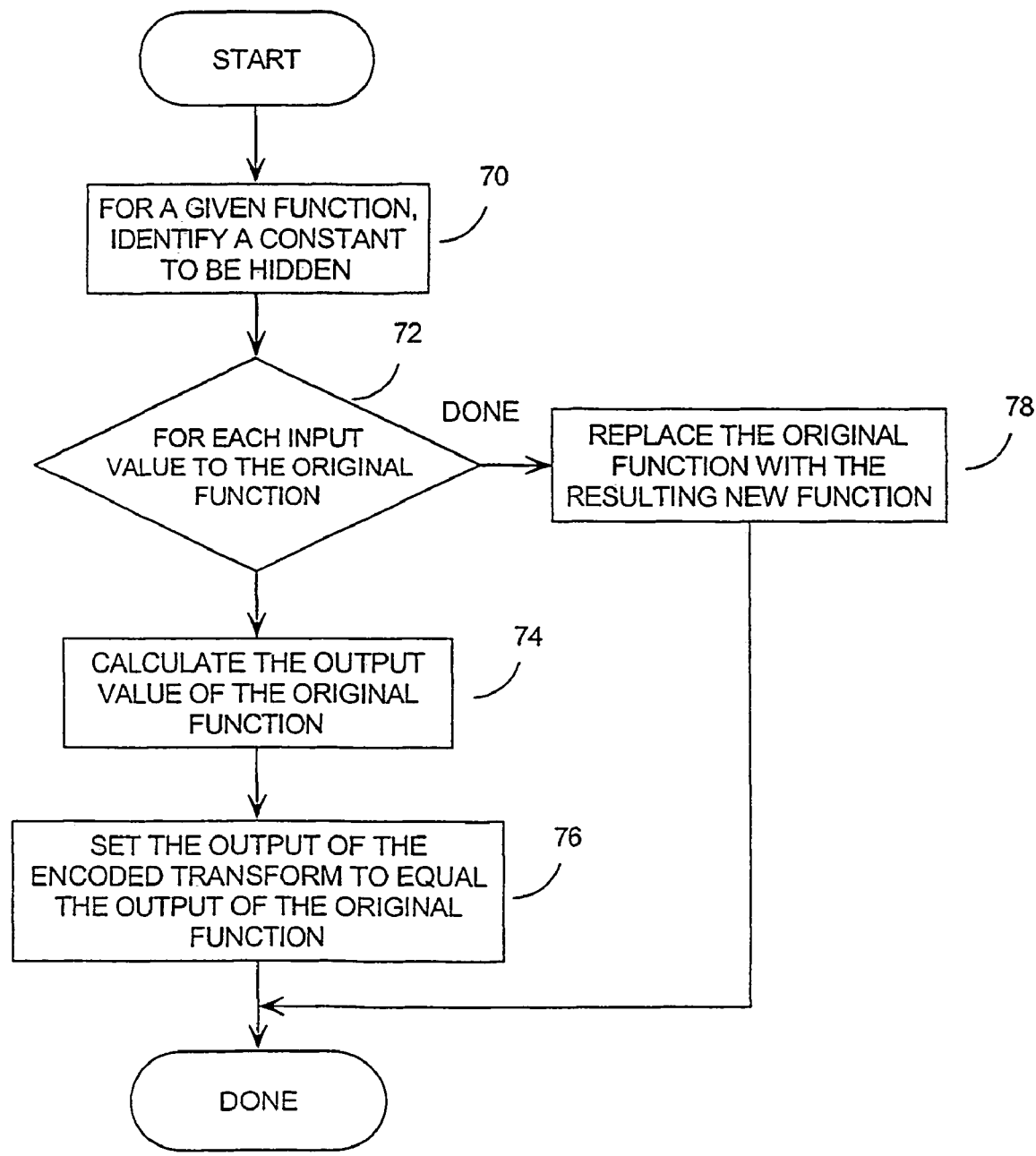
FIG. 5 presents a flow chart of a method of partial evaluation in an embodiment of the invention.

We can then generate an encoded function $P' = G_P \circ P \circ F_P^{-1}$ at step 116 in one of the manners described above: i.e. by traversing the range of inputs to P as described in steps 72 through 78 of FIG. 5, or simply solving the equation for P'. The original transform P can then be replaced with the encoded transform P' in the targeted software program at step 118.

This permits us to connect with a "wide I/O" linear function in encoded form, since, prior to encoding, as a preliminary step, we only need to deal with J and K (that is, we may replace P with $K \circ P \circ J^{-1}$), which can be done using the smaller blocking factors of the $F_{i's}$ and $G_{i's}$ which we add during encoding.

That is, if the input to P is provided by an LT X, and the output from P is used by an LT Y, we would use $J \circ X$ and $Y \circ K^{-1}$ instead. Then the input and output coding of the parts can ignore J and K—they have already been handled—and deal only with the concatenated non-linear partial I/O encodings $F_1 \| \ldots \| F_j$ and $G_1 \| \ldots \| G_k$, which conform to smaller blocking factors.

As an example of the combinatorics for such encodings, consider the case where we must encode $^{12}P$. If we choose a=b=4, then j=k=3, and the number of choices for each of $F_P$ and $G_P$ is about $6 \times 10^{42}$ (non-singular 12×12 matrices)×9× $10^{39}$ (choices for sequences of three non-linear block coding functions): about $5 \times 10^{82}$.

This easily extends to non-uniform I/O blocked encoding, i.e. where the groups of input and output encoding function are not all of identical dimensions.

3.2.4 Encoded Function Concatenations

For functions P and Q, one could concatenate them together and then choose an encoding of P∥Q such as $G_{P \| Q} \circ (P \| Q) \circ F^{-1}_P \| Q$ (as per section 3.2.2 above). This mixes the input and output entropy of transform P with that of transform Q, making it harder for an attacker to separate and determine the components P and Q.

3.2.5 By-Pass Encoding

There are instances in which it is necessary to execute a transform, say $_m{}^nP$, but also to pass some or all of the input bits m, onto a subsequent operation. In DES, for example, there are a series of steps in which the data input on the right-hand side becomes the data for the left-hand side for the next round (see FIG. 4). So it would be desirable to perform the right-hand side calculations, but also pass the original input data to the output so that it can be used in the next round (for the left hand side calculations).

In general, this is done by concatenating a new function to the original transform, which does the job of transferring the desired bits through the encoded transform without being affected by the original transform. To carry a extra bits of entropy at the input, and b extra bits of entropy at the output, of $_m{}^nP$, where a≧b, we can encode $_{m+a}{}^{n+b}P'$ as $G_{P\|E} \circ (P \| _a{}^bE) \circ F^{-1}_{P\|E}$, where $_a{}^bE$ is the by-pass component of P'.

Figure 8:
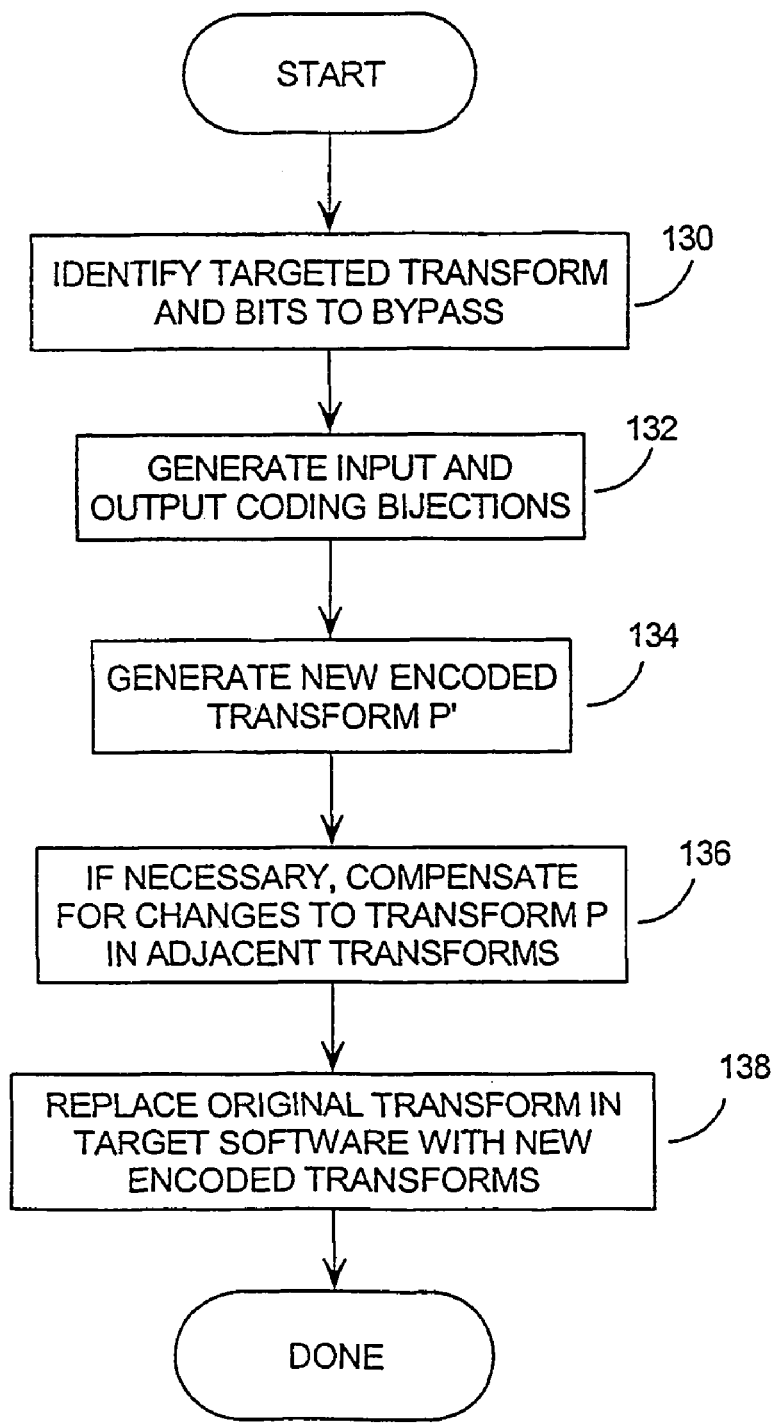
FIG. 8 presents a flow chart of a method of by-pass encoding in an embodiment of the invention.

The process of generating the transform $_{m=a}{}^{n+b}P'$ is basically the same as described above with respect to the generation of other encoded transformations. As per the flow chart of FIG. 8, the process begins at step 130 by identifying a targeted transform $_m{}^nP$ and the extra bits that are to be passed through the encoded transform $_{m=a}{}^{n+b}P'$ that is, the a and b bits.

Input and output encoding transforms F and G are then generated at step 132, in the manner described herein.

The encoded transform is then generated at step 134, in a manner consistent with the nature of the transform, for example, by traversing all possible inputs to the original transform $_m{}^nP$ and defining $_{m=a}{}^{n+b}P'$ as equal to $G_{P\|j}{}^b{}_E \circ (P\|_a{}^bE) \circ F^{-1}_{\|a}{}^b{}_E$. If the original transform $_m{}^nP$ is a matrix, for example, then $_a{}^bE$ will be a matrix that selects the desired bits from the input, and allows them to be passed through the encoded transform $_{m=a}{}^{n+b}P'$.

Next, we compensate for the input and output encoding transforms F and G (if necessary) by generating new compositions for transforms adjacent to the original transform $_m{}^nP$ in the targeted software algorithm, at step 136 (say transforms X and Y). We then replace original transform $_m{}^nP$, and adjacent transforms X and Y, in the targeted software program, with their respective encoded transforms P', X' and Y' at step 138.

If m+a=n+b, then P' is locally secure. A function which is locally secure has the property that every original function is just as likely as every other original function. Thus, given only the encoded results, an attacker cannot tell with any probability whether one original input was more likely than another (see section 3.3).

If $_a^b E$ has the specific form $^a I$ (so that a=b), it can be referred to as identity by-pass encoding, so the compensation at step 136 will not have to be performed. Non-identity bypasses may also be performed, but the non-identity transformation encoding will have to be undone. This can easily be done by incorporating the inversion transform into the adjacent transforms at step 136.

However, varying the input and output codings arbitrarily, if a>b, we cannot arbitrarily substitute the by-pass component without affecting the set of functions obtained. Its (vector-set valued) inverse mapping implies a particular partition of the possible input subvectors for that component (where elements of a partition element agree on the original P input vector). We cannot entirely hide the cardinalities (i.e. the number of elements) in the subsets forming this partition.

That said, even if some statistical attack finds these cardinalities, it may yet remain quite difficult to resolve the input and output codings of P'.

3.2.6 Split-Path Encoding

For a function $_m^n P$, we may disguise it by concatenating it with another function which may be arbitrary. For example, we could encode function $_m^n P$ into function $_m^{n+k} X$ where $X(_m e)=P(_m e) \,;_m^k R(_m e)$ for all $_m e$, and R is some arbitrary, fixed function.

The effect is that, if P is lossy (i.e. information can be obtained by observing processing on transform P), then X may lose less information or no information at all (processing on X is obscured to the observing, by the addition of the processing on R). In particular, we can use this method to achieve local security, as described in section 3.3.

The generation of the encoded transform X, is done in the same manner described above with respect to FIGS. 5 through 8.

This technique adds new redundant processing into the data flow of the program. This redundant processing is substantive in that it becomes integral with the encoded transform X, and cannot easily be identified or removed. This is in contrast to "dummy code" used in the art, which does not actually execute and can be identified using data flow analysis techniques. With the method of the invention, it is quite difficult to distinguish which operations are from the original software code, and which have been added.

As these redundant arguments ultimately have no impact on the outcome of the software program, they can be generated randomly. Techniques for generating random and pseudo-random numbers are known in the art.

3.2.7 Simultaneous By-Pass Encoding

In some cases, we may wish to perform some function on an input, and yet preserve the input in the output for later use (but not separate from the output as we did in section 3.2.5). This may be feasible if we can arrange that our function is encoded as a bijection, as a bijection has a one to one mapping between inputs and outputs.

Suppose, for example, that we have a bijective encoded function $P'=G_X \circ X \circ F_X^{-1}$ where X is derived from P using split-path encoding (see section 3.2.6). We can view this same function as $Q'=G_Q \circ Q \circ F_Q^{-1}$ where we define $Q=F_Q=^m I$ for an appropriate m, and $G_Q=P'$. That is, we use an identity input encoding for an identity and regard P' as the output coding. Then applying its inverse, $P'^{-1}$, to the output, we retrieve the input. By encoding the inverse of P' (for example, combining it with a subsequent transformation), we can conceal the use of the inverse of P', which need not appear as such in an implementation.

The generation of the encoded transform is done in the same manner described above with respect to FIGS. 5 through 8.

3.2.8 Output Splitting

This technique is useful for disguising outputs where input information can be well hidden. This does not appear to be the case for DES: for implementations of DES, output splitting is not recommended since it cannot provide much security.

Where the technique is appropriate, to make statistical "bucketing" attacks more difficult, we may encode a function P as $k \geq 2$ functions, $P_1, P_2, \ldots, P_k$, where each encoding can mix in additional entropy as described in sections 3.2.4 or 3.2.5 above, and where the output of all of the encoded $P_i$'s is needed to determine the original output of P.

For example, given a function $_m^n P$ we can choose k=2, define $_m^n P_1$ to be a randomly selected fixed $_m^n E$, and define $_m^n P_2(_m e)=P(_m e) \alpha P_1(_m e)$ for all $_m e$.

At this point, we can compute the P output from the exclusive-or of the outputs of the two $P_i$'s. However, after we then independently encode the $P_i$'s, the output of $P_1$ and $P_2$ is not combinable via an LT into information about P's output.

3.3 Substitution Boxes and Local Security

We can represent any function $_m^n P$ by a substitution box (SB): an array of $2^m$ entries, each of n bits. To compute P(x), find the array entry indexed by the binary magnitude x. The exponential growth in SB size with its input width, limits SBs to the representation of narrow input functions.

When an SB represents L' or X' (where L is an LT and X is a non-linear transform), then if m=n, and L or X is bijective, the SB for L' or X' bijection is locally secure: irrespective of L or X, we can always choose an input or output coding such that the SB of L' or X' is that SB. Locally, any information about L or X, other than the value of n and that it is a bijection, cannot possibly be discovered from the encoded SB of L' or X' itself (which only means, of course, that an attack must be non-local).

The lossy case is not locally secure. When a slightly lossy encoded function is represented as an SB, some information about the function beyond its input and output widths can be found by examining its SB. Completely understanding it, however, still requires a non-local attack (as we will see in the DES example).

The price of using such a protean representation is that SBs are often redundant, and may include considerable non-productive entropy. For some practical implementations, one may need something less bulky. Of course, any substantial implementation shrinkage compared to an SB implies restrictions on input and output codings.

Plainly, for any function $_m^n P$ and any bijection $^m B$, the SB for $P \circ B$ has the same elements as the SB for P, but (unless $B=^m I$) in a different order.

4.0 Wide-Input Encoded LTs: Building Encoded Networks

Because of the previously noted immense storage needs of wide-input SBs, it is infeasible to represent a wide-input encoded LT by an SB. One can, however, construct networks of SBs which implement a wide-input encoded LT.

4.1 A Blocking Method

The following construction is protean: it can handle LTs in considerable generality, including compositions of LTs, and for a wide variety of LTs of the form $_m^n L$ encoded as $_m^n L'$, the form of the network can remain invariant except for variations in the bit patterns within its Sbs.

For an LT, L, we simply partition the matrix and vectors used in the LT into blocks, giving us well-known formulas using the blocks from the partition which subdivide the computation of L. We can then encode the functions defined by the blocks, and combine the result into a network, using the methods in section 3.2 above, so that the resulting network is an encoding of L.

Consider an LT, L, defined by $_m{}^nL(_me) = _m{}^nM_me + _nd$ for all me: we choose partition counts $m_\#$ and $n_\#$ and sequences $\langle m_1, \ldots, m_{m\#}\rangle$ and $\langle n_1, \ldots n_{n\#}\rangle$, $\Sigma_1{}^{m\#}m_i$ and $\Sigma_1{}^{m\#}n_i = n$. That is, the former sequence (the m-partition) is an additive partition of m, and the latter sequence (the n-partition) is an additive partition of n.

The m-partition partitions the inputs and the columns of M; the n-partition partitions d and the outputs. Hence, the I, jth block in partitioned M contains $m_i$ columns and $n_j$ rows, the ith partition of the input contains $m_i$ elements, and the jth partition of d or the output contains $n_j$ elements.

At this point, it is straightforward to encode the components (of the network forming L) to obtain an encoded network, by the methods of section 3.2, and then representing it as a network of SBs (see section 3.3). In such a network, none of the subcomputations is linear each is encoded and represented as a non-linear SB.

A naive version of this consists of a forest of $n_\#$ trees of binary 'vector add' SBs, with $m_\#$ ($m_\# - 1$) 'vector add' nodes per tree. At the leaves are $m_\#$ unary 'constant vector multiply' nodes, and at the root is either a binary 'vector add' node (if there is no displacement) or a unary 'constant vector add' node (if there is a displacement).

However, we can eliminate the unary 'constant vector add' and 'constant vector multiply' nodes entirely. We simply compose them into their adjacent binary 'vector add' nodes, thereby saving some space by eliminating their Sbs.

A potential weakness of this entire approach is that the blocking of L may produce blocks, such as zero blocks, which convert to SBs whose output contains none, or little, of their input information. This narrows the search space for an attacker seeking to determine the underlying LT from the content and behaviour of the network. However, so far as we have yet determined, such blocked implementations remain combinatorially quite difficult to crack, especially if we apply the proposals below.

For example, the potential weakness noted above, can be addressed as follows:

A) when mixing entropy by the methods of section 3.2, do so opportunistically, in a manner calculated to avoid such blocks; and B) instead of encoding $_m{}^nL$, find linear $_m{}^nL_1$ and $_m{}^nL_2$, such that $L_2$ is a 'mixing' bijection (its input information is spread as much as possible across all output bits), and generate $L_1 = L \circ L_2^{-1}$. Encode the two functions separately into networks of SBs, and connect the outputs of the $L_2'$ representation to the inputs of the $L_1'$ representation, thus creating a representation of $L_1' \circ L_2' = L'$.

While the above methods help, it is not easy, in general, to eliminate m×n blocks which lose more bits of input information than the minimum indicated by m and n. For example, if we partition a matrix $^{km}M$ into k×k blocks, we cannot guarantee that all of the k×k blocks are non-singular (i.e. can are invertible), even if the rank of M is greater than k. Hence, if M is non-singular, a partition of M into square blocks may contain some singular (lossy) blocks.

Therefore, some information about an encoded LT may leak in its representation as a blocked and de-linearized network of SBs when this blocking method is used.

5.0 Example

An Embedded, Hidden Key Implementation of DES

We now discuss an implementation of DES that is resistant to a white-box attack. The implementation presented here has weaknesses, both in security and efficiency, which are addressed in sections 5.4 and 7.

As described above with respect to FIGS. 3 and 4, DES is performed in 16 rounds, each round employing the same eight DES SBs (DSBs), $S_1$ through $S_8$, and the same LTs, sandwiched between initial and final LTs (the initial and final permutations). Each DSB is an instance of $_6{}^4E$. Two rounds of standard DES are presented in the bock diagram of FIG. 9.

5.1 Replacing the DES SBs

Figure 9:
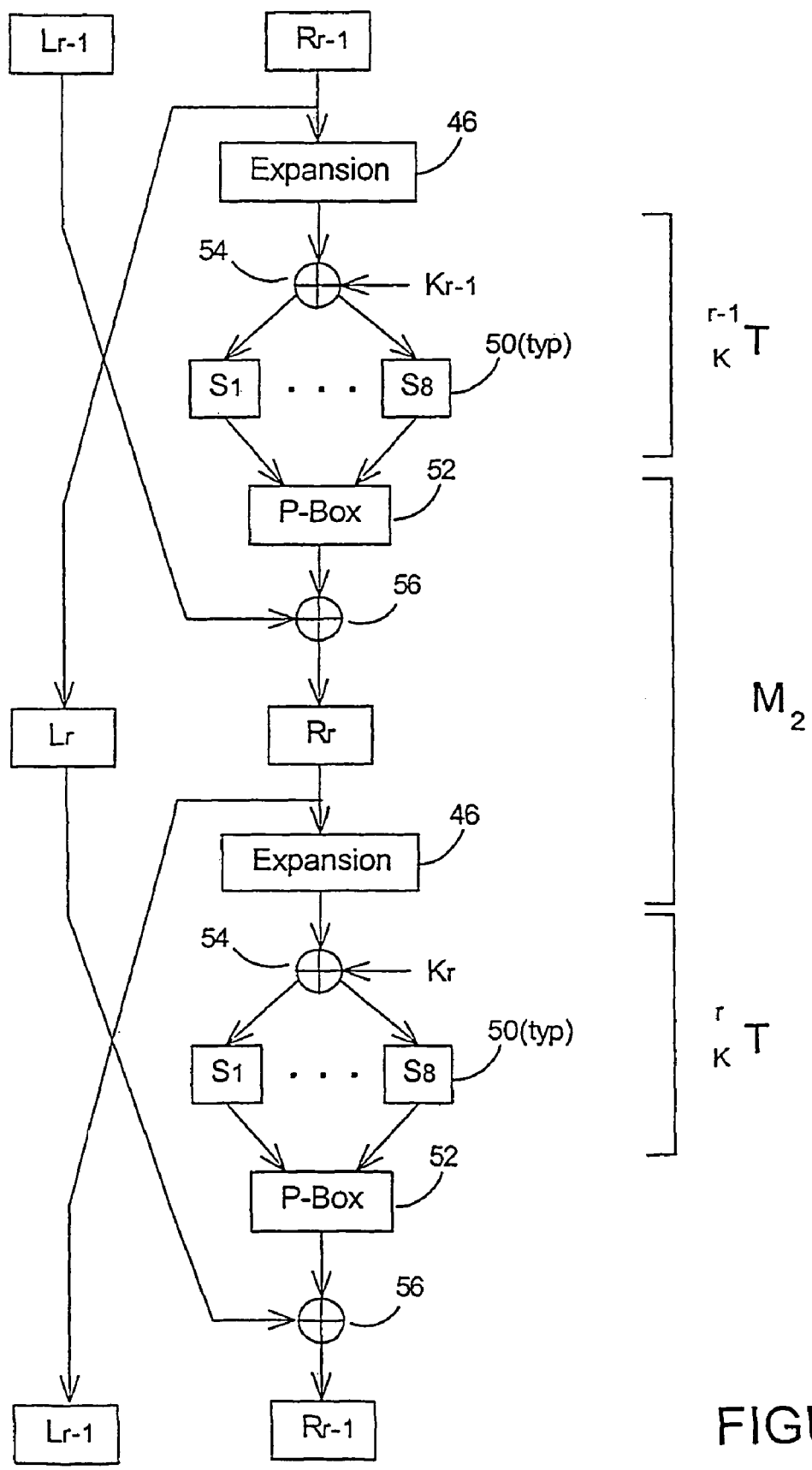
FIG. 9 presents a data flow diagram of two rounds of DES with targeted sections identified, in an embodiment of the invention.

In FIG. 9, an unrolling of two typical DES rounds is presented. The round structure implements a Feistel network with a by-pass left-side data-path (consisting of blocks $L_{r-1}$, $L_r$, $L_{r+1}$) and an active right-side data-path (the balance of the processing blocks).

$K_r$ is the 48-bit subkey for a given round r, which is constant for a particular application. As noted above, DES only uses 48 bits of the 56 bit key in a given round.

This section describes how we replace the DSBs with new SBs so that:

A) the key is eliminated by partial evaluation (it is encoded into the new SBs; see section 3.2.1 above); and B) sufficient by-pass capacity is added per new SB so that all of the remaining connectivity within a round can be carried via the new SBs.

5.1.1 Eliminating the Overt Key by Partial Evaluation

In each round, a DSB's input is the Boolean exclusive-OR (XOR) of 'unpredictable' information, not determined by the algorithm plus the key, and 'predictable' information, determined by the algorithm and the key. This predictable information can be determined in advance, without any knowledge of the unpredictable information.

Hence, we can dispense with the 'predictable' information entirely by modifying the DSBs into new SBs. The reason is that the XOR of the 'unpredictable' information (the argument) with 'predictable' information (a constant) is a bijection (see the last paragraph in section 3.3).

Let us therefore produce new SBs identified as $_K{}^rS_i$, where K is the encryption key, r is the round number, and I is the corresponding DSB number, such that, for any given input, $_K{}^rS_i$ yields the same result as $S_i$ would produce in round r if the DES key were K, but the XORs of the inputs of the original DSBs have been eliminated (see section 3.2.1). Each of the $_K{}^rS_i$ substitution boxes, of which there are 16.times.8=128 (16 rounds, 8 S-boxes per round), is still in $_6{}^4E$ form.

At this point, the overt key K has disappeared from the algorithm: it is represented in the contents of the $_K{}^rS_i$'s. This permits us to remove the XORs ("⊕") with the inputs to $S_1, \ldots, S_8$ shown in FIG. 9.

5.1.2 Preparing the Modified DSBs for Local Security

In grey-box (Smart Card) implementations of DES the DSBs have proven to be effective sites for statistical bucketing attacks (again, see: *Introduction to differential power analysis and related attacks*, 1998 by Paul Kocher, Joshua Jaffe and Benjamin Jun). To make such attacks more difficult for our white-box implementation, we replace the $_K{}^rS_i$'s with new SBs which can be made locally secure (see section 3.3) using suitable input and output encodings. That is, we convert the SBs into .sup.8E form by defining:

$$_K{}^rT_i(_8e) = _K{}^rS_{1(8}e_{1\_6}) \| R(_8e)$$

for all $_8e$, for the fixed key K, for round r=1, ..., 16, for SB number I=1, ..., 8, where we define $R(_8e)=_8e_1, _8e_6, _8e_7, _8e_8)$ for all $_8e$. This is an application of split-path encoding (see section 3.2.6).

The plan is that the first six bits of the input of a transform $_K{}^rT_i$ will be the 6-bit input to DSB I in round r. We then add two extra input bits. Hence, the left 4-bit half of the output of transform $_K{}^rT_i$ is the output of DSB I in round r, and the right 4-bit half contains the first and last input bits of DSB I in round r followed by the two extra input bits. That is, the right half of the output contains copies of four of the input bits.

To see that each transform $_K{}^rT_i$ is a bijection, we note that the function $F_{a,b,c,d}$ defined for any constant bits a, b, c and d by $F_{a,b,c,d}(_4e)=_K{}^rT_i(\langle a \rangle \|_4e\| \langle b,c,d \rangle)$ is a bijection. Every row of every DSB contains a permutation of $\langle 0, \ldots, 15 \rangle$, with the row selected by the bits corresponding to a, b above. The XOR with the relevant bits of the key K effectively re-orders this permutation into a new permutation. The output of $F_{a,b,c,d}$ is therefore a bijection, mapping the $_4e$ according to a 1-to-1 mapping of the input space determined by a permutation. Since $_K{}^rT_i$ simply copies the bits corresponding to a, b, c and d to the output, transform $_K{}^rT_i$ preserves all of its input entropy; that is, it is a bijection.

5.1.3 Providing 64 Bits of By-Pass Capacity

At this point, in order to carry all data from each round into the next, our first thought would be to employ simultaneous by-pass (see section 3.2.7), whereby the eight $_K{}^rT_i$'s in round r would have sufficient capacity to carry all of the information from a previous round into the next round, and each $_K{}^rT_i$ would be locally secure (see section 3.3). The capacity needed is 64 bits, and 8×8=64.

Unfortunately, there are two problems with this idea:

A) this is not enough capacity as some of the DSB inputs are redundant. The 32 bits of the right-side data-path of DES's Feistel network are presented as 48 bits to the DSB inputs by the Expansion transform (see the output of the QPMd Expansion Permutation in FIG. 4 and also in FIG. 9). Hence, even if all of the right-side 32 bits were present, the eight boxes have only 16 available bits left to carry the 32-bit left-side information (eight $_K{}^rT_i$ boxes, with 6 of their 8-bit capacity already required for the right hand side, means 8×6=48 bits for the right hand side and 8×2=16 bits for the left hand side); and B) even if we were to add the extra capacity, simultaneous by-pass would require an 8×8 encoding, but we want 4×4 encodings for matrix blocking. (It is simpler to implement the encoded networks using matrix blocking if we use a constant blocking factor, and finding the required large matrices with invertible blocks is much faster for the smaller blocking factor.) Hence, we need redundancy so that we can recover the original inputs without needing to use an 8×8 decoding.

Since each $_K{}^rT_i$ must be a bijection to support local security, and we will not use 8×8 decoding, we are therefore prevented from using simultaneous by-pass encoding. As a result, each $_K{}^rT_i$ effectively carries only four bits of input to the next round.) This includes two bits from the right side data path of DES, plus the two extra input bits which we can take from wherever we wish. The by-pass capacity of the $_K{}^rT_i$'s is too small by 32 bits.

So we add four more SBs, designated (pre-encoding) as $_K{}^rT_9, \ldots _K{}^rT_{12}$. Each is a linear instance of $^8E$ prior to de-linearization and encoding. They provide the remaining 32 bits: 16 bits of right-side by-pass capacity, and 16 bits of left-side by-pass capacity.

5.2 Connecting and Encoding the New SBs to Implement DES

Figure 10:
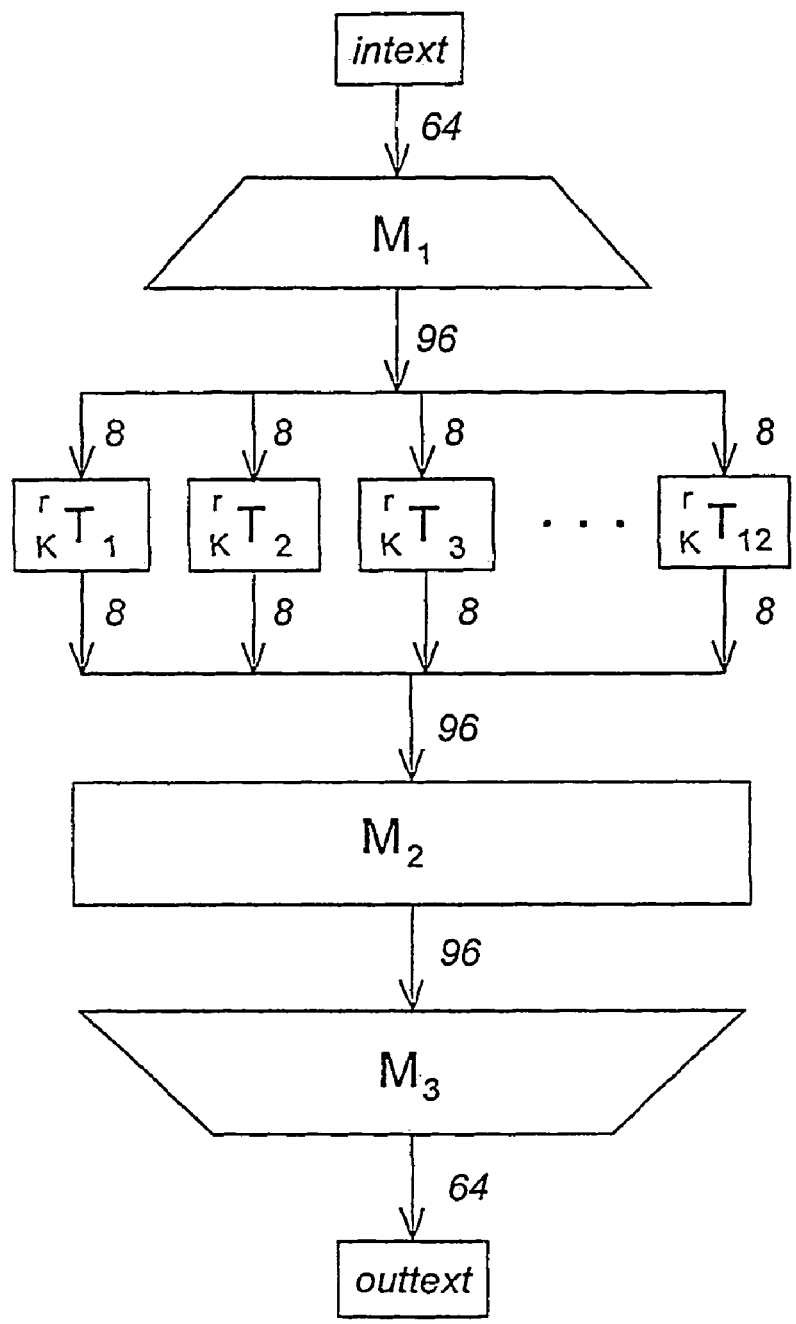
FIG. 10 presents a data flow diagram of two rounds of DES modified in a manner of the invention.

The over-all data-flow structure of our DES implementation immediately prior to de-linearization of LTs and encoding of SBs (see sections 3.2 and 3.3), is shown in the block diagram of FIG. 10.

The data-flow would look just the same after de-linearization and encoding, except that each $M_i$ would be replaced by a corresponding encoded transform $M_i'$ and each $_K{}^rT_i$ would be replaced by a corresponding $_K{}^rT_i'$. Except for the fact that the transforms have been encoded (represented by the "'" characters) it would be identical.

5.2.1 Data-Flow

Before de-linearization and encoding, each $M_i$ is representable as a matrix, with forms $_{64}{}^{96}M_1$, $_{96}{}^{96}M_2$, and $_{96}{}^{64}M_3$, respectively. These transforms and how they are generated are discussed in section 5.2.2.

In FIG. 10, italic numbers such as 8 and 64 denote the bit length of the vectors traversing the data path to their left. Arrows represent data-paths and indicate their direction of data-flow.

The appearance of rows of $_K{}^rT_i$'s in order by I in FIG. 10 does not indicate any ordering of their appearance in the implementation: the intervening $M_i$ transformations can handle any such re-ordering. Let us suppose that there is a re-ordering vector $_{12}z$, where z is a permutation of $\langle 1, \ldots, 12 \rangle$. We define $_K{}^rT = _K{}^rT_{z_1} \| \ldots \| _K{}^rT_{z_{12}}$ for r=1, ..., 16. The $_K{}^rT$'s are defined the same way, but with "'" characters added to the $_K{}^rT$'s. Note that each $_K{}^rT$ or $_K{}^rT'$ is an instance of $^{96}E$.

Without the "'" characters (that is, prior to de-linearization and function encoding: see section 3.2) the modified DES algorithm may be represented in pseudo code as follows:

v=$M_1$(intext)
for
r:=1, ..., 16 loop
v:=$M_2$($_K{}^rT(v)$)
end loop
outtext:=$M_3$(v)

We use the terms intext and outtext in the pseudo code, rather than plaintext and ciphertext, because:

A) the same implementation approach can be used for both encryption and decryption; and B) in some of the scenarios discussed in section 6, neither the initial input nor the final output is a simple plaintext or ciphertext.

The algorithm is the same, except for addition of the "'" characters, after de-linearization and function encoding.

5.2.2 The Transfer Functions

In constructing $M_1$, $M_2$, and $M_3$, we must deal with the sparseness of the matrices for the LTs used in standard DES. The bit-reorganizations, such as the Expansion 46 and P-box transform 52 appearing in FIG. 9, are all 0-bits except for one or two 1-bits in each row and column. The XOR operations ("⊕" in FIG. 9) are similarly sparse.

Therefore, we use the second method proposed for handling sparseness in section 4.1: doubling the implementations into two blocked implementations, with the initial portion of each pair being a 'mixing' bijection. We will regard this as part of the encoding process, and discuss the nature of the $M_i$'s prior to this 'anti-sparseness' treatment.

The following constructions all involve only various combinations, compositions, simple reorganizations, and concatenations of LTs, and are therefore straightforward:

A) $M_1$ combines the following:
  i) the initial permutation of DES (QPMa 38 in FIG. 3);
  ii) the Expansion 46 in FIGS. 4 and 9, modified to deliver its output bits to the first six inputs of each $T_i$; combined with iii) the delivery of the 32 left-side data-path bits to be passed through the by-pass provided by inputs 7 and 8 of $_K{''}T_1, \ldots{}_K{''}T_8$ and 16 bits of by-pass provided at randomly chosen positions in the four "dummy" transforms, $_K{''}T_9, \ldots, _K{''}T_{12}$, all in randomly chosen order.

B) $M_2$ combines the following:
  i) the first P-box transform 52 (see FIG. 9);
  ii) the XOR of the left-side data with the P-box output (the first XOR 56 in FIG. 9);
  iii) extraction of the original input of the right-side data-path using the method of section 3.2.7,
  iv) the second Expansion 46 of FIG. 9; and
  v) the left-side by-pass, as in $M_1$.

C) $M_3$ combines the following:
  i) ignoring the inputs provided for simultaneous by-pass,
  ii) the left-side by-pass, as in $M_1$,
  iii) inversion of the Expansion, ignoring half of each redundant bit pair,
  iv) swapping the left-side and right-side data (DES effectively swaps the left and right halves after the last round), and
  v) the final permutation 40 (see FIG. 3).

5.2.3 Blocking and Encoding Details

We recommend using 4×4 blocking for the $M_i$'s. As a result of the optimization noted in section 4.1 this means that the entire implementation consists entirely of networked 8×4 ("vector add") and 8×8 ($_K{''}T_i'$) Sbs.

Aside from $M_1$'s input coding and $M_3$'s output coding, both of which are simply $_{64}I$ (appropriately blocked), all SBS are input- and output-coded using the method of section 3.2.3 in order to match the 4-bit blocking factor required for each input by the binary 'vector add' Sbs.

5.2.4 Naive and Recommended Variants

The above material completes the naive or 'naked' variant of white-box DES. The recommended variant pre- and post-whitens DES as follows: we use an intext and outtext encoded as a whole using the method of section 3.2.3 (or better yet, similarly encoded but in much larger blocks, with chaining). This completely foils statistical 'bucketing' attacks depending on the control of unencoded bits.

That is, we modify the scheme shown in FIG. 10, so that $M_1$ is replaced by $M_1 \circ M_{\cdot 0}$ and $M_{\cdot 3}$ is replaced by $M_4 \circ M_3$, where the $M_0$ and $M_4$ LTs are 'mixing' bijections. Each of $M_1 \circ M_0$ and $M_4 \circ M_3$ is, of course, a single LT. When it is encoded in 4-bit blocks, it becomes non-linear.

The additional mixing transforms $M_0$ and $M_4$ can be added in separate processing steps after the above is performed.

5.3 Complexity of Attacks on the Naive Variant

In its naive form, where intext is plaintext (for encryption) or ciphertext (for decryption, or outtext is ciphertext (for encryption) or plaintext (for decryption), the DES implementation can be cracked by statistical bucketing. Thus, one should generally avoid the naive form for DES applications. Instead, one should use an encoded intext and an encoded outtext.

The attacker cannot possibly extract information from the $_K{''}T_i'$ transforms themselves as they are locally secure (see section 3.3).

By far the best place to attack our implementation in naive form seems to be at points where information from the first and last rounds is available. In the first round (round 1), the initial input is known (the $M_1$ input is not coded), and in the last round (round 16), the final output is known (the $M_3$ output is not coded).

Attacks should be focussed on the first (1) and final (16) rounds. Cracking either round 1 or round 16 provides 48 key bits; the remaining 8 bits of the 56-bit DES key can then be found by brute-force search on the 256 remaining possibilities using a reference DES implementation.

For an attack on round 1, the attacker should focus on the $_K{''}T_i$ inputs to round 2, and for an attack on the last round, on the $_K{''}T_i'$ outputs from round 15. The attacker then deals with the input or output information after it has been broken up from (round 1), or before it has been merged into (round 16), the 8-bit bundles input to and output from the $_K{''}T_i'$ transforms.

Consider any round 1 DSB $S_j$ in standard DES. Its input is affected by 6 bits of the round 1 sub-key, and two of its output bits affect only one DSB in round 2. We focus on one of these output bits, which we denote b. $S_i$ will then refer to the round 2 DSB which is affected by b.

We make a guess on the 6 bits of sub-key affecting $S_i$, and choose a set of plaintexts, denoted $I_0$, which have the property that if our key guess is correct, bit b will have a value of 0 for the encryption of each plaintext in the set. We similarly choose a set $I_1$, such that if our key guess is correct, b will have a value of 1.

The encryption of the texts in $I_{\cdot 0}$ (resp. $I_{\cdot 1}$) will lead to a set of inputs $I_0'$ (resp. $I_{\cdot 1}'$) to $^2T_{zj}$. The important point is that if our key guess is correct, $I_0'$ and $I_1'$ must necessarily be disjoint sets, whereas if our key guess is incorrect, the elements of $I_0'$ and $I_1'$ $_8$e. We would like the probability that no collision (an element occurring in both $I_0'$ and $I_1'$) occurs in the event of an incorrect key guess to be no greater than $2_{\cdot 6}$. Experimentally, this occurs when $|I_0'|=|I_1'|\approx 27$.

We note that DSB output bits $\{3, 7, 11, 15, 18, 24, 28, 30\}$ have the property that each bit comes from a unique SB and goes to a unique SB in the following round. By tracking these bits, we can search for the sub-key affecting each round 1 DSB in parallel (this requires a clever choice of elements for $I_0$ and $I_1$, because of the overlap in the inputs to the round 1 DSBs). Again, experimentation shows that fewer than $2^7$ plaintexts are necessary in total to identify a very small set of candidates for the 48-bit round 1 subkey. The remaining 8 bits of key can subsequently be determined by exhaustive search.

This gives a cracking complexity of 128 (chosen plaintexts)×64 (number of 6 bit sub-sub-keys)+256 (remaining 8 bits of key)+256 encryptions. This attack has been implemented, and it successfully finds the key in under 10 seconds.

Note of course that this represents a worst-case scenario for a particular DES application. The effectiveness of each method of the invention will depend on the particulars of the specific application, which can easily be analysed.

5.4 Complexity of Attacks on the Recommended Variant

The recommended variant of the implementation uses an intext and outtext encoded as a whole using the method of section 3.2.3 (or better yet, similarly encoded but in much larger blocks, with chaining). This completely foils statistical 'bucketing' attacks depending on the control of unencoded bits.

That is, we modify the scheme shown in FIG. 10, so that $M_1$ is replaced by $M_1 \circ M_0$ and $M_{\cdot 3}$ is replaced by $M_4 \circ M_3$, where the $M_0$ and $M_4$ LTs are 'mixing' bijections. Each of $M_1$ and $M_0$ and $M_4 \circ M_3$ is, of course, a single LT. When it is encoded in 4-bit blocks, it becomes non-linear. This might not seem useful, but as explained in section 6, it is highly effective.

In other words, the "recommended variant" effectively makes the input and output unknown to the attacker by prepending and appending what are, in effect, random ciphers. As a result, the attackers expectations, based on the original cipher, are not met, and the normal statistical approach to an adaptive chosen plaintext attack is foiled. It would be necessary for the attacker to crack:
A) the initial random cipher;
B) the cloaked cipher; and
C) the final random cipher.

However, none of these can be cracked in isolation; i.e. either A) and B) must be cracked together, or B) and C). This makes the combinatorics of the attack very daunting, if not outright infeasible, for the attacker.

An attack on this variant would, by necessity, be complex.

The weakest point would seem to be the block-encoded wide-input LTs. However, it is not merely a matter of finding weak 4.times.4 blocks (ones where an output's entropy is reduced to three bits, say, where there are only 38,976 possible non-linear encodings). The first problem is that the output will often depend on multiple such blocks, which will then require some power of 38,976 tries. Of course, as previously noted, we may guess part of such encoding.

However, we must still deal with the second, and much more difficult, problem, which is: once the attacker has a guess at a set of encodings, partial or otherwise, for certain SBS, how can it be verified? Unless there is some way to verify a guess, such an attack cannot be effective.

6.0 How Useful is it?

It may not be immediately clear that the recommended variant (see section 5.4) of our white-box DES implementation, or white-box implementations of other ciphers using the recommended variant, can be useful. We consider here how such implementations can be made to do useful work.

6.1 Handling Plain Input or Output

Although we noted that the recommended variant employed an encoded intext and outtext, we can, in fact, employ an unencoded intext or outtext. After all, we are computing an invertible function; adding further bijections as pre- or post-whitening will not change this fact, and the result is that we are computing a cipher which embeds DES, rather than DES itself.

As a result, any obvious kind of statistical "bucketing" attack based on properties of DES is foiled.

The price we pay (other than the current slowness and size of white-box implementations) is that we are no longer using a standard encryption algorithm. However, it seems reasonably likely to be as strong as the original algorithm under black-box attack, and is certain to be much stronger under white-box attack.

6.2 White-Box Transaction Processing

From the description herein, it is straightforward to add some decision capability and flow-control and, indeed, to produce a Turing-complete set of operations (i.e. an operation set whose elements can be combined to compute anything which is computable), which nevertheless can be implemented in an input-output encoded fashion similar to our SBS. (The building blocks might be SBS, and networks of SBS, with added interpretive behavioural capabilities.) We can use this to perform file-updates and the like, in such a fashion that we decrypt encoded data to encoded, but usable, form, modify the information, encrypt it to encrypted and encoded form, and store it again.

So long as only small amounts of information enter or leave a transaction in plain form at unsecured sites, and almost all of the information transferred is encoded and encrypted for storage and at least encoded for update at unsecured sites, we can then perform file updates and transaction processing using white-box cryptography in such a fashion that nothing substantial ever leaves the encoded world, although some data at times is not in the encrypted world, except at secured sites. Any substantial decrypting and decoding of information can then be reserved for sites which are very well controlled.

This provides a means whereby software can be protected against insider attacks, particularly at sites which cannot otherwise be well protected by their owners. For example, if we fear military or industrial espionage, transaction processing as sketched above might be a significant help in managing that risk.

6.3 White-Box "Whitening"

It is sometimes recommended to use "pre- and post whitening" in encryption or decryption, as in DESX (for a description, see: *Applied Cryptography*, Bruce Schneier, 1996, 2nd ed., pp. 265-301, John Wiley and Sons, New York). We note that the recommended variant of the invention per section 5.2.4 computes some cipher, based on the cipher from which it was derived, but the variant is quite an non-obvious one. In effect, it can serve as a form of "super pre- and post-whitening".

In effect, it allows us to derive innumerable new ciphers from a base cipher. All attacks on cryptography depend on some notion of the search space of functions which the cipher might compute. The white-box approach increases the search space, generally by a significant amount.

6.4 White-Box Asymmetry and Water-Mark

The effect of using the recommended variant is to convert a symmetric cipher into a one-way engine: possession of the means to encrypt in no way implies the capability to decrypt, and vice versa.

This means that we can give out very specific communication capabilities to control communication patterns by giving out specific encryption and decryption engines to particular parties. By using double encryption or decryption based on a pass phrase, we can arrange that changing the communication patterns requires both a communicated pass phrase and a communicated encryption or decryption engine. And of course, every such engine is effectively water-marked by the function it computes.

It is also possible to identify a piece of information by the fact that a particular decryption engine decrypts it to a known form. There are many variations on this theme.

7.0 Logical Extensions

Many improvements, as well as extensions to other kinds of cryptographic computations, follow logically from the teachings herein. For example, there are clearly improvements that can be made in applying this work to RSA-like computations.

For DES-like ciphers, the blocking technique in section 4.1, while general, is of $O(m_{\#}^2 n_{\#})$ complexity for a fixed bound on SB size. It is clear that other network topologies have potential to improve on the techniques described herein, such as shuffle-exchange topologies (especially irregular ones, for security). Where m=n, for example, these have the potential to reduce the spatial complexity for representing LTs to $O(m_\# \log n_\#)$ for a fixed bound on SB size.

The methods of the invention can also be combined with general methods of tamper-proofing software or applied to software other than cryptographic computation software.

Additional Observations on the General Invention

This section contains comments on the techniques described above regarding white-box cryptography, and alternative approaches.

8.0 Potential Avenues of Attack on Obfuscated DES Implementations

The following properties of the hidden-key DES implementation described in the co-pending patent application filed under the Patent Cooperation Treaty (PCT), and published as no. WO 00/77596, titled: "Tamper Resistant Software Encoding", are potential avenues for attack:

A) connectivity of the T-boxes, in the SIMPLE case (smooth input and output) completely identifies a T-box with a column in a specific S-box;

B) in the ORDINARY case (rough input and output), connectivity still identifies which T-boxes belong to the same S-box, leaving only the problem of identifying the S-boxes;

C) without the random Boolean functions, every output of every S-box in every round appears as a T-box output in either its original form or inverted form;

D) with the random Boolean functions, a sometimes linear, and always simple, Boolean function of 2 or 3 inputs relates bits emitted by T-boxes to original bits. For 2-input Boolean functions, there are only 10 functions which can be used, for example, given inputs A and B, you would have: A AND B, A OR B, (NOT A) AND B, etc. For 3-input Boolean functions there are only 100 functions which can be used.

So it seems clear that cracking the implementation with 3-input random Boolean functions will be well below the expected effort for brute-force discovery of a DES key;

E) the random Boolean functions partition information in a T-box. An information partition is easier to crack than a functional composition; that is, we should be moving the other way, to include compositions of functions in the implementation; and F) the entangling and detangling functions for the ORDINARY case are restricted to a tiny subset of the 64-bit to 64-bit linear Boolean functions. In the above PCT patent applications, we permute and flip the bits only. Therefore, if we write a Boolean function from 64 bits to 64 bits as $F(X)=AX+B$ where X is the input vector of 64 bits, $F(X)$ is the output vector of 64 bits, and A is a 64.times.64 matrix of bits, then our subset comprises all of the linear functions in which A has exactly a single 1-bit in each row, and exactly a single 1-bit in each column. Clearly, there are vastly more non-singular (i.e. invertible) linear Boolean functions that are not expressible in this form than ones which are.

These avenues of attack can be mitigated by use of the techniques described in this patent application.

9.0 General Comments on Boolean Functions from m Inputs to n Outputs

9.1 Information Preservation

A function f is information preserving precisely if it is an injection (is 'one to one'); that is, $f(x)=f(y)$ implies that $x=y$. We are primarily interested in information preserving Boolean functions.

9.2 Linear Boolean Functions from m Inputs to n Outputs

To define a concept of linearity, we need to embed Boolean vectors in a vector space. To make a vector space possible, we need a Boolean field. As described in more general terms above, we use the field $F_2 = <Z_2, +, *>$ where $Z_2$ is the integers modulo 2 (that is, the set $\{0, 1\}$), + is integer addition modulo 2, (which has the same effect as Boolean XOR), and * is integer multiplication (which has the same effect as Boolean AND).

We define a vector space $V_n(F)$ over a field F to have elements in $F^n$ (denoting the order-n Cartesian product of F with itself). We define the product of multiplication of a vector by a scalar as the vector in which each new element is the product of the original element and the scalar in $F_2$. We define vector addition as element-wise addition of corresponding elements.

A linear n-to-n Boolean function F is information preserving if, when F is defined by $Y=F(X)=AX+B$ as described above, A's determinant is nonzero. Since we are in $F_2$, that means that its determinant must be 1.

There are $2^{(n^2+n)}$ linear n-to-n Boolean functions, since there are $n^2$ slots in A and n slots in B to fill independently with either 0 or 1.

For the case of an m-to-n Boolean function f defined by $F(X)=AX+B$, F is one-to-one if and only if n is not less than m, and the set of m columns of A, as a set of Boolean vectors, is the basis of a vector space of dimension m (that is, if the columns as Boolean vectors are linearly independent).

9.2.1 Counting Linear Functions

As noted above, there are $2^{mn+n}$ linear functions with m inputs and n outputs. For the case of m=n, where no information is lost, there are therefore $2^{n(n+1)}$ linear functions and there are $$2^n \prod_{i=0}^{n-1} (2^n - 2^i)$$

non-singular n×n matrices over $F_2$.

However, a linear function also includes a displacement vector; for each of the above matrices, we can choose any of $2^n$ displacement vectors. Hence, the total number of n×n linear bijections (that is, linear permutations) is $$2^n \prod_{i=0}^{n-1} (2^n - 2^i).$$

For example, the number of 2×2 linear permutations is:

$$2^2(2^2-2^0)(2^2-2^1)=4\times3\times2=24$$

Since there are only 24 permutations of the numbers 0 . . . 3 in total, all 2×2 permutations are linear.

An n×n linear function in $F_2$ is singular if and only if, of the n column vectors (or equivalently, of the n row vectors) of its matrix, either at least one is zero, or a subset of the nonzero vectors yield a zero vector when its members are all added together. That is, either there is a zero vector, or there is a subset S of the vectors such that each member is nonzero and each vector bit position is 1 in an even number of the members of S. (For example, the vectors <0, 1, 1>, <1, 0, 1>, and <1, 1, 0> form a linearly dependent set since their sum is <0, 0, 0>.)

To restate the above, an n×n linear function is singular in $F_2$ if and only if there is a non-empty subset S, not necessarily proper, of the column vectors, such that each bit position is 1 in an even number of the members of S.

If a set S of vectors is linearly dependent, then any set of vectors which contains S is also linearly dependent.

9.3 General Boolean Functions from m Inputs to n Outputs

If we consider unrestricted Boolean functions from m inputs to n outputs, there are $2^{(2^{mn})}$ of them. (There are $2^m$ possible input vectors. Corresponding to each, there is a vector of n elements. That gives a total of $2^m$ n slots to fill independently with either 0 or 1. Any difference in any bit produces a different function, so there are $2^{(2^{mn})}$ functions.)

Such a function can only be information-preserving (an injection, one-to-one) if n is greater than or equal to m.

9.4 Permutations

If we restrict our attention to cases of n-to-n Boolean functions, of the $2^{(2^{mn})}$ of them, $(2^n)!$ are permutations of the set of all Boolean vectors of length n (that is, in effect, of the numbers from 0 to $2^n$-1). All permutations are information-preserving (indeed, any injection, and hence, bijection, from a totally ordered set to itself can always be viewed as a 'permutation', and is commonly so called in cryptology), but not all are nonlinear. For example, neither the identity permutation, nor the permutation which inverts every input bit, are nonlinear. In the former, for F(X)=AX+B, A is the identity matrix and B is all zeros. In the latter, A is the identity matrix and B is all ones.

If we consider 2-to-2 Boolean functions, $(2^2)!=24$ of them are permutations. All of the permutations are linear, which can be seen as follows:

In F(X)=AX+B form, there are six non-singular choices for A. For each of these, there are four possible choices for B, so 6*4=24. Plainly, for each choice of B, the effect of B is to perform a permutation, since it at most flips a bit position. Hence, for AX+B to yield a permutation of X, it is sufficient for AX to yield a permutation of X, but the fact that A yields a 1-to-1 function guarantees that it is a permutation. It follows that the 24 permutations of all Boolean vectors of length 2 are identical to the 24 2-to-2 linear bijections in $F_2$.

If we consider 3-to-3 Boolean functions, $(2^3)!=40,320$ of them are permutations of the numbers from 0 to 7. However, there are only:

$$2^{(3^2+3)} = 2^{12} = 4,096$$

linear 3-to-3 Boolean functions in total (ignoring information preservation). It follows that most of the permutations of all possible Boolean vectors of length 3 are nonlinear.

The number of linear 3.times.3 Boolean functions which are permutations is:

$$2^3(2^3 - 2^0)(2^3 - 2^1)(2^3 - 2^2) = 8 \times 7 \times 6 \times 4 = 1,344.$$

The exact number of non-linear 3×3 Boolean permutations is therefore:

40,320 permutations−1,344 linear permutations=38,976.

A choice among them therefore contains about 15.25 bits of entropy. "Bits of entropy" are bits of arbitrary or randomly chosen information. Wherever a given string can have K distinct equiprobable values, then we find the number of bits of information, or entropy, in K, by solving the equation $2^b$=K for b, i.e. b=(log K)/(log 2). In other words, b is the number of bits needed to encode K distinct choices. Referring to the above example, b=(log 38,976)/(log 2)=15.25.

10.0 Adding Extra Non-Linearity to Functions Such as DES

To reduce the added entropy and hence, the size of the subnetworks which provide it, we should favour permutations of 3-bit non-contiguous bit-groups. Each represents a number from 0 to 7, so there are 8 elements and 8!=40,320 possible permutations. However, 3 does not necessarily evenly divide the number of bits for which we need a nonlinear unary operator.

10.1 Building Wider Permutations from Narrower Ones

If we take the 48 bits coming out of the XOR 54 with the round subkey (see FIGS. 4 and 9), then it divides into 16 groups of 3.

Figure 11:
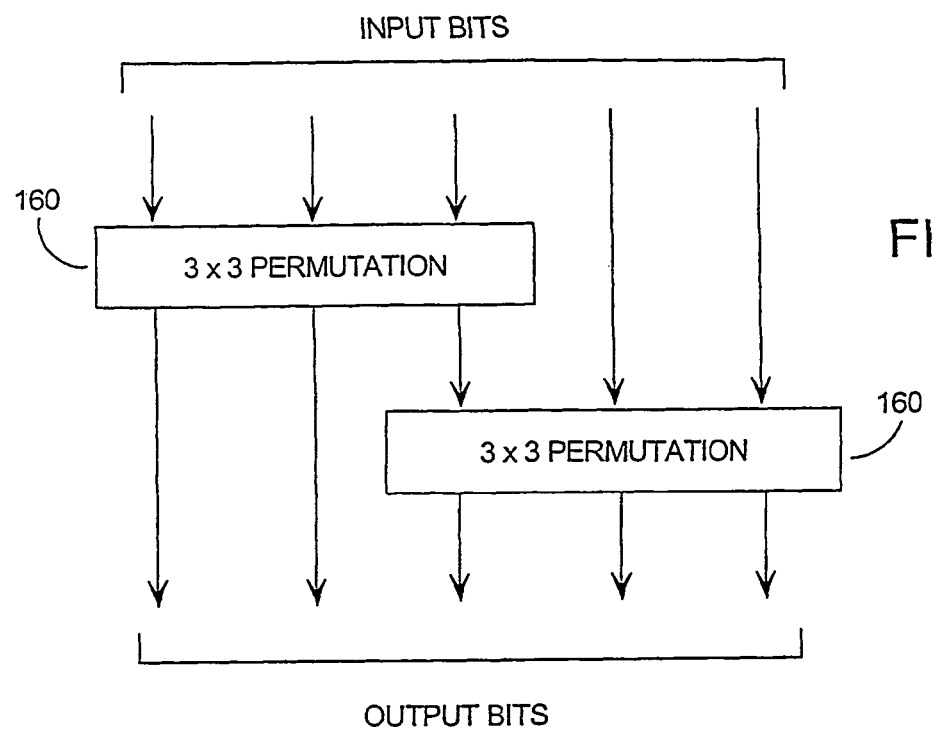
FIG. 11 presents a data flow diagram of a technique for effecting a 5-bit permutation using only 3-bit permutation modules, in an embodiment of the invention.

However, if we take the 32 bits coming out of a round (see the output of XOR 56 in FIG. 4), we need to have one permutation of 5 and 9 permutations of 3. To do this, we can proceed as shown in the block diagram of FIG. 11, where each 'wire' represents one bit of a number, so we can perform a 5×5 permutation using two 3×3 permutation transformations 160. Because we are using separate 3×3 permutations rather than a single 32 bit permutation, clearly this gives us only a tiny fraction of the 32! possible permutations.

In the above, we have 1-bit overlap to produce a 5×5 permutation. Using an overlap of 2 bits as shown in the block diagram of FIG. 12, we could similarly produce a 4×4 permutation using 3×3 permutations 160.

In the case of the 5×5 permutation produced as above, if we restrict each 3×3 sub-permutation to be non-linear, we have $38,976^2/2=759,564,288$ of them. (There are 38,976 choices for each, but there are 2 ways to map two things onto two things for the input bit in the 2nd which is from the 1$^{st}$.)

This gives about 29.50 bits of entropy for a choice among them.

If, instead, we were to use a non-linear 5×5 permutation directly, then we have $32!=2.631 \times 10^{35}$ permutations in all. Of these, the number of linear permutations is:

$$2^5(2^5 - 2^0)(2^5 - 2^1)(2^5 - 2^2)(2^5 - 2^3)(2^5 - 2^4) =$$
$$32 \times 31 \times 30 \times 28 \times 24 \times 16 = 319,979,520 = 3.99 \times 10^8$$

Hence, the linear permutations are a very small fraction of the total, $3.199 \times 10^8$ of $2.631 \times 10^{35}$ permutations.

A choice among the non-linear 5×5 permutations therefore contains about 117.66 bits of entropy, so using the above construction loses about 88.16 bits of entropy, but saves storage space. (Of course, we can apply this same technique with higher numbers; e.g., building a 7×7 permutation from two 4×4 permutations.)

Figure 12:
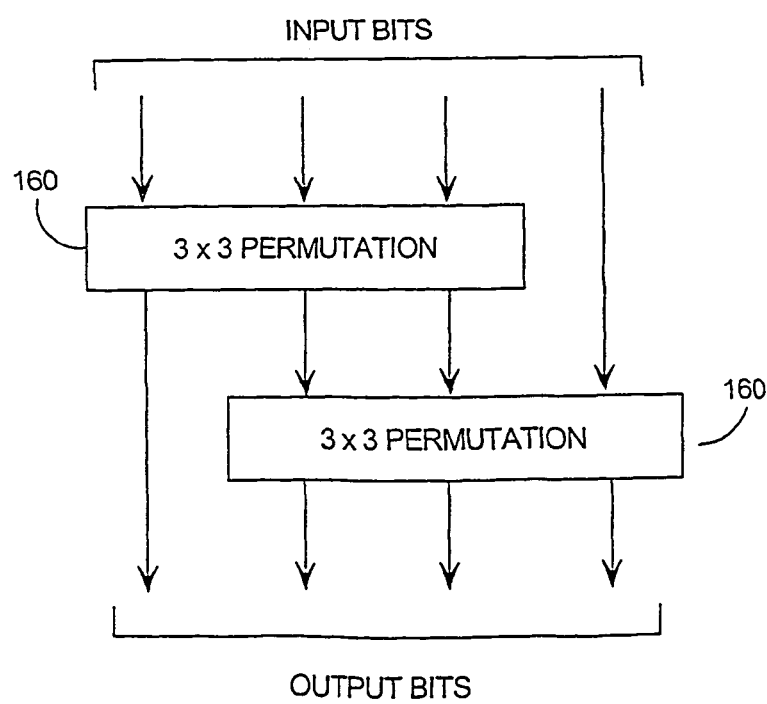
FIG. 12 presents a data flow diagram of a technique for effecting a 4-bit permutation using only 3-bit permutation modules, in an embodiment of the invention.

Similarly, if we use the overlapping of FIG. 12, there are $38,976^2/24=63,297,024$ permutations. There are 38,976 choices for each, but there are 24 ways to map four things onto four things for the input bits (representing numbers 0 . . . 3) output from the 1st and input by the 2nd. This gives us about 25.92 bits of entropy.

If, instead, we were to use a non-linear 4.times.4 permutation directly, then we have 16!=2.092×10$^{13}$ permutations in all. Of these, the number of linear permutations is:

$$2^4(2^4 - 2^0)(2^4 - 2^1)(2^4 - 2^2)(2^4 - 2^3) = 16 \times 15 \times 14 \times 12 \times 8 = 322,560.$$

Again, the linear permutations are a very small fraction of the total.

A choice among the non-linear 4×4 permutations thus contains about 44.25 bits of entropy. So the construction loses about 18.33 bits of entropy, but takes less storage space.

Then to do 64 bits, we use twenty 3×3 permutations and one 4×4. To do 32 bits, we do nine 3×3 permutations and one 5×5 permutation.

The idea is to slice DES so that we have graph cuts at which we compute a function from M bits to N bits. The most obvious case of this is a round pair, which computes a function from 64 bits to 64 bits.

(Each round of DES simply copies the right 32-bit half of its 64-bit input to the left 32-bit half of its 64-bit output, while placing a mixture of the left and right input halves in the right 32-bit half of its 64-bit output. Accordingly, to mix both halves, we have to perform two rounds; one round is insufficient. A "round pair" is typically an odd-numbered round followed by an even-numbered round: 1 and 2, or 5 and 6, or 11 and 12, or 15 and 16.)

We represent the k'th 64-bit slice $S_k$ bit-vector by another 64 element bit-vector, $M_k(S_k)$. Where the old round-pair function was $F_k$, applied as in:

$$S_k+1 = F_k(S_k)$$

the new round function is:

$$M_k+1 \circ F_k \circ M_k^{-1}$$

where we seek to make the composition highly non-obvious and hard to unravel into the above compositional form.

10.2 Banyans and Other Switching-Based Networks for Mixing

Figure 13:
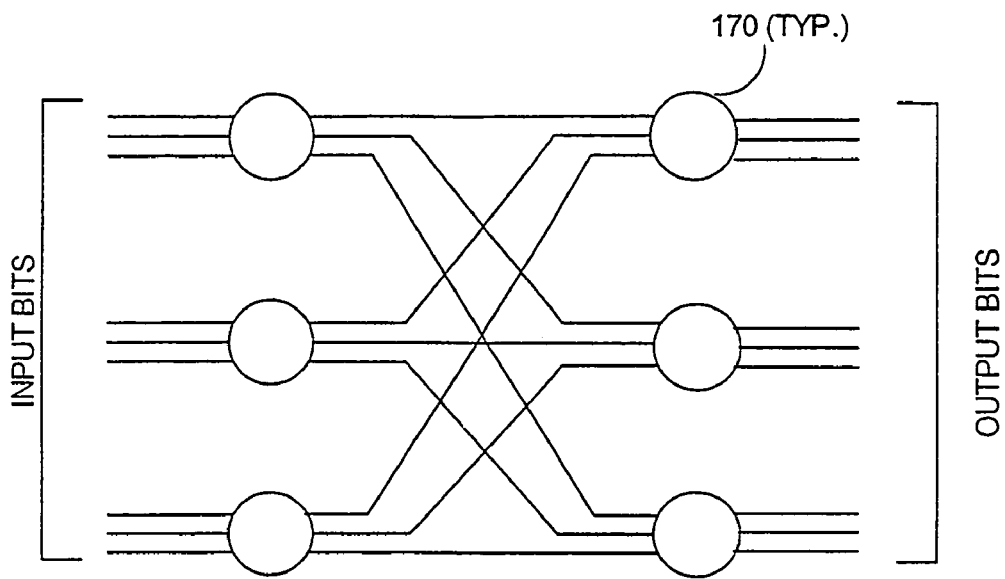
FIG. 13 presents a data flow diagram of an 9.times.9 Banyan Network for data mixing in an embodiment of the invention.

A Banyan network is a topology of nodes or switches in which there is a single path connecting each input to each output, and there are no internal circuits (or loops). FIG. 13, for example, presents a Banyan network having 9 inputs, 9 outputs and 6 nodes 170. This is described as a 9×9 (because there are 9 inputs and 9 outputs), base 3 Banyan network (base 3 because each node 170 or switch can route an input to any one of 3 outputs).

If the switches are replaced with mixing functions in which each output of each node 170 depends on all inputs, then the same topology can be used for white-box cryptography.

A $3^n \times 3^n$ base 3 Banyan network has $n \times 3^{(n-1)}$ nodes and mixes $3^n$ inputs so that every one of the $3^n$ outputs can depend on every input, given suitable choices of functions. That is, if n=2, then there are 6 nodes and the network is 9×9 as shown in FIG. 13. If n=3, then there are 3 layers of 9 nodes, for a total of 27 nodes, and the network is 27.times.27. If n=4, there are 4 layers of 27 nodes, for a total of 108 nodes, and the network is 81×81.

Note that such networks are invertible. Thus, the encoding performed by such a network can be undone simply by creating a mirror network with mirror elements containing functional inverses.

A base 3 Omega network has the same properties as detailed above for a base 3 Banyan network. However, a Banyan network addresses among nodes by repeatedly subdividing the network by the base (e.g., if there are 9 nodes, it first selects among the first third, second third, or third of the nodes, and then selects a third of the three nodes: one specific node).

An Omega network addresses differently. Number the input ports (where each node has a number of input ports specified by the base, and a number of output ports specified by the base) with a 2 digit base 3 number. Then each output port is connected to the succeeding input port found by rotating its number left, circularly, one position.

Other than their manner of interconnection, the networks have very similar properties.

The significance of these networks is that, where, for switching purposes, each node (for a base, b) is a b×b crossbar switch, for our purpose, each node is a function (which would usually be bijective) of the form E.

We can start with linear node-functions, and de-linearize them by the methods previously described in section 3. This is an alternative to the blocking method for representation, but restricts us to a subset of the linear functions which can be so represented.

The big advantage is the reduction in spatial complexity from $O(m_\#^2 n_\#)$ for a given blocking factor, to $O(m_\# \log n_\#)$: a huge savings in space. It also represents the same reduction in computational time, because a lookup must be done on each SB, and the huge reduction in the number of SBS therefore also represents a huge saving in execution time.

10.3 Compact m×n Nonlinear Boolean Functions

As noted above, memory capacity may be severely restricted and inflexible, as in the case of Smart Cards. Thus, techniques which optimise memory usage and still offer proper protection, are highly desirable.

Method I was already described above under section 4.1. Methods II and III proceed as follows:

10.3.1 Method II: Encoding of Bit-Position Permutation Functions Composed into a Bit-Position Permutation Network We can take a series of elements which take in n bits and output n bits, where each output bit is equal to one of the input bits: a bit-position permutation, such as a P-box in DES.

We can perform arbitrary permutations of bit-positions using elements such as 4×4, 3×3, or 2×2. However, encodings of 2×2 functions are all linear, so let us restrict our attention to those which are at least 3×3.

We can then encode the inputs and/or outputs so that the resulting functions are non-linear.

When an entropic repositioning is performed in this way, and can be expressed, before encoding, in this form, then if we use switching elements each of which permutes some relatively small number of bits (but 3 or more) bounded above, the space and time complexity of the encoded network is on the order of (n log n). This is much smaller than the quadratic order of the implementation of the same kind of function using Method I.

10.3.2 Method III: Encoding of Small Linear Functions Composed into a Network with Arbitrary Acyclic Connectivity This is a variant of the above, which includes all of the capabilities of Method II but increases the ability to handle compressing functions (m×n functions in which m is greater than n) and mixing functions where each output bit is to depend on many input bits.

In this variant, instead of small bit-position-permuting functions, we use small linear operations, possibly compressing ones (m×n where n<m) and we encode their inputs and outputs (thus making them nonlinear). For example, if we connect them into a Banyan network of the appropriate base, we still have an n×n function, but we can make every output dependent on every input in a network of space and time complexity of order (n log n).

The more we increase the depth of such a network, the greater the entropy added and the less restricted are the functions we can compute. Since we can encode an XOR in this fashion, we can therefore compute an arbitrary Boolean function using such a network. (XOR is a "complete" Boolean operator: any Boolean function can be computed by a direct acyclic graph containing only XOR nodes.) However, the size of network required (e.g., as prime implicants) varies on the order of ($2^m$ n).

Thus, in the worst case, there is no improvement in representational compactness compared to the full bit-tabulated representation, and on the contrary, there is an increase in overhead.

10.4 Mixing Entropy Among Nodes in a Network of Boolean Functions: Domain Partitions Induced by Functions If we consider a function from m to n, where $n \geq 2$ and m>n, we have: F:D→R where:

|D|=m; and
|R|=n;
then there is a partition $P=\{P_1, P_2, \ldots, P_n\}$, such that:
D is the union of the $P_i$'s;
the $P_i$'s are disjoint; and
for each $P_i$, there is a unique element r of R such that
$P_i=F^{-1}(\{r\})$. That is, each $P_i$ is the pre-image of a unique element r of R.
Let us call P the "domain partition of D induced by F".

If we are given D, R, and P, then there are exactly n! functions F such that F: D→R and the domain partition of D induced by F is P.

Now, it is plain that for any two such functions, say F and F', there exists a bisection:
B:R→R, such that:
F'=B∘F and
F=$B^{-1}$∘F'.

Interesting and potentially useful situations arise where we can choose a B and F such that F is linear or can easily be constructed by simple non-linear functions on linear functions. This is because we know how to break a linear function down into a network which we can then non-linearize (see Method I in section 4.1 above, for example).

The use of this kind of breakdown of a function is: given a reference implementation, and a domain D which is of searchable size, we have some hope of duplicating the reference implementation, but in a fashion which distributes the entropy and functionality quite differently from the reference implementation.

For example, if we consider any 4 bits produced as an output of the P-box permutation in DES, it is the function of somewhere around 24 bits of input given a specific key and round. If we can implement this function by breakdown into a simple nonlinear function of linear components followed by a bijection, we can break it down into a network in which multiple partial S-box lookups have been smeared together. A particular way of doing this for S-boxes is presented in section 10.5.1.

Note that the above transform uses m>n. This is done because it is advantageous to change the number of input bits and output bits in a known construction, such as a DES S-box. If we do not, then irrespective of what bijective encodings we apply to the inputs and outputs, the attacker at least knows which sets of inputs produce exactly the same output. This can reduce the number of possibilities the attacker must consider, thereby speeding up the cracking process.

10.5 Moving Entropy with Full Data Dependency

10.5.1 The 'Red Path' Method

We often encounter the following sub-problem of the larger problem of cloaking cryptographic and other functions:

we have a series of nodes with individually coded outputs;
the outputs encode certain numbers of bits, so that the uncoded outputs separate the output information into specific bits;
we have a series of nodes (possibly the same as the above nodes) with individually coded inputs;
the original functionality required information to be moved in a bitwise basis, or at least in small lots, so that information from specific bits of information in the outputs arrive quite differently combined at the outputs; and
we want to move information via some network from the previous outputs to the next inputs, such that the desired reconfiguration of the needed information occurs, but such that the attacker cannot determine how it moved.

Plainly, any approach to the above problem cannot simply narrowly move the information in small bundles, individually switched—it would then be possible to tell exactly where the information moved, which is giving away too much information. Ideally, we would like every output of the switching network to depend on every input of the switching network (where the switching network's job is to reconfigure the information according to a needed switching function).

What we want is a switching network with the following properties:

necessary information enters the switch at pre-specified points in such a way that it is locally decodable at the switch inputs;
necessary information is decodable with information locally available at the switch outputs; and
notwithstanding the above, there is broad dependence of switch outputs on all switch inputs.

This results in a big switching network which sends lots of bits in many directions. Some of the inputs and outputs are relevant to the underlying computation, and some are there for the purpose of obfuscation. The paths from relevant input bits to relevant output bits are referred to herein as "red paths". All of the other paths are present, but irrelevant. That is, the non-red paths are the ones which are present for obfuscation and the red paths are the ones we actually need to do useful work.

Figure 14:
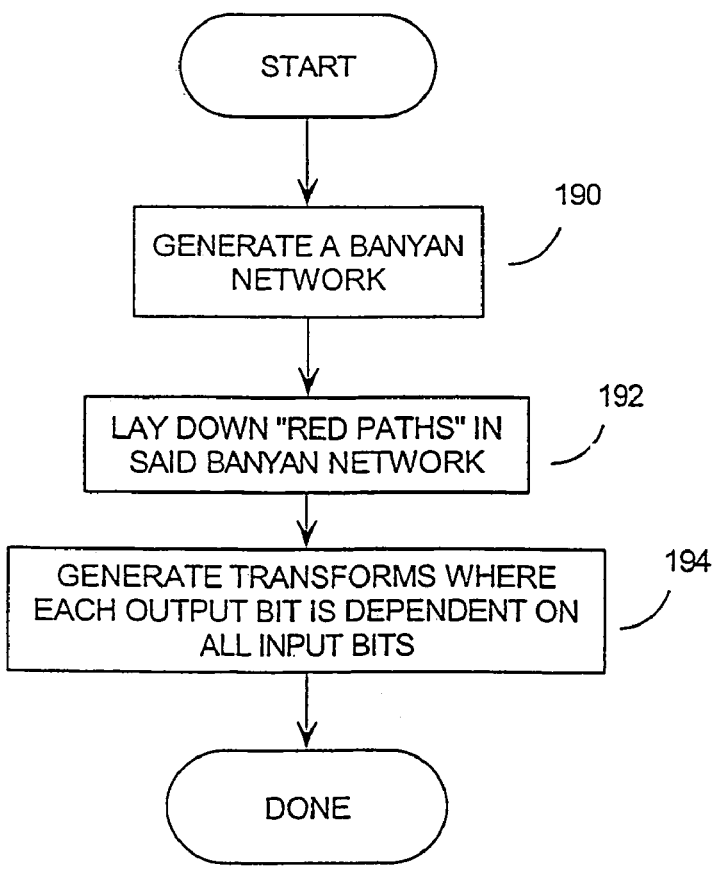
FIG. 14 presents a flow chart of a method of "red path" encoding in an embodiment of the invention.

The proposal on how to do this is presented briefly in the flow chart of FIG. 14. Firstly, a switching network is generated at step 190; say a sequence of K full Banyans for bundles of bits, where K is fairly small. Next, at step 192, the "red" paths are laid down on this switch network, which indicate the bundle path followed by the information to be switched. Finally, the boxes may be filled in at step 194, such that individual output bundles (or small groups thereof) encode desired output information, but the particular encoding of many used at a particular bundle is a data-dependent function of all of the switch inputs. In particular, in any node within the switch, every output bit should be dependent on every input bit. One should also verify full dependency over longer paths.

It would not be necessary to exactly use Banyans, but we do need full connectivity, probably multiple times.

Alternatively, one could lay down simple functions in the switch nodes (e.g., bitwise XOR). This would allow switching and computing to be encoded together.

10.5.2 The Big Bundle Proposal

Figure 15:
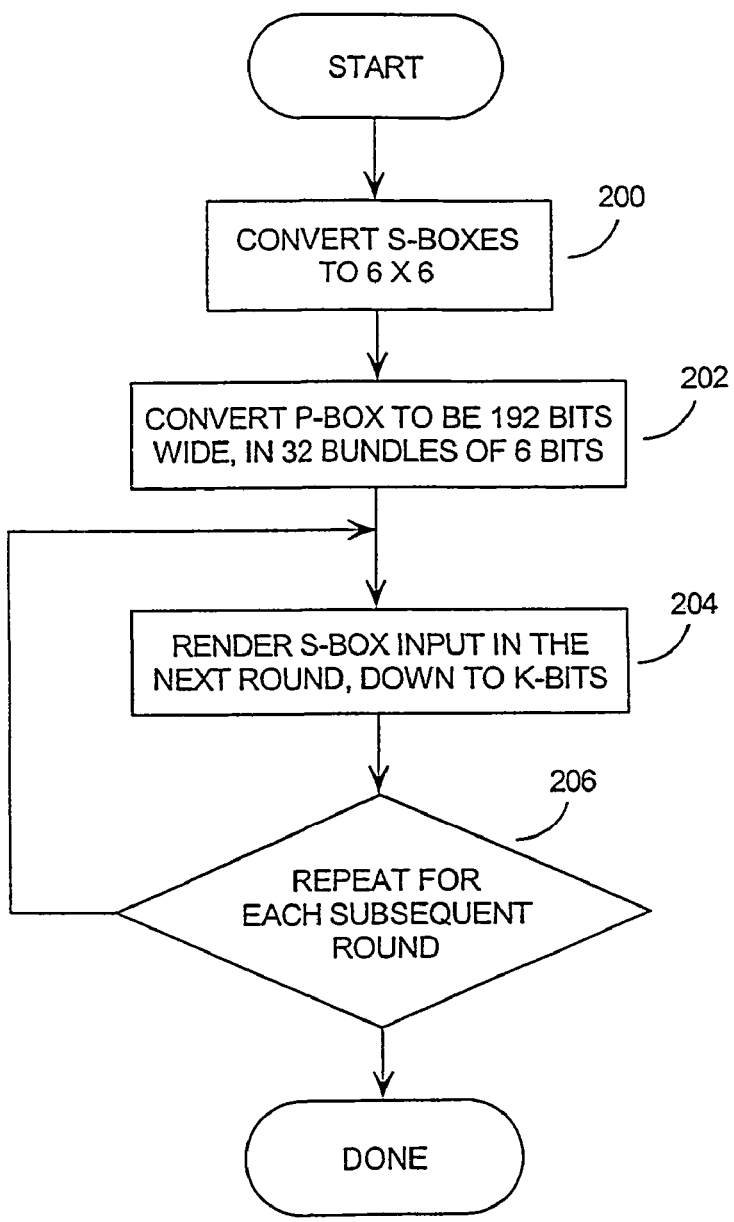
FIG. 15 presents a flow chart of a method of "big bundle encoding" in an embodiment of the invention.

Another approach to the protection of a standard DES algorithm is presented in the flow chart of FIG. 15. Implemented carefully, this technique can protect against some statistical bucketing attacks.

First, at step 200, the initial S-boxes 50 are convert from their 6 bit input, 4 bit output form, to 6×6, each modified S-box simply containing a permutation of 0 . . . 63.

Next, at step 202, the initial P-box 52 is converted to accommodate the 6×8 input bits from the S-boxes modified at step 200, and to provide an output 32×6=192 bits wide in 32 bundles of 6. In other words, the full 6 outputs of an S-box are used wherever one bit of the S-box would be required.

At step 204, the 36-bit S-box input in the 2nd round is rendered down to k bits, where k≧6. This step must be done such that any imbalances in the round-1 S-boxes are overcome; that is, trying to make the buckets equiprobable. This step is then repeated for each subsequent round of the DES algorithm, per step 206.

This technique does not hide the identity of the S-boxes 50, but only hides the key. If we can preserve the secret of the interior coding, then this technique may be effective.

However, if k>6, then a bucketing attack can identify the input values representing the same value. To prevent attack on the bucketing of the outputs of the S-boxes, we must make the implementation balanced. That is, we cannot divide codings into S-box output buckets evenly. We should arrange the buckets so that the imbalance of the S-boxes cannot be used to mount an attack.

This should also be done with consideration for avoiding the leakage of information due to the relationship among the S-boxes at each round, or among rounds.

11.0 The Information Reconfiguration Problem

An important recurring problem in implementing m×n Boolean functions by networks is the information reconfiguration problem, which is the problem of how to reconfigure the distribution of entropy between the inputs and outputs of a function, or its realization by a network, while preserving an acceptable level of security in the data encodings employed.

11.1 The DES P-Box Example

Exemplary instances of the information reconfiguration problem are the implementation of the Expansion permutation QPMd 46 or P-box permutation 52 in DES.

Figure 16:
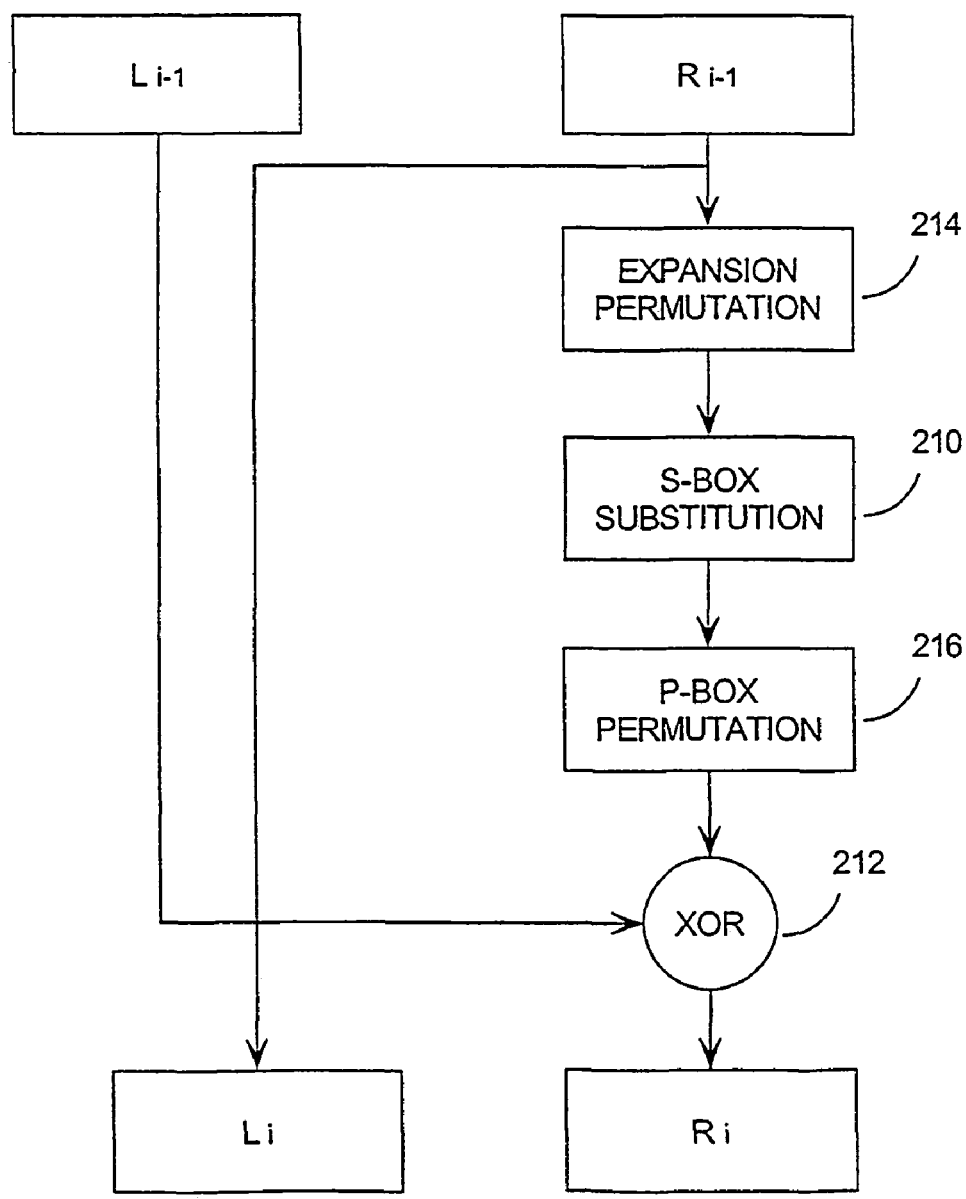
FIG. 16 presents a data flow diagram of a technique for addressing the information configuration problem, in an embodiment of the invention.

If we partially evaluate the S-boxes 50 with respect to the key, then a DES round may be presented per the block diagram of FIG. 16.

It is fairly easy to protect the functions represented by the S-box substitution step 210 and the XOR step 212.

For example, for the XOR 212, if we use 8×4 substitution boxes, where four of the eight inputs come from the left side and four from the right, so that we have, in effect, two 4-bit inputs and one 4-bit output, and if we encode the 4-bit inputs and the output independently using bijective mappings, then there are $(16!)^3$ distinct implementations of an encoded XOR function, the vast majority of which are non-linear. It seems unlikely that an efficient attack can be mounted at the XOR substitution boxes.

Then if, for the S-boxes 210, we use 6×6 boxes, each providing a bijection, where there is a 6×6 bijective encoding of the input, and a 6×4 decoding for the output, then each S-box 210 is unconditionally secure by itself, since each S-box table is a permutation of the numbers 0 . . . 63 and by manipulating either the input or output encodings we can produce any arbitrary permutation in the table.

This leaves the problem of modifying the expansion permutation 214 and the P-box permutation 216 so that the values actually traversing the transformed network do not reveal the underlying values which they represent. This is a more complex problem and is addressed in section 11.2.

11.2 Sample Application: DES

Figure 17:
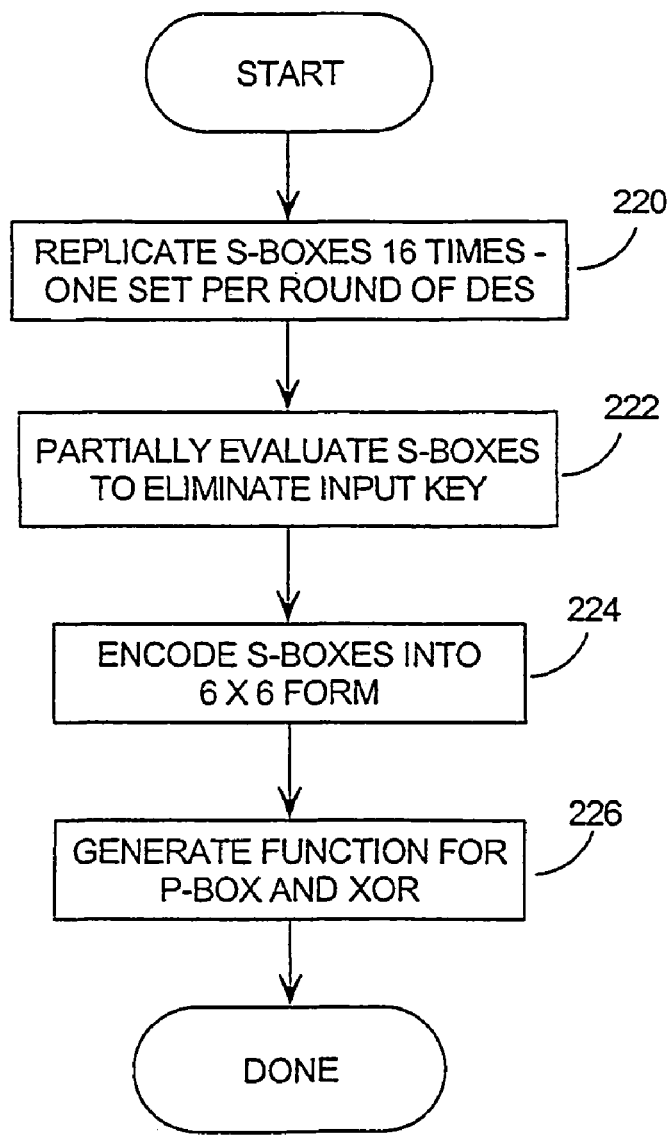
FIG. 17 presents a flow chart of a method of addressing the information configuration problem, in an embodiment of the invention.

Now, let us consider a specific DES example. Referring to the flow chart of FIG. 17:

First, we take all eight DES S-boxes 50 at step 220 and replicate each S-box 50 sixteen times so that we have a complete set of eight S-boxes for each round of DES. Then for each round, we partially evaluate at step 222, so that the key information is eliminated by changing the contents of the S-boxes 50.

We make no attempt to disguise the inputs of the 1st round of S-boxes 50. However, we encode the outputs as 6-bit values, rather than the 4-bit outputs of the original S-boxes 50. We can do this so that the contents of each round 1 S-box contains a table which is simply some permutation of the numbers from 0 to 63 (because $2^6=64$). Hence, the S-boxes 50 are "unconditionally secure" with respect to the key bits folded into them. Note that the output bits contain all of the entropy of the input bits.

To make this happen, we preferably encode S-boxes 50 at step 224 as follows: we first create a 6×.6 S-box by making the low-order 4 bits of output the same as the unencoded outputs, and prepending the two row selection bits. Since each row is a permutation of the integers from 0 to 15, and hence, encodes a 4×4 bit-vector bijection, this guarantees that no entropy is lost. We then encode the resulting 6 bits arbitrarily using an arbitrary non-linear permutation of 0 . . . 63, and fill the table accordingly.

To get to the next round, we need to do the following: to model the P-box permutation 52 followed by the bitwise XOR 56 with the left side, and emitting the new left side (a recoded version of the incoming right side and the new right side—the output of the bitwise XOR 56).

We note that the function taking us from one round to the next in the original implementation is an 80×80 bit-vector function. If we decode the 6×6 S-box outputs before input to this function, and code them again for the outputs, then what remains between the decode and the encode is a linear 80.times.80 function, since the XOR 56 is plainly linear, the P-box 52 is linear, and the composition of linear functions, or a concat combination of linear functions, are also linear.

A bit-wise XOR of two n-bit vectors is computed by a matrix of n rows and 2n columns where we multiply the matrix by the concatenation of the two input vectors, and the result is the output vector. The k'th row of the matrix has (k−1) binary 0s followed by a 1, followed by n binary 0s followed by a 1, followed by (n−k−1) binary 0s. In general, for permutations of the inputs and outputs, the matrix would have linearly independent rows in which each row contained only two 1's and each column contained only a single 1.

12. Reconfiguring Substitution Boxes

12.1 Combining S-Boxes in DES

S-boxes 50 in DES can be arranged into a ring, in which each S-box 50 shares two (pre-expansion permutation) inputs with its neighbour to the left in the ring, and two (pre-expansion permutation) inputs with its neighbour to the right in the ring.

Hence, any pair of neighbouring S-boxes 50 can be combined into a single new S-box which has ten inputs and eight outputs. The size of such an S-box is 1K bytes, but we only need 4 of the new S-boxes per round, so 4K bytes provides all of the S-boxes needed for one round.

If we output a mixing linear map of the output, we can still do the XOR and get to the next round via a single 64-input M-box (see FIG. 10 and section 5.4).

12.1.1 Summary of DES S-Box Hiding

The work on hiding S-Box lookups and DES in general can be summarized with the following key observations:

A) we can split a T-Box lookup into 2 pieces (note that we are going to end up with T-Boxes that are far more complex than those described in the co-pending patent application publication number WO 00/77596, referred to above):
  I) 5 bits into 2 bits (basically, the two possible output bits for the two different choices of the 6th bit); and
  ii) 2 bits from above and 1 original bit to produce T-box result (basically, the new bit chooses one of the bits from step a.
  We could also:
  I) share 2 bits between the next 2 steps;
  ii) 1 new+2 bits into 1 bit;
  iii) 1 new+2 bits into 1 bit (where the 1 is different); and
  iv) combine the result of ii) and iii) together to form result. This could also be done with more than 2 bits out from steps ii) and iii).
B) S-Box inputs overlap in that two neighbouring S-Boxes will share exactly 2 inputs. This means we can use an 8-input table that will have 5 inputs each for a pair of neighbours.

After unravelling the permutation:

| S1 has inputs | 3 4 5 6 | 7 8 | | |
| S2 has inputs | | 7 8 9 10 | 11 12 | |
| S3 has inputs | | | 11 12 | 13 14 15 16 |

I) the simple way is to have a ring of 8 S-boxes, each S-box computes four partial results, two for each of the neighbours. We can arbitrarily choose which two from each S-box, evaluating the partial results later. That is:

| S12' has | 4 5 6 7 | 8 9 10 11 | |
| S23' has | | 8 9 10 11 | 12 13 14 15 |

Observe that S12' has 5 of the inputs for S1 (missing 3) and S2 (missing 12). Each T-box output could be computed in two places, but we do not have much freedom to choose—we can partition the 4 outputs of an S-box to the two S-boxes, but that fixes the distribution for the whole ring. (Instead of 2, 2 we could do other distributions; but since we only get to choose once for the whole ring, it is not clear what we gain by security).

ii) the complex way to have a ring of 16 S-boxes is as follows:

| S1' has | 2 | 3 | 4 5 | 6 7 | 8 9 | | | |
| S12' has | | | 4 5 | 6 7 | 8 9 10 11 | | | |
| S2' has | | | | 6 7 | 8 9 10 11 12 13 | | | |
| S23' has | | | | | 8 9 10 11 12 13 14 15 | | | |

This has the property that each T-box output can be computed in three different places and we have a lot of freedom to decide where each T-box is actually computed. On average, we could compute each T-box in 2 parts, to be combined later.

Note that this wiring pattern is dictated by S12' having 5 inputs for each of S1 and S2;

C) any function in general (and S-box in particular) can be split into multiple paths. For example, a T-box can be split into 2 paths by defining T1 to be random, and T2 to be T XOR T1;

D) S-box output can have codings that are dependent on other bits. We merely need to bring together the necessary bits to interpret. For example:
  i) in the case of S1, the output is already depending on bits 3-8, if we compute it in S1', we could code the output to be XOR bit 2;
  ii) we could chose the output of S1 to be split between S1' and S12'; and code the first part with bit 2, the second part with bit 11.

E) coding of a bit can be really complex. In the co-pending patent application published under serial number WO 00/77596, we described the use of bit-permutation and bit-flipping. The next step is to use functions like:
  b2'=b1 XOR b2
  and we can even do things like:
  b1'=b2 if b4=0
  b3 if b4=1

F) in the construction, there are lots of excess connections and computations, we should maximize the use of them as the "controllers" for dependent codings.

Thus, the plan as seen by attacker (using the B) ii) complex variant), is as follows:

A) everything is done by 8-input, 8-output boxes (call them T8 boxes);
B) from Smooth input: each of L and R goes through a network of T8 boxes and will end up as a group of bits in coding C1. C1 will probably expand from 32 bits to maybe 50 bits;
C) for each round, do the equivalent of E:
  take the R' bits (in C1), through a big T8-box network ending up in 16 bundles of 8 bits (in C2). This can be shared for all rounds;
D) per round S-box:
  16 S-boxes, each taking a bundle of 8 bits (in C2), each returning 8 bits (in C3). These S-boxes will have key bits embedded;
E) for each round, do the equivalent of P+XOR:
  take the L' bits (in C1) and the outputs of the S-boxes (in C3), go through a network to do the P-box and XOR, ending in the new R' bits in C1; and
F) for each round:
  switch the new R' and L' (both in C1)

The codings used in this system are as follows:
C1 is the "nominal" representation across round boundary, and has two copies in L and R; so it can be attacked from several ways, but it is also has the least constraints in that each Rough bit could be a function of all Smooth bits.

C2 is basically 16 independent codings—one for each S-box input. The dependencies are confined to within each bundle (not strictly true—we could in fact carry over the missing dependencies to our output coding). Within a bundle, the mapping can be arbitrary.

If the bundles share some bits, it is probably better to produce multiple copies, one per bundle, so that they are coded independently.

C3 is basically 16 independent codings—one for each S-box output. The dependencies are confined to within each bundle (possibly inheriting missing dependencies, see C2). Within a bundle, the mapping cannot be arbitrary since we need to be able to route information to follow DES.

How to execute the entire method:

A) build the Smooth data-path in S-boxes:
  i) start with a ring of 16 S-boxes, the Smooth inputs are forced by observation B) ii);
  ii) assign Smooth outputs. For each Smooth output, assign place(s) in S-boxes. There are several choices:
    1) put the whole output into one of the three S-boxes that can compute it;
    2) split and put each part into a (possibly) different S-box. Note that we are somewhat constrained in that if we choose to split every single T, see observation B) I). It is probably best to randomly choose, with something like 75% chance of splitting, that gives us good flexibility in locally assigning T to S', and makes it harder for the attacker;
  iii) pad unused outputs. If there are any output slots left, assign a random (but real) T-box.

B) assign S-box codings:
  i) assign output coding:
    for each Smooth output, pick a coding. Preferably, the coding should depend on between 1 to 3 other bits (preferably, output bits of the S-box but could be input bits as well), taking care that we can decode back to Smooth bits.
  ii) assign input coding:
    for each Smooth output, pick a coding. See above for constraints.

C) build E' network:
  i) start with the output layer. Since we need to produce C2 (assuming we duplicate shared bits), we will need 16 T8-boxes. We will build layers towards the input until we end up at C1;
  ii) pick up C2 for each output bit, and drag in the bits necessary to decode;
  iii) count up the inputs we need for each T8-box, some will want more than others. Pad them out so that the numbers are not too different. It is probably useful to make sure every T8-box gets at least one extra input. Note selection of these extra inputs is interesting;
  iv) for each T8-box that has more than 8 inputs, insert intermediate T8-boxes, trying to minimize the depth (this is kind of like a 2-3 tree type problem). Remember to add some extra inputs; and
  v) connect the topmost layer inputs to the R' bits.

D) build P'+XOR network. This is done more or less the same way for E' except that we have mark out some place to do the XOR. Preferably, the XOR should happen at different levels for each bit.

12.2 Splitting Substitution Boxes

Another way to add confusion in an implementation involving substitution boxes is to split one substitution box into multiple boxes, such that none of the boxes created by the split has sufficient information to compute the original pre-split result, but the information from their combined outputs is sufficient to compute the original pre-split result, assuming that we know how their outputs are encoded.

12.2.1 Example: Splitting a DES S-Box

Every S-box, say box B, in the original DES implementation, or the DES implementation after S-boxes have been modified by folding the 6-bit portion of the round subkey relevant to that box, has inputs made up as follows:

A) 2 bits go to B alone;
B) 2 bits are shared with box A; and
C) 2 bits are shared with box C.

where A, B, and C are distinct S-boxes.

In the initial rounds, the path of the input bits clearly identifies the S-box, making it very easy to determine which box is which.

Let us ignore the sharing above and consider splitting one S-box in isolation, without worrying about shared connectivity.

We have a 6×4 S-box, S. Let us make an U-box, U, and a V-box, V, as follows: U and V are 6×4 substitution boxes. U takes three S-inputs and three inputs not from S. V takes three S-inputs and three inputs not from S. U and V do not share any input bits. We want to be able to determine the S-output vector from the U-output vector and the V-output vector.

We note that, given the value of the U inputs, there are then $2=8^3$ possible output values (not necessarily distinct) depending on the value of the three S-inputs which go to V but not U.

Hence, as a first approximation, for a given input vector, U can output:

$$<R_0, R_1, \ldots, R_7>$$

where: $R_i$ is the result expected if the value of the three missing inputs (attached to V rather than U) is I.

If we concatenate all of the R's, we have a 32-bit output.

For V, we can have V output the index I, a number in the range 0 . . . 7, used to index into the 32-bit output of U to select a particular 4-bit block within it. (This has the bad effect of producing one invariant V-output, which we do not want because it narrows the attacker's search space.)

Of course we would want to encode all of the inputs and outputs: the above situation would be a pre-encoding situation. However, even as a pre-encoding situation, it is not good, because U and V each have three "do not care" inputs: bad news. This kind of situation is highly detectable just by looking at the U-box and V-box tables. This gives away too much information narrowing down the attacker's search space.

Let us modify it: we have U output the concatenation of the elements of:

$$<R_0, R_1, \ldots, R_7, E>$$

that is:

$$R_0 \| R_1 \| \ldots \| R_7 \| E$$

(a 38-bit U-output vector) where the R's are as above, and E (for entropy) is simply the entire U-input vector. (We make E be the full U-input vector because we do not know whether the R-portion of the U-output is different for each distinct input vector. Hence, unless we make E the full six input bits, it may lose information.) Now U is non-lossy: there are no do not-care inputs. Moreover, full entropy is preserved across all outputs, even if it would not be preserved by S. Hence, no information can be deduced from the way entropy is lost: it is not lost.

In the same spirit, we have V output I∥j where I is the 3-bit value in the range 0 . . . 7 used to index into an R sub-string of the U-output vector, and j is the remaining three bits. As a result, V is likewise entropy-preserving.

```
S1 has inputs   3 4 5 6 7 8
S2 has inputs         7 8 9 10 11 12
S3 has inputs                  11 12 13 14 15 16

Split as
follows:
                3 4 5 6 7 8
                      7 8 9 10 11 12
                               11 12 13 14 15 16
                |-------A----------|
                          |----------B-----------|
```

Thus, we can make an A-box with 8 inputs and 8 outputs, which narrows its left overlapping original box to one of two and the right overlapping original box to one of two possibilities. We know we can represent the A-output in 8 bits since only 8 bits went in.

We can also make a B-box with 8 inputs and 8 outputs, which narrows its left overlapping original box to one of two and the right overlapping original box to one of two possibilities. We know we can represent the B-output in 8 bits since only 8 bits went in.

We can use overlap, or avoid overlap. If we use overlap, note that we have four bits of overlap—enough to narrow down the alternatives to four.

Alternative overlap is:

```
                3 4 5 6 7 8
                      7 8 9 10 11 12
                               11 12 13 14 15 16
                |--------A---------|
                        |-------------B------------|
```

Now there are 5 bits of overlap between A and B, enough to narrow down the possibilities to two.

While the above description is mostly concerned with the DES standard, the techniques described may also be used for the AES standard. The following describes AES and further techniques which improve upon the above described methods for enhancing the cryptographic security of keys used by software with cryptographic functions. The following description will use AES as the exemplary example of an implementation but these methods may be used in other standards and cryptographic methods.

An Exemplary Symmetric-Key Cipher: AES-128

Federal Information Processing Standards Publication 197 (FIPS-197), published by the National Bureau of Standards (NBS) on Nov. 26, 2001, introduced the Advanced Encryption Standard (AES), intended as a modernized substitute for the earlier Data Encryption Standard (DES) introduced in Federal Information Processing Standards Publication 46 (FIPS-46) on Jan. 5, 1977 by NBS.

FIPS-197 describes three related symmetric-key ciphers which are highly similar except for the size of the key and the number of rounds: AES-128, AES-192, and AES-256, with 128-, 192-, and 256-bit keys, respectively.

As an exemplar of a modern symmetric-key block cipher of the kind which Ser. No. 10/433,966 protects, we will use AES-128, shown in FIG. 18. The 4×4 block of cells 300A-300G represent the state, which consists of a table of 16 bytes organized into a 4×4 matrix.

r denotes the round number, which is initialized to zero and grows to ten as the algorithm progresses. The operations comprise the bitwise exclusive or of two 16-byte (128-bit) quantities, one taken from the Key Schedule, and one being the state (AddRoundKey), a nonlinear substitution typically performed using a table of 256 bytes indexed by a byte, which is performed independently on each byte of the 4×4 AES state (SubBytes), a left rotation of the rows of the state by 0, 1, 2, and 3 byte positions (ShiftRows), and the replacement of each column of the state by its product with a 4×4 maximum distance separable (MDS) matrix over $GF(2^8)$ (MixColumns). Each such operation takes the 4×4 state matrix and produces a new 4×4 state matrix modified by the operation.

Note that all of the operations are affine over $GF(2^8)$ with the exception of SubBytes. That is, except for SubBytes, each one of these operations could be performed by taking a 16-byte column vector V (the AES state) and computing W=MV+C, where W is the new state after the operation, represented as a 16-byte column vector, M is a 16×16 matrix over $GF(2^8)$ which depends on the operation (AddRoundKey, ShiftRows or MixColumns), and C is a 16-byte constant vector which depends on the round number (specifically, it is dependent on the Key Schedule).: each AddRoundKey consumes 16 bytes from the Key Schedule which is not reused during the course of an encryption.

Of the operations, all but one (namely, MixColumns) are SPN operations, and the exception is linear over $GF(2^8)$. Let us call a cipher of this kind, where all operations are substitutions, permutations, or affine, a substitution-affine network (SAN), since permutations of elements of a vector are themselves affine; i.e., the permutations of vector elements are a special case of the affine functions on vectors.

Decryption with AES-128 is quite similar. The details are irrelevant to our current purpose and therefore omitted. Techniques which serve to protect AES-128 encryption, or encryption by other symmetric key block ciphers, also serve to protect AES-128 decryption, or decryption by other symmetric key block ciphers, where such ciphers are based on SANs as in AES-128, DES, and the like. Such ciphers (or related hashes) implemented in the black-box context as SANs are among the kinds of software which the above described methods protects.

Encryption and decryption have traditionally been performed so that the attacker normally has access only to the results of encryption, and at most has access (possibly controlling access) to both the input to and results of encryption. This maximal access permits the adaptive chosen plaintext attack. We call this the black-box attack context (BBAC) and call cryptography intended for such a context black-box cryptography (BBC).

More recently, this traditional picture has been modified in two ways due to business requirements mandating more portable or distributable forms of cryptography.

First, cryptography, which used to be performed in inaccessible hardware or on an inaccessible computer, is now performed in accessible devices such as smart cards. As a result, some information on the computation performed by the device may be available to an attacker by means of the power-consumption profile of the device, or by means of electromagnetic emissions of the device during encryption or decryption. Moreover, it may be possible to perturb the implementation by physically performing modifications on the device and observing behavioral changes.

This first new situation gives rise to what might be called the grey box attack context (GBAC), and cryptography intended to withstand such attacks is called grey box cryptography (GBC).

Secondly, cryptography may be performed on devices which may fall under the complete control of an attacker, so that the attacker has total control over the execution of the algorithm, can view all aspects of the computation by means of debugging tools and other execution visibility facilities, and can modify the software and observe resulting behavioral changes.

This second new situation gives rise to what we call the white box attack context (WBAC), and cryptography intended to withstand such attacks is called white box cryptography (WBC).

The WBAC has most of the problems of the GBAC (with the exception of typically highly limited computational resources for implementation), and introduces many new or more severe ones. Hence the discipline of WBC is extraordinarily challenging.

Figure 18:
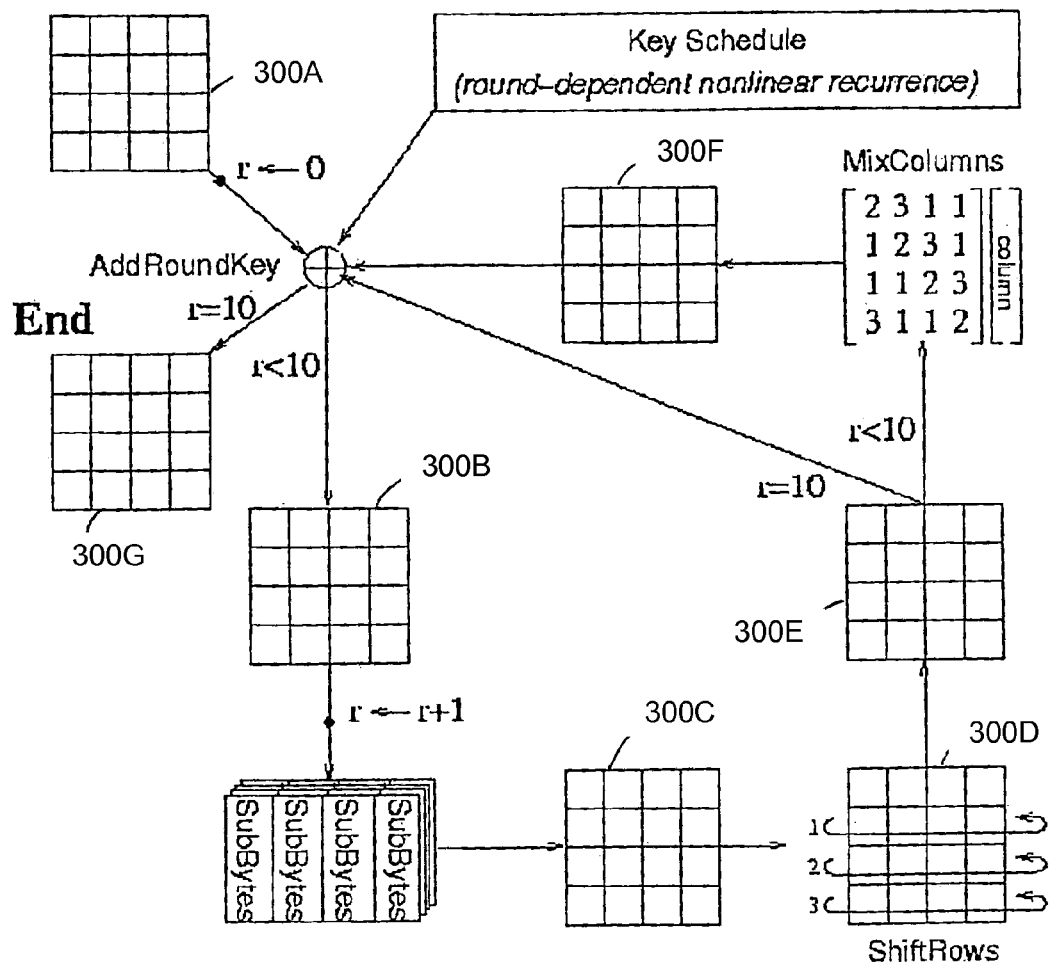
FIG. 18 illustrates the steps executed according to the AES-128 standard.

The AES-128 implementation shown in FIG. 18 is intended for BBC, and only for BBC. Plainly, in the context of the WBAC, it is totally insecure, as is any know symmetric-key block cipher based on a SAN implementation (or any other implementation intended for use in the BBAC, so far as we know).

It should be noted that the following techniques and methods for enhancing the cryptographic security of keys or other information in cryptographic software may be grouped generally into three distinct types of methods:
a) adjusting the data flow between the components of the software;
b) adjusting the information exchanged between the components of the software; and
c) replacing specific components of the software with different but related components.

Of the following approaches, the groupings (as indicated by their respective headings used below) may be as follows:
a) adjusting the data flow
  partially exported implementations;
  remote execution;
  content dependent routing,
b) adjusting the information exchanged between components
  obscure widening and narrowing of the data;
  Latin square functions and combining functions;
  intervening mixing,
c) replacing specific components with different but related components
  polynomials instead of lookup tables;
  replacement of MDS components;
  constructing non-affine components;
  compact mixing networks.

Of course, all of the different methods covered by the headings listed above and described in detail below are all merely ways of increasing the mathematical complexity of the software to which it would be applied. The first steps to increasing this mathematical complexity, and indeed of enhancing the cryptographic security of the key or of any information in the software, is to first determine the different components of the software. This step is well-known in the art—it merely comprises determining what components of the software do what and which information and pieces of data are exchanged between these components. The different functions executed by the components and of the software as a whole may also be determined and the different methods which follow may also be applied to these functions or with these functions in mind.

Dynamic Key Implementations

The examples given in the above described methods (as applied to DES) employ fixed keys, and use partial evaluation to incorporate these keys into the substitution boxes or lookup tables comprising the implementation.

Since the operations used in key scheduling are also SAN operations, it follows that the key and its uses can be protected even if the key is not embedded in the cipher or hash implementation, but instead is part of the input data to that implementation. The key would be input in an encoded form (typically encoded by a mixing bijection as described above, and then further encoded by arbitrary nonlinear bijections). Hence the above described methods already support dynamic-key white box cryptography.

It is also noted that improvements introduced in the present invention can further protect dynamic keys and their use, just as the improvements can protect other aspects of white box cryptographic implementations.

Polynomials Instead of Lookup Tables

The description above which uses DES as an example describes implementations largely in terms of arbitrary functions or lookup tables (i.e., substitution boxes).

It is noted that for any number of the form $p^n$ where $p>1$ is a prime number and $n \geq 1$ is a whole number, any bijective function $f: GF(p^n) \rightarrow GF(p^n)$ can be expressed as a polynomial over $GF(p^n)$ of degree at most $p^n-1$, which can be stored as a vector of at most $p^n$ non-negative integers in the range $0$-$(p^n-1)$ inclusive. E.g., if $p=2$ and $n=8$, then we have a vector of at most 256 numbers in the range 0-255 inclusive (i.e., a table of not more than 256 bytes). Such a bijective polynomial is called a permutation polynomial (PP), since it computes a permutation of the elements of $GF(p^n)$.

This can be extended to cover any function $f: GF(p^n) \rightarrow GF(p^n)$, rather than just bijective functions, as follows: If the domain of $f$ is a proper subset of $GF(p^n)$, choose a PP for a function g which maps the subset as $f$ does (but can map the remaining elements of $GF(p^n)$ arbitrarily within the restriction that g is bijective). If we need to represent a function $f$ which maps $GF(p^n)$ to a proper subset of $GF(p^n)$, select PPs $f_1, \ldots, f_k$ such that the sum of the PPs for each value in $GF(p^n)$ is the desired mapping. Since the sum of PPs is a polynomial, we end up with another polynomial over $GF(p^n)$—but certainly not a PP, since the resulting polynomial is not bijective. It follows that any function $f: GF(p^n) \rightarrow GF(p^n)$ can be expressed as a polynomial over $GF(p^n)$ by the appropriate selection of coefficients in $GF(p^n)$ (e.g., in the case of $GF(2^8)$, each coefficient can be stored in a byte).

A much greater improvement can be achieved when it is realized that there is a class of such polynomials which can be stored more compactly and require much less computation: specifically, those whose coefficients are sparse (i.e., mostly zeros). Thus, wherever there is a lookup table, it can be replaced with a sparse polynomial. In that case, instead of storing all of the coefficients, a table of coefficients is stored together with an indication of which coefficients are present and which are absent. For a small number of coefficients, we could use table entries of the form I, C, with I being the index of the coefficient in the range $0 \leq I < p^n$, and C being the coefficient in the range $0 \leq C < p^n$. For a larger number of coefficients, it might be more efficient to store the coefficients in one table and a separate vector of bits, with each bit representing a coefficient index, and with 0 representing the absence of that coefficient in the table and 1 representing its presence (a bit map representation). Other variations will suggest themselves to those skilled in the art of online data structures.

Note that it is the actual lookup table which is replaced, not any intermediate functions used to compute it. For example, if we have a lookup table which represents the function composition F=h∘g∘f, it is F, not any of f, g, or h, which would be represented as a permutation polynomial. Hence f, g, and h need not have sparse PP representations: only F needs a sparse PP representation, to make this improvement efficient.

This approach offers three kinds of improvements for over the above described methods:

1. For a given value of $p^n$, the representation of a computation can be made significantly more compact while retaining adequate speed of computation.
2. As $p^n$ increases in size, the size of a lookup table for an arbitrary function over $GF(p^n)$ grows rapidly to sizes which are unusable for most purposes, whereas sparse permutation polynomials permit large values of $p^n$ without this disadvantage. E.g., for $2^8$, we have a table representation of 256 bytes, but for $2^{32}$ we have a table of over 4 gigabytes, which is unacceptably vast for most practical uses. However, using sparse polynomials, it is entirely possible to represent a (restricted set of) functions over $GF(p^n)$ with $p^n$ large (e.g., for $p^n = 2^{32}$ or larger). The restriction on the set of usable functions may be more than outweighed by the ability to support large values of $p^n$.
3. Polynomial computations can be represented as executable code, so that other forms of obfuscation technology, such as that in U.S. Pat. Nos. 6,594,761 or 6,779,114, can be applied to this executable code, increasing the level of protection.

Partially Exported Implementations

An implementation according to the DES implemented methods described above is preferably embodied as executable code plus constant data values which may or may not be organized into tables. Where arbitrary encodings are used, tables may be preferable. Where parts of the functionality may be expressed as polynomials, it is the coefficients of the polynomials which might be organized into tables.

If an implementation is created according to the present invention and the improvements in the instant invention as a single program, process, or subroutine, then replacement of parts of the algorithm must be done either as a replacement in entirety, or by using patch utilities which can modify executable entities. The patching process is typically not one which can be done on the fly in a running implementation.

However, if we employ an implementation in which the executable code is present, or mostly present, but other parts of the implementation such as specific subroutines (export code) or online data structures (export tables) have been stored in files or similar storage outside the primary storage containing the implementation during execution, then the implementation can be modified on the fly simply by reading in the component to replace the existing component. This permits incremental upgrades to the implementation at low cost, on the fly, without the need to halt execution for a time to permit patching.

Remote Execution

Figure 19:
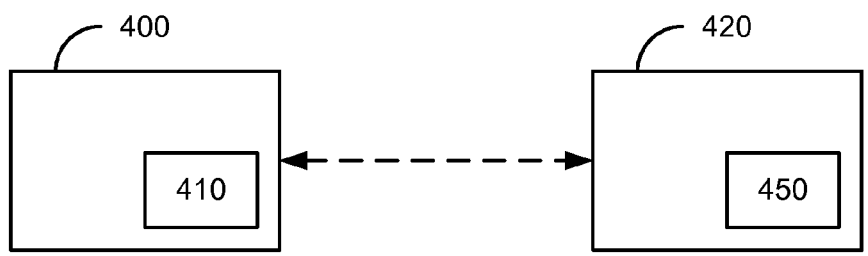
FIG. 19 is a schematic illustration of data processing nodes in communication with one another.

Perhaps the strongest form of protection which can be applied to an implementation according to the above described methods and the further improvements described here, is to execute parts of the process on some other node of a network; i.e., on some different computer connected to the computer containing the main portion of the white box embodiment by a communication medium of some kind such as a LAN or WAN. Thus, referring to FIG. 19, the data processing node 400 upon which the main portion 410 of the cryptographic software is executed is logically distinct from the data processing node 420 which executes some specific component or function 430 used by the main portion. These two nodes are, clearly, in communication with one another.

For example, dynamic keys according to the instant invention might reveal some information about the key generation process to an attacker. However, if the generation of a key schedule is performed on some remote node, and received by the implementation periodically (i.e., when it is necessary to change the key), then no such information is revealed to the attacker, and attacking the encodings by which the key information is concealed requires more effort on the part of the attacker and far more expensive in terms of computing resources needed by the attacker.

Replacement of MDS Components

Modern symmetric key ciphers often employ a mixing function which is maximum distance separable (MDS). In AES, this mixing function is applied in the MixColumns step: the MixColumns matrix is a 4×4 MDS matrix over $GF(2^8)$.

Let A be a proper alphabet (i.e., a finite, non-empty set with at least two elements). The MDS property has to do with Hamming distance. The Hamming distance between two s-vectors x,y in $A^s$, is the number of element positions at which they differ. E.g., if A is the ordinary English alphabet, then the Hamming distance "Fred" and "Fact" is 3, and the Hamming distance between "potato" and "tomato" is 2. Let f: $A^k \rightarrow A^m$ be a total function (i.e., a function which is defined for every input k-vector in $A^k$). Then $f$ is MDS if and only if, for any two distinct input vectors x,y in $A^k$, if the Hamming distance of x and y is d, then the Hamming distance of $f(x)$ and $f(y)$ is at least m−d+1. The property that for all distinct x and y, this lower bound of m−d+1 is obtained, is called maximum distance separability. It is impossible to find a function which improves on this lower bound, which is called the Singleton bound.

Typically in cryptography, we identify A with some particular finite field $GF(p^n)$, so that the power of linear algebra may be applied to vectors over A.

MDS functions, and particularly linear MDS functions, are often used in modern ciphers because they perform a kind of ideal mixing. Considering the exemplary cipher AES-128, it is noted that mixing among bytes of the state is performed by the MixColumns and ShiftRows steps, with MixColumns being performed by an MDS matrix.

If this MDS matrix is known to an attacker, it accelerates the attack because there is no need to identify it. Hence it is desirable to replace this matrix with some MDS function not known to the attacker at the outset. In the case of AES, this means we replace the 4×4 MixColumns function with another 4×4 MDS function over $GF(2^8)$. If it is linear, it can be represented by a 4×4 matrix over $GF(2^8)$.

To find a new MDS function, we can use well-known methods such as taking the product of distinct-coefficients Vandermonde matrices or Bush's construction. For convenience, these techniques are described below.

A distinct-coefficients Vandermonde matrix of order m is an m×m matrix over a finite field $GF(p^n)$, W $(c_0, c_1, \ldots, c_{m-1}) = [x_{i,j}]_{m \times m}$ where $x_{i,j} = c_i^j$ for i=0, ..., m−1, for j=0, ..., m−1, with the $c_i$'s pairwise distinct and with no $c_i$=0. (Such a matrix is always nonsingular.) We choose two distinct coefficients Vandermonde matrices X=W $(a_0, a_1, \ldots, a_{m-1})$ and Y=W $(b_0, b_1, \ldots, b_{m-1})$ such that there is no pair of indices i,j for which $a_i = b_j$. Then the matrix product $XY^{-1}$ is a (nonsingular) MDS matrix of order m. Thus to create an m×m MDS function, we choose 2m arbitrary pairwise distinct nonzero values from $GF(p^n)$ and use them as the $a_i$'s and $b_j$'s in the above construction.

Given a proper alphabet A with s symbols, with $s=p^n$ and $s \leq t-1$, where $A=GF(p^n)$, Bush's construction builds an OA($s^1$, s+1, s, t)—an orthogonal array. An orthogonal array (OA) of form OA(N, k, s, t) is a rectangular array with N runs (rows), k factors (columns), s levels (symbols), strength t, and index $\lambda=N/s^t$, which must be a whole number. The cells of such an OA contain elements of A (i.e., symbols in the alphabet A, which in this case are elements of the finite field GF($p^n$)). An OA of strength t has the property that, for any t factors (columns) of the array, every possible arrangement of t symbols from A appears in those t columns exactly $\lambda$ times (i.e., in exactly $\lambda$ runs). In the case of Bush's construction, we always have $\lambda=1$.

In Bush's construction, we create an empty rectangular array with $s^t$ rows and s columns. We label the columns with the elements of alphabet A=GF($p^n$), and the rows with all the possible coefficient vectors for polynomials over GF($p^n$) of degree<t (i.e., the maximum degree being t−1): each such vector then contains t elements. (Such a polynomial has the form $f(x)=a_0+a_1x+a_2x^2+\ldots+a_{t-1}x^{t-1}$). We then fill in cell r,c, where r is the row and c is the column, with the evaluation of the polynomial whose coefficient vector labels the $r^{th}$ row, at the point labelling the $c^{th}$ column. We now have an OA($s^t$, s, s, t). Finally, we add a final column in which entry j contains the coefficient of $x^{t-1}$ in the polynomial whose coefficient vector labels the jth run, thus converting our OA to an OA($s^t$, s+1, s, t).

We typically want m×m MDS functions. To obtain such an MDS function from our OA($s^t$, s+1, s, t), we select any 2m factors out of the s+1 factors. (I.e., we now have a vector of 2m column numbers.) We arbitrarily permute the elements of this 2m-vector. We then take the first m of them as our from-vector indices and the remaining m become our to-vector indices. We traverse our OA($s^t$, s+1, s, t), and create a new m-column, $s^t$-row table as follows. At the element indexed by the from-vector, we fill the row with the to-vector. This table is now the table of an m×m MDS function. To find the value of this function at a given input m-vector, we treat the vector as an m-digit number in radix s, index the table with this numerical value, and the vector in that row is the output of the function for that input vector. (We assume here that the first table element has index 0.)

Since Bush's construction generates linear MDS functions, we can shorten the above procedure, which can generate extremely large tables. We simply create enough table entries so that we have t linearly independent from-vectors and t mappings from those from-vectors to t corresponding to-vectors. We then solve the t equations in t unknowns by Gaussian elimination to find the underlying MDS matrix which describes this function, and is tiny compared to the table for large $s^t$. For example, for s=256 and t=4, this replaces a table of 4 gigabytes with a matrix of 16 bytes.

Note that the result of such a modification to a cipher is a new cipher. Hence the cost of this improvement is that there is no underlying standard cipher which the implementation embodies. The advantage is that the non-standard cipher arguably preserves the full security of the original standard cipher, but is more resistant in the WBAC.

Constructing Non-Affine Components

Suppose we have two m×n affine functions, $f$ and g, with $f$ linear over GF(F) and g affine over GF(G). Then $f$ and g each have m inputs and n outputs. Construct a new m×n function h as follows. Each input is a pair (x,y), with x taken from GF(F) and y taken from GF(G). To find the outputs, we apply $f$ to the left members of the inputs and obtain the left members of the outputs, and we apply g to the right members of the inputs and obtain the right members of the outputs. That is, h is effectively the interleaving of the inputs and outputs of $f$ and g.

The interesting point here is that in general, even though $f$ and g are individually affine, h is almost never affine over GF(FG). By selecting appropriate $f$'s and g's, we thereby obtain a wide selection of non-affine functions over GF(FG). (We can select specifically for nonlinearity of h over GF(FG), of course.) Even better, if $f$ and g are MDS, h is also MDS.

One of the key points in the attack of *Cryptanalysis of a White Box AES Implementation* by Billet et al. was that the MDS function, MixColumns, of AES, is linear. By using the method described above, the MDS function can be made non-linear.

Moreover, we can further encode h using affine or non-affine mappings of individual inputs and outputs over GF(FG), and if h was MDS prior to such I/O encoding, its MDS property is preserved by such encoding.

Intervening Mixing

When a homomorphic mapping attack is mounted, the complexity of the attack depends on the width of the input and output must be considered. For example, in the implementation of *White Box Cryptography and an AES Implementation* by Stanley Chow, Philip Eisen, and Harold Johnson (Cloakware) and Paul van Oorschot (Carleton University), published in the SAC 2002 proceedings, the authors of *Cryptanalysis of a White Box AES Implementation* by Olivier Billet and Henri Gilbert (France Telecom) and Charaf Ech-Chatbi (Loria), published in the SAC 2004 proceedings, found an attack which reduced the effective width to 8-bits in and 8-bits out. The complexity rises exponentially with this width. The reason was that the attack was specifically aimed at key-dependent encodings of the SubBytes table of AES which is 8-bits in and 8-bits out, and no steps were taken in the implementation to widen the encodings beyond this point.

One variation is to insert mixing bijections, as described above, between those steps of the cipher which are key-dependent. For example, consider FIG. 18 relating to AES. Between steps, we show a 4×4 state matrix 300A-300G. At each of these points, it would be possible to insert a mixing bisection. However, we should probably not insert such mixing between ShiftRows and MixColumns, which together are intended to perform complete mixing on the state: despite their names, ShiftRows mixes information among the columns and MixColumns mixes information among the rows.

Suppose in AES-128 we insert mixing bijections (MBs) between AddRoundKey and SubBytes (matrix 300B), between SubBytes and ShiftRows (matrix 300C), and between either MixColumns ($1 \leq r \leq 9$) or ShiftRows (matrix 300E) and AddRoundKey r=10) (matrix 300F), where r is the round number. Furthermore, suppose we insert a mixing bijection initially and finally.

At this point, since the composition of affine functions is an affine function, we effectively have a cipher which performs a series of operations of the form $A_0$, SubBytes, $A_1$, SubBytes, ..., SubBytes, $A_{10}$, SubBytes, $A_{11}$, where $A_i$ is a bijective (i.e., invertible) affine transform formed by the composition of MBs and other affine transforms, for i=1, 2, ..., 11. If we combine this with the use of an alternative MDS function, then there is no point at which there is a byte-in, byte-out mapping obtainable as in Billet et al., on which to perform a homomorphic mapping attack.

The essential point here is that the methods outlined above for DES do not allow us to disguise an arbitrary non-affine mapping, such as SubBytes, in a deep fashion, except by using a large table. Therefore, we need to isolate such functions from the key. Moreover, we further need to separate substituted components, such as replaced MDS components, from functions such as SubBytes, unless we replace such arbitrary mappings with very large tables.

The intervening mixing we have described above accomplishes these objectives. Moreover, since the injected functions are linear, it is most unlikely that they will weaken the strength of the cipher relative to AES-128; i.e., it should retain its full strength in the BBAC.

Compact MDS Functions

FIGS. 13 and 20-24 show banyan switching network topologies. It is a property of such networks that, regardless of the functions computed at the nodes, it is impossible for such a network to compute an MDS function if a row of nodes contains more than one node.

Figure 20:
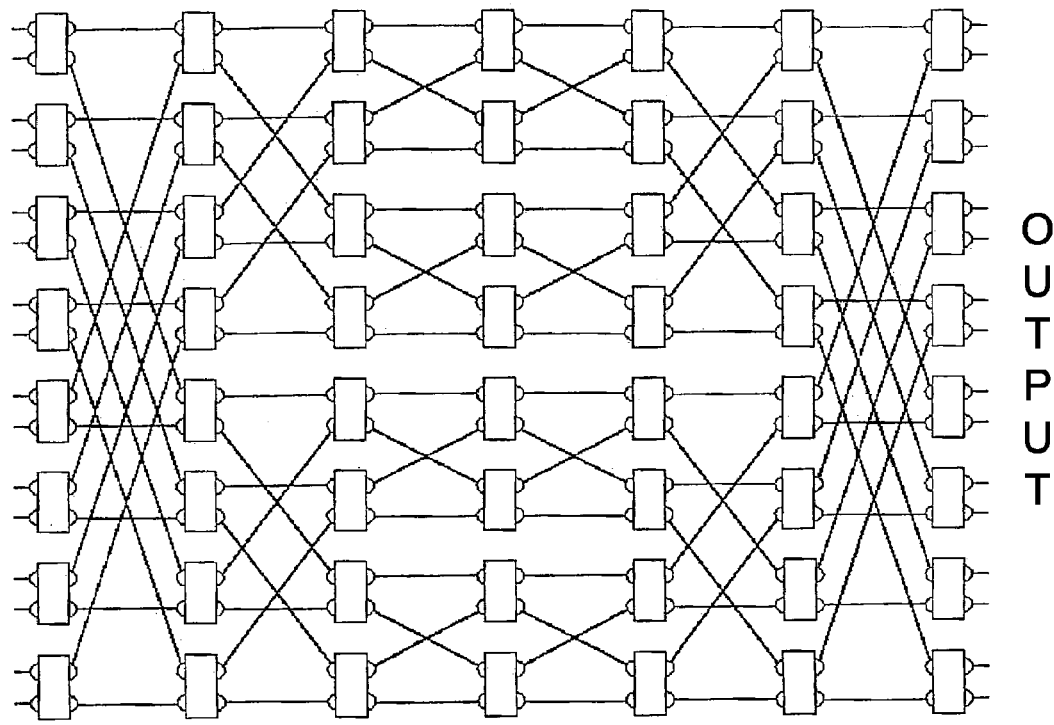
FIG. 20 illustrates a banyan network topology.
Figure 23:
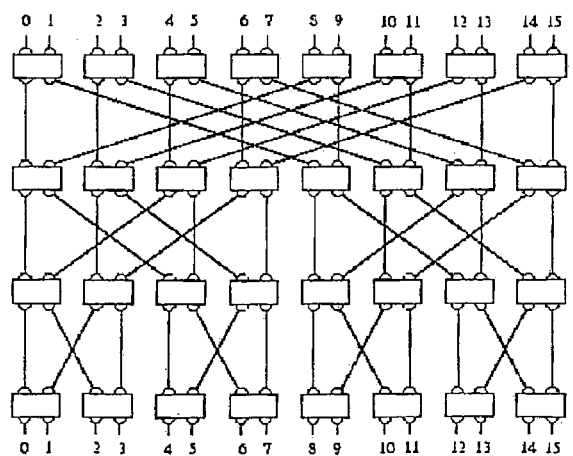
FIG. 23 illustrates a banyan network topology which may be used for creating smaller mixing functions.

However, a variation of such a topology can compute a linear MDS function, or a non-affine encoding of a linear MDS function. This topology—termed a mixing banyan—is shown in FIG. 20.

We have verified experimentally that such a network, where each node inputs two 4-bit nybbles, and outputs to 4-bit nybbles, and each node computes a linear function, can compute an MDS function when we combine inputs and outputs into pairs (i.e., into 8-bit bytes). The advantage is that, compared to the matrix-blocking implementation described above with relation to DES, such an implementation is much smaller, and since every node must be executed, much faster as well. Such functions can be found by searching for small widths (such as 4 bytes in and 4 bytes out). The matrix blocking method mentioned above builds implementations with a size and execution time varying quadratically with n, where n is the number of inputs and outputs, whereas the instant method produces implementations with a size and execution time varying as n log n.

Of course, such a network can be disguised using all of the techniques described in this document.

The same kinds of methods can be used with other forms of sorting network topologies such as shuffle-exchange or omega networks. The use of the banyan network as a basis is exemplary rather than required.

Compact Mixing Networks

Figure 21:
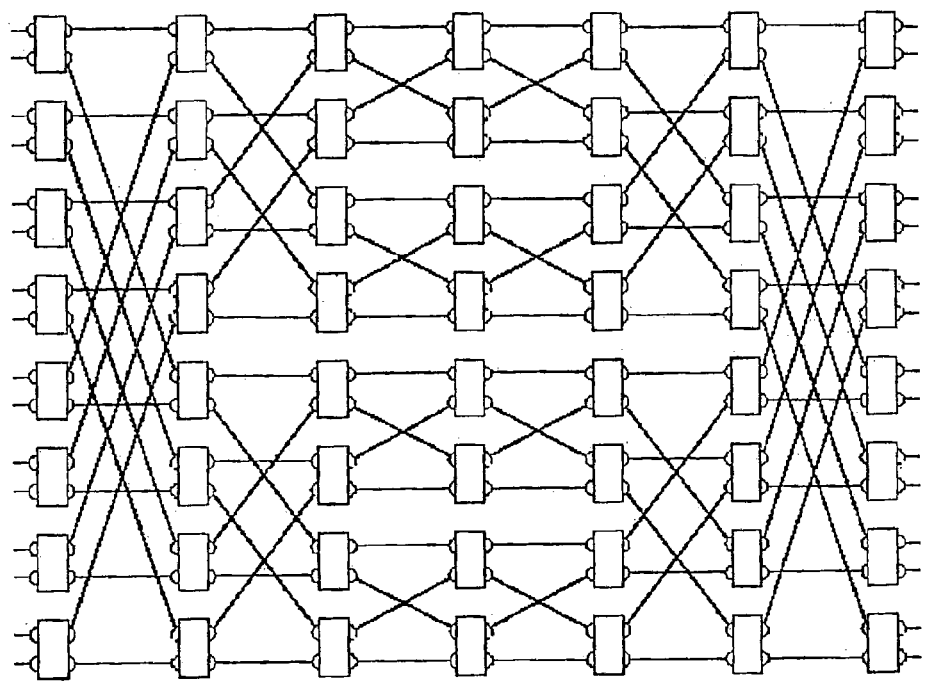
FIG. 21 illustrates a BLB mixing banyan network topology.
Figure 22:
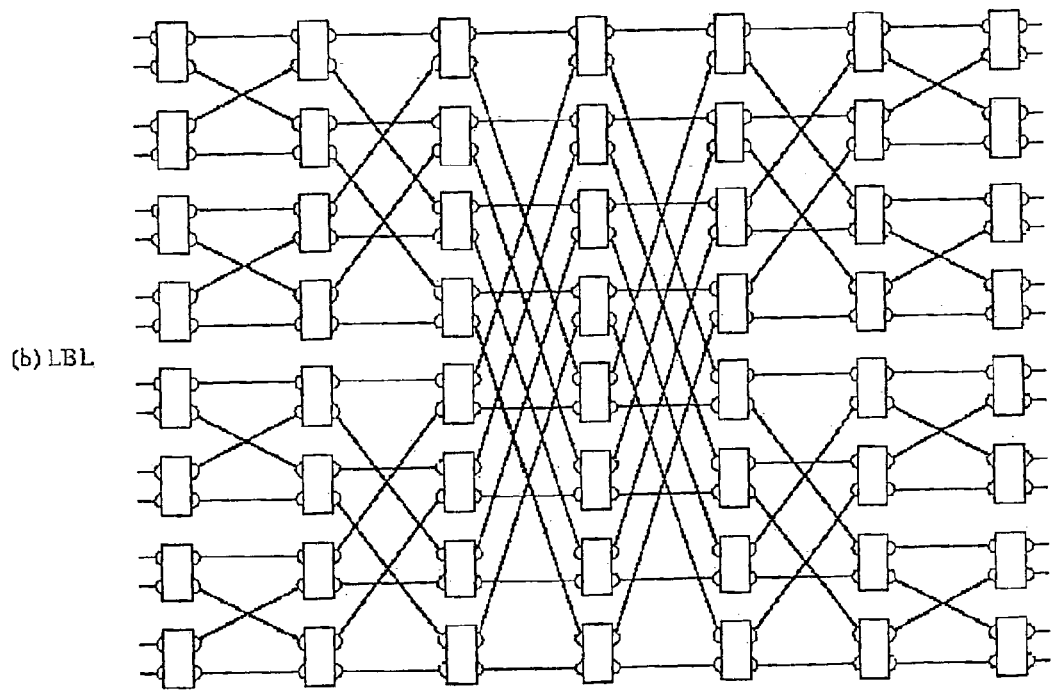
FIG. 22 illustrates an LBL mixing banyan network topology.

In Compact MDS Functions above, we describe a topology for producing compact network implementations of MDS functions. Here we introduce a compact network representation for mixing functions more generally. We note that there are actually two kinds of mixing banyans. That shown in FIG. 20 is a BLB mixing banyan: the wiring first takes big steps, and then smaller ones, and then larger ones again. The other kind is the LBL mixing banyan, where the wiring first takes little steps, and then big ones, and then little ones. A BLB mixing banyan topology is illustrated in FIG. 21 while an LBL mixing banyan topology is illustrated in FIG. 22.

The node functions can be randomly chosen linear functions to build a mixing bisection, which might then be encoded using the network encoding techniques described above into a non-affine function, or they may be non-affine functions.

The matrix blocking method described above with reference to the DES standard builds implementations with a size and execution time varying quadratically with n, where n is the number of inputs and outputs, whereas the instant method produces implementations with a size and execution time varying as n log n, and covers a wider variety of mixing functions than those covered by the above noted DES implemented methods based on sorting networks, as we have already seen: the mixing banyan topology supports MDS functions whereas the ordinary banyan topology does not. Hence this approach provides a wider range of functions which can be represented in n log n space and execution time.

The same kinds of methods can be used with other forms of sorting network topologies such as shuffle-exchange or omega networks. The use of the banyan network as a basis is exemplary rather than required.

Obscure Widening and Narrowing

In the above described DES implemented methods, switching networks are introduced as network topologies for the compact representation of mixing functions. An example of such a network is the banyan network shown in FIG. 23.

A banyan network may be entered either at the top of the above diagram (in which case we call it big-endian because the wiring steps are first large and then small) or the bottom (in which case we call it little-endian because the wiring steps are first small and then large), and then connects every input to every output. A variation of such networks permits additional functionality: we can obscurely widen and narrow data. When we widen data from a smaller to a larger number of elements, we introduce redundancy, and when we narrow data from a larger to a smaller number of elements, information is discarded (with no essential loss of the information discarded was redundant). An exemplary network topology for performing such widening or narrowing is shown in FIG. 24.

Figure 24:
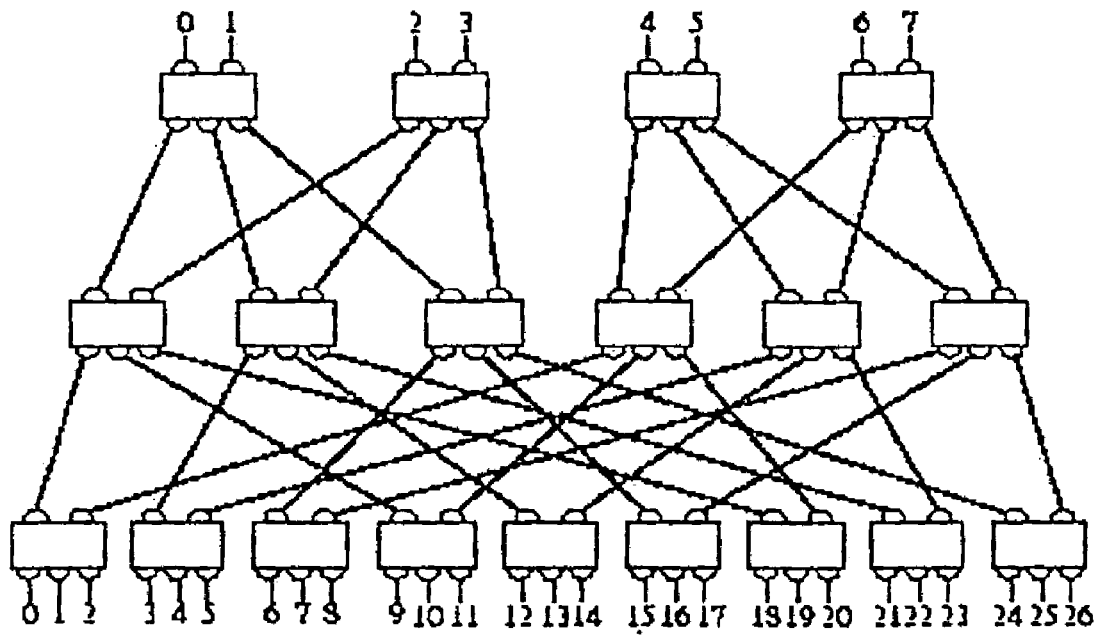
FIG. 24 illustrates a banyan network topology for widening a data input.

Referring to FIG. 24, the diagram can be entered from the top and exited at the bottom, it widens an input from eight components to 27, and entering from the bottom at exiting at the top, it narrows an input from 27 components to eight. In the widening direction, each node of this network computes some 1-to-1 function from two inputs to three outputs. In the narrowing direction, each node computes some function, not 1-to-1, from three inputs to two outputs.

Of course, two and three are somewhat arbitrary. The point is that the nodes either have more or less inputs than outputs. Moreover, the above network is quite regular. It is possible instead to arrange that some nodes widen or narrow, while others have no effect on width, or that some entire rows of nodes widen or narrow, whereas other entire rows have no effect on width. By taking advantage of these various possibilities, it is straightforward to construct topologies for widening or narrowing information by arbitrary amounts, and by applying the obscuring techniques described in this document, such information widenings and narrowings can be performed without revealing the underlying encoded data represented within the data transferred and modified by the network to an attacker.

We also note that, if the nodes are lookup tables, then widening is more compact than narrowing. The reason is that the size of a lookup table grows exponentially with its input-width, but only linearly with its output-width. Thus, for narrowing networks, if nodes have wide inputs, it may be desirable to employ polynomial representations for them according to Polynomials Instead of Lookup Tables in the instant invention to allow such nodes to be represented compactly.

The same kinds of methods can be used with other forms of sorting network topologies such as shuffle-exchange or omega networks. The use of the banyan network as a basis is exemplary rather than required.

Latin-Square Networks and Combining Functions

In cryptography, we often wish to combine two pieces of information into a single piece of information. Two examples are pre-whitening, in which a data string is combined with some value in order to reduce the regularity (i.e., the redundancy) of the data string, and key-combination, as in the AddRoundKey step of AES.

Often, the combination function used is a bitwise exclusive-or (xor), since it is so fast to compute and evenly mixes information at every point of the combination (i.e., no bits are favored). Other mixing functions may not have this property.

For example, addition does not, because the high-order output bit depends on all input bits but the low-order output bit depends only on the two low-order input bits.

A weakness of using xor in the WBAC is that the output is a linear combination over GF(2) of the two inputs.

We note that two-input, one-output xor comprises a latin square. A latin square is a total function $f: A^2 \rightarrow A$ for some proper alphabet A such that holding either input constant yields a bijection (an invertible function) g: A→A. Represented as a square table, such a table is an s×s square, where s is the size of A, with s rows and s columns of cells in which each symbol in A occurs in each row exactly once and in each column exactly once.

Latin squares are a good choice of combining function because:

when one input is set to a constant, the function from the other to the output loses no information, they are easy to construct from orthogonal arrays (OAs), and orthogonal pairs of latin squares take two inputs and produce two outputs (one for each of the latin squares in the orthogonal pair), such all of the information in the two inputs is preserved in the two outputs. (A pair of orthogonal latin squares constitutes a 2×2 MDS function. MDS functions are described in Replacement of MDS Components.)

OAs are described in the section on Replacement of MDS Components. Suppose we have an OA($s^r$, k, s, 3). We can construct a latin square by arbitrarily choosing two factors (columns) as inputs and one factor (column) as the output. Each group of three cells so chosen represents two inputs and an output, from which we define the latin square. If we have an OA($s^r$, k, s, 4), we can construct two latin squares by arbitrarily choosing above, except that, instead of choosing one factor as an output, we choose two (one for each of the pair of orthogonal latin squares).

However, this approach builds latin squares or pairs of orthogonal latin squares, which tend to employ small alphabets and, if constructed using Bush's construction as described in *Replacement of MDS Components*, are linear over GF(s).

We now describe an implementation which avoids both of these drawbacks: we can generate latin squares of arbitrary size, and the latin squares need not be linear. Indeed, the dimension of the squares (i.e., the size of the alphabet of symbols in the cells of the square) need not be a prime power, but can be an arbitrary number greater than six.

The construction employs a banyan network (see the diagram at the beginning of Obscure Widening and Narrowing). We will use a network of nodes, each being a 2×2 function, to construct an implementation of a larger function which is a 2×2 MDS function (i.e., a pair of orthogonal latin squares).

As we will note elsewhere, a banyan network cannot possibly compute a k×k MDS function if k>2 (i.e., if a row of nodes contains multiple nodes), where k is the number of input ports and output ports of the network.

However, there is a small change in topology which permits us to side-step this problem.

Let A be an alphabet of size s>6. We define a k×k (k inputs, k outputs) function with banyan network topology in which each node is an arbitrary bisection (total, invertible function) $f: A^2 \rightarrow A^2$. We further make the restriction that k≧4 (i.e., each row of nodes contains at least two nodes), and, for a big-endian banyan network, the functions for the first row of nodes (those nearest the input ports) must all be 2×2 MDS functions, or, for a little-endian banyan network, the functions for the last row of nodes (those nearest the output ports, must all be 2×2 MDS functions.

At this point, we have a k×k network which is not MDS. We now convert it to a 2×2 network which is MDS; i.e., which implements an orthogonal pair of latin squares, over alphabet $A^{k/2}$ (note that k is always divisible by two; this is implied by the banyan network topology). The two orthogonal latin squares which it implements are of size $s^{k/2}$, which can be arbitrarily large by choosing sufficiently large k, where any such k must be a power of two (of course, because we are using banyan network topology).

The change in topology is as follows: instead of having k inputs and k outputs, we combine all of the even-numbered inputs 0, 2, 4, . . . , k−1 into a single input, and all of the odd-numbered inputs 1, 3, 5, . . . , k into a single input. These are the two inputs over $A^{k/2}$.

We then combine the first half of the outputs, 0, 1, 2, . . . , k/2−1, into a single output, and the second half of the outputs, k/2, k/2+1, . . . , k−1 into a single output. These are the two outputs over $A^{k/2}$.

We further note that the latin square property of the network is preserved if, for a big-endian banyan, we delete all rows of nodes except the first (nearest the inputs), and for a little-endian banyan, we delete all rows of nodes except the last (nearest the outputs), so that the undeleted rows are the 2×2 MDS function nodes. This may be adequate for the construction of certain large latin squares. However, the additional mixing performed by the remaining rows may often be valuable: there is additional benefit to using the full construction above.

We further note that, if we delete the left or right output, either from the full construction, or that obtained by removing by all but one of the rows of nodes as described above, and then remove all parts of the implementation which are thus rendered redundant, we obtain a single large latin square f: $(A^{k/2})^2 \rightarrow A^{k/2}$. We thus have a method for easily constructing compact and rapidly executing implementations of huge latin squares for use as combining functions where we do not need the two-sided combining property of a 2×2 MDS function (i.e., a pair of orthogonal latin squares).

Finally, we note that if the node functions are linear (or affine), then so is the latin square or 2×2 MDS function (pair of orthogonal latin squares), resulting from the construction, whereas if the node functions are non-linear, then this is almost never the case (and we can, be selection, ensure that the resulting implementations are neither linear nor affine).

Content-Dependent Routing

The networks of nodes in referred to above could be rendered far stronger if the content of those networks could be routed in a fashion dependent on the content being transported and transformed by those networks; i.e., if the topology of information transfer within the implementation were not completely fixed by that implementation, but rather varied with the content, so that attacks such as adaptive known plaintext attacks would produce highly unrepeatable behavior.

We now describe how this can be achieved. We first note that, in symmetric-key encryption and decryption, or in keyed cryptographic hashing, the content is of two kinds: text (the information which is encrypted, decrypted, or hashed) and key (the information which determines the exact way in which the text is encrypted, decrypted, or hashed).

For encryption and decryption, since the key is repeatedly recombined with the text, text-dependent routing makes it very difficult to find the decryption implementation corresponding to an encryption implementation for the designer (not just the attacker). This is undesirable, so text-dependent text- and key-routing should be used only in white-box cryptographic keyed hashing, not in white-box symmetric-key encryption and decryption. Key-dependent text- and key-routing, however, are acceptable for both white-box hashes and white-box encryption and decryption.

We describe a general technique for content-dependent routing. Once it is understood, its application to key-dependent, text-dependent, or key- and text-dependent routing is straightforward.

We note that, using a sorting network topology such as the banyan network diagrammed at the beginning of Obscure Widening and Narrowing above, we can arbitrarily move bits of information around, so we can, for example, arbitrarily interleave and mix key and text information. If we are going to perform key-dependent key- and text-routing, we would first interleave the key- and text-information to bring the key-information 'near' to the text information. We can separate it out later using another banyan or other analogous sorting network topology.

First, we widen the information to be routed, using the kind of topology described and diagrammed in Obscure Widening and Narrowing in the instant invention. The widening produces a vector of many components, in which each component (each output of the widening network) contains two combined pieces of information: the content, and one or more bits of routing information. After all routing has been completed, we reverse this process: we narrow the information, discarding the routing information.

Figure 25:
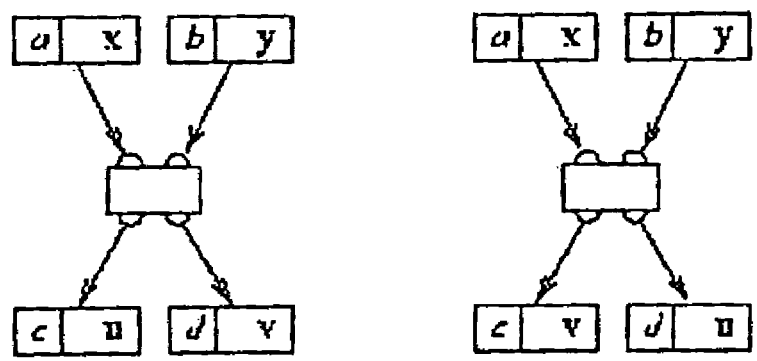
FIG. 25 illustrates two nodes in a sorting network such as a banyan network.

We note that when we reach a node in the sorting network, such as a banyan network, with two inputs and two outputs, it is entirely possible to employ a node function which produces new routing information, and also places the content either in the same order as the inputs in the outputs, or the opposite order, as shown in FIG. 25.

Referring to FIG. 25, if the node routes and does nothing else, then we have u=x and v=y. Otherwise, the node can route and in addition perform a transform from the inputs to the outputs, and we do not have these equalities.

The values a,b,c,d represent routing information. The values x,y,u,v represent the routed information. The left and right sub-diagrams represent two alternatives. On the left, the output has been configured, based on a,b, so that the u information is passed to the left and the v information to the right. On the right, the output has been configured, based on a, b, so that the u information is passed to the right and the v information to the left. Whichever alternative occurs, the c,d values denote the new routing information combined with the u,v information in the output of the node.

In key-dependent text-routing, the a,b information comes solely from the key, whereas the x,y information comes from either the key or the text. In such routing, since only the a,b information comes from the key, the c,d output routing information can only be based on the a,b information. In text-dependent text-routing or key-dependent key-routing, the new routing information can be based on the entire a,b,x,y input information, not just the a,b information.

In addition to key-dependent key- and text-routing and key-dependent key-routing, we can also perform text-dependent key-routing. Such routing is suitable only for white-box cryptographic hashes due to the previously noted difficulty in constructing an inverse function.

In the diagram above, the routing and content information are in distinct, separated chunks. In actuality, the inputs and outputs can be encoded according to the above DES implemented methods so that the attacker has no access to any such separate chunks: rather the contents of each input and output completely mix the routing and content information, so that the attacker sees only the combined information, not the separate routing and content information.

Concluding Remarks

While particular embodiments of the present invention have been shown and described, it is clear that changes and modifications may be made to such embodiments without departing from the true scope and spirit of the invention.

The techniques of the invention have been described with respect to the DES application, but clearly can be applied in many other contexts. The AES (Advanced Encryption Standard) approved under FIPS-197 would be a typical example. The linear (or "affine" to use the terms employed in the standard) transformations in AES including the S-box, ShiftRows and MixColumns transformations could all be obfuscated using the techniques of the invention. The AES is well known in the industry and information is available. The FIPS standard for AES is available on the Internet at http://csrc.nist.gov/encryption/aes/ and exemplary software code is available at http://csrc.nist.oov/encryption/aes/rijndael/.

It is understood that as de-compiling and debugging tools become more and more powerful, the degree to which the techniques of the invention must be applied to ensure tamper protection, will also rise. As well, the concern for system resources may also be reduced over time as the cost and speed of computer execution and memory storage capacity continue to improve.

These improvements will also increase the attacker's ability to overcome the simpler tamper-resistance techniques included in the scope of the claims. It is understood, therefore, that the utility of some of the simpler encoding techniques that fall within the scope of the claims, may correspondingly decrease over time. That is, just as in the world of cryptography, increasing key-lengths become necessary over time in order to provide a given level of protection, so in the world of the instant invention, increasing complexity of encoding will become necessary to achieve a given level of protection.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory medium may be programmed to execute such method steps. Suitable memory media would include serial access formats such as magnetic tape, or random access formats such as floppy disks, hard drives, computer diskettes, CD-Roms, bubble memory, EEPROM, Random Access Memory (RAM), Read Only Memory (ROM) or similar computer software storage media known in the art. Furthermore, electronic signals representing these method steps may also be transmitted via a communication network.

It will be clear to one skilled in these arts that there are many practical embodiments of the DES implementation produced by the instant invention, whether in normal executable machine code, code for a virtual machine, or code for a special purpose interpreter. It would also be possible to directly embed the invention in a net-list for the production of a pure hardware implementation, that is, an ASIC.

It would also be clear to one skilled in the art that this invention need not be limited to the existing scope of computers and computer systems. Credit, debit, bank and Smart Cards could be encoded to apply the invention to their respective applications. An electronic commerce system in a manner of the invention could for example, be applied to parking meters, vending machines, pay telephones, inventory control or rental cars and using magnetic strips or electronic circuits to store the software and passwords. Again, such implementations would be clear to one skilled in the art, and do not take away from the invention.

While the above description is concerned with the protection of the keys for symmetric key cryptography, the above described methods may also be used to protect other types of data whose concealment is desirable. As an example, keyed hashing methods which may be used for authenticating messages also use a key whose concealment is desirable. The above described methods may also be used to protect these types of keys.

We claim:

1. A method of enhancing cryptographic security for a cryptographic key used in software that has cryptographic components, the method comprising:
   (a) ascertaining the different components of said software; and
   (b) increasing the mathematical complexity of said software by:
      i) separating, across a plurality of nodes of a network, components which access cryptographic key information, and
      ii) applying transformations to communications between said nodes.

2. A method according to claim 1 wherein said applying transformations step comprises adjusting a data flow between components of said software.

3. A method according to claim 2 wherein specific data used by components of said software is stored in locations logically distinct from locations where said components are stored.

4. A method according to claim 2 wherein at least one component used by said software is executed at a data processing node logically distinct from a node where said software is executed, said node where said software is executed being in communication with said data processing node.

5. A method according to claim 2 wherein data used by said components of said software is routed between said components in a routing based on said key.

6. A method according to claim 2 wherein data used by said components of said software is routed in a routing based on contents of said data.

7. A method according to claim 1 wherein said applying transformations step comprises adjusting information exchanged between said components of said software.

8. A method accordingly to claim 7 wherein information exchanged between said components is expanded prior to being transmitted from a component by introducing redundancy in said information.

9. A method according to claim 8 wherein information exchanged between said components is expanded prior to being received by a component by removing said redundancy in said information.

10. A method according to claim 7 wherein said information exchanged between said components is mixed with other related data prior to being exchanged between components.

11. A method according to claim 10 wherein key information being exchanged between said components is mixed with text information.

12. A method according to claim 10 wherein mixing said information with said other related data is accomplished through using Latin-square combining functions.

13. A method according to claim 7 wherein said information is mapped onto different information prior to being exchanged with said components, said different information being exchanged with said components in place of said information.

14. A method according to claim 13 wherein different information received by a component from other components is mapped onto said information subsequent to being exchanged with said other components, said information being used by said component for processing.

15. A method according to claim 1 further comprising replacing specific components of said software with different but related components.

16. A method according to claim 15 wherein different but related components used by said software are stored in locations logically distinct from the location where said software is stored.

17. A method according to claim 15 wherein said different but related components implement a maximum distance separable function.

18. A method according to claim 17 wherein at least one of said specific components being replaced also implements a maximum distance separable function.

19. A method according to claim 15 wherein said specific components implement affine functions and said different but related components implement non-affine functions.

20. A method according to claim 19 wherein said non-affine functions are constructed by interleaving inputs and outputs of said affine functions implemented by said specific components.

21. A method according to claim 15 wherein said specific components represent mathematical transformations as matrices.

22. A method according to claim 21 wherein said different but related components represent mathematical transformations as mixing functions.

23. A method according to claim 22 wherein said mixing functions are maximum distance separable functions.

24. A method according to claim 15 wherein said specific components contain lookup tables and said different but related components contain polynomials used in place of said tables.

* * * * *

UNITED STATES PATENT AND TRADEMARK OFFICE
CERTIFICATE OF CORRECTION

PATENT NO. : 7,809,135 B2  Page 1 of 1
APPLICATION NO. : 11/020313
DATED : October 5, 2010
INVENTOR(S) : Harold J. Johnson et al.

It is certified that error appears in the above-identified patent and that said Letters Patent is hereby corrected as shown below:

Title Page delete "(63) Continuation-in-part of application No. 10/433,966, filed on Feb. 18, 2004, now Pat. No. 7,397,916" and insert therefor -- Continuation-in-part of application No. 10/433,966, filed on Feb. 18, 2004, now Pat. No. 7,397,916, filed as application No. PCT/CA2001/001729, filed Dec. 10, 2001, now abandoned --.

Title Page insert
-- (30) Foreign Application Priority Data
    Dec. 8, 2000 (CA)........................................2327911 --.

In the Specification:
Column 28, line 8, delete "=" and insert therefor -- ≈ --.

Signed and Sealed this
Sixteenth Day of April, 2013

Teresa Stanek Rea
*Acting Director of the United States Patent and Trademark Office*